(12) United States Patent
Tsai et al.

(10) Patent No.: US 12,149,318 B2
(45) Date of Patent: Nov. 19, 2024

(54) LINK RECOVERY AND SIDELINK BEAMFORMING

(71) Applicant: InterDigital Patent Holdings, Inc., Wilmington, DE (US)

(72) Inventors: Yingming Tsai, Boonton, NJ (US); Yifan Li, Conshohocken, PA (US); Patrick Svedman, Stockholm (SE); Mohamed Awadin, Plymouth Meeting, PA (US); Qing Li, Princeton Junction, NJ (US)

(73) Assignee: InterDigital Patent Holdings, Inc., Wilmingto, DE (US)

( * ) Notice: Subject to any disclaimer, the term of this patent is extended or adjusted under 35 U.S.C. 154(b) by 318 days.

(21) Appl. No.: 17/776,105

(22) PCT Filed: Nov. 11, 2020

(86) PCT No.: PCT/US2020/060041
§ 371 (c)(1),
(2) Date: May 11, 2022

(87) PCT Pub. No.: WO2021/096977
PCT Pub. Date: May 20, 2021

(65) Prior Publication Data
US 2022/0399927 A1    Dec. 15, 2022

Related U.S. Application Data

(60) Provisional application No. 62/933,824, filed on Nov. 11, 2019.

(51) Int. Cl.
*H04B 7/06*     (2006.01)
*H04W 24/08*    (2009.01)
*H04W 74/02*    (2009.01)

(52) U.S. Cl.
CPC ......... *H04B 7/0695* (2013.01); *H04W 24/08* (2013.01); *H04W 74/02* (2013.01)

(58) Field of Classification Search
CPC .. H04B 7/0695; H04B 7/0623; H04B 7/0632; H04B 7/0617; H04W 24/08; H04W 74/02
USPC ...................................................... 370/252
See application file for complete search history.

(56) References Cited

U.S. PATENT DOCUMENTS

2021/0136856 A1*   5/2021   Tseng ................. H04W 76/14

FOREIGN PATENT DOCUMENTS

WO    WO 2018/201457 A1    11/2018

OTHER PUBLICATIONS

Apple, "Summary of [104#56][NR/V2X] AS Level Link Management for Unicast", R2-1901900, Feb. 25-Mar. 1, 2019. ( From Applicant's IDS) (Year: 2019).*
APPLE: "Summary of [104#56] [NR/V2X] AS Level Link Management for Unicast", 3GPP Draft; R2-1901900, 3rd Generation Partnership Project (3GPP), Mobile Competence Centre . 650, Route Des Lucio Les . F-06921 Sophia-Antipolis Cedex; France, Mar. 1, 2019, pp. 1-27.

(Continued)

*Primary Examiner* — Mang Hang Yeung
(74) *Attorney, Agent, or Firm* — Flaster Greenberg P.C.

(57) ABSTRACT

Methods, systems, and devices are used to implement BFR, SL-RS for BFD, radio link monitoring, or frequency assisted beam failure recovery, among other things.

15 Claims, 38 Drawing Sheets

(56) References Cited

OTHER PUBLICATIONS

Huawei et al., "Beamforming for V2X sidelink for FRI and FR2", 3GPP Draft; R1-1900862, 3rd Generation Partnership Project (3GPP), Mobile Competence Centre ; 650, Route Des Lucioles ; F-06921, vol. RAN WG1, No. Taipei; Jan. 20, 2019, Jan. 21, 2019-Jan. 25, 2019, XP051593708.

Interdigital Inc: "Discussion on Physical Layer Procedures for NR V2X Sidelink", 3GPP Draft; R1-1902596 Discussion on Physical Layer Procedures for NR V2X Sidelink Final, 3rd Generation Partnership Project T3GPP), Mobile Competence Centre; 650, vol. RAN WG1, no. Athens, Greece, Feb. 16, 2019, Feb. 25, 2019-Mar. 1, 2019.

VIVO: "Discussion on mode 1 resource allocation mechanism", 3GPP Draft; R1-1906138 Discussion on Mode 1 Resource Allocation Mechanism, 3rd Generation Partnership Project (3GPP), Mobile Competence Centre; 650, vol. RAN WG1, No. Reno, USA, May 13, 2019, May 13, 2019-May 17, 2019.

\* cited by examiner (b) No data transmission within a monitoring window/interval due to congestion

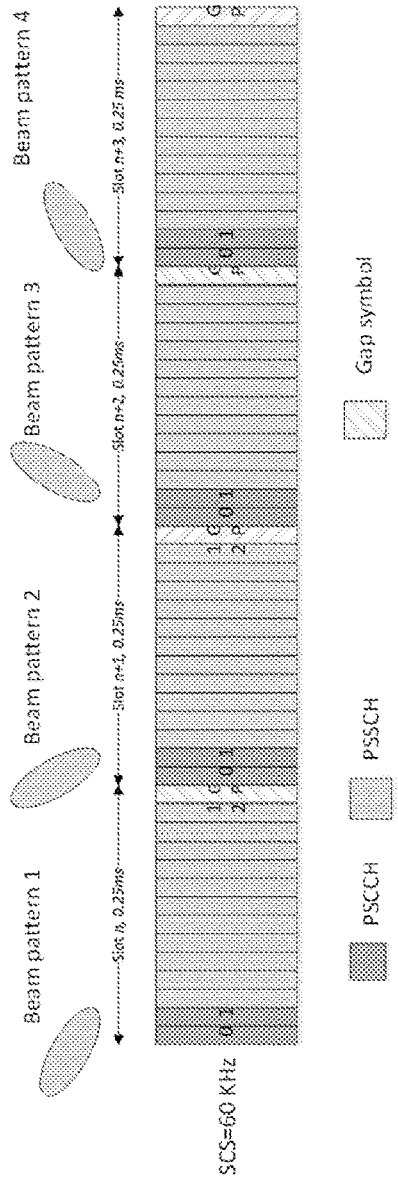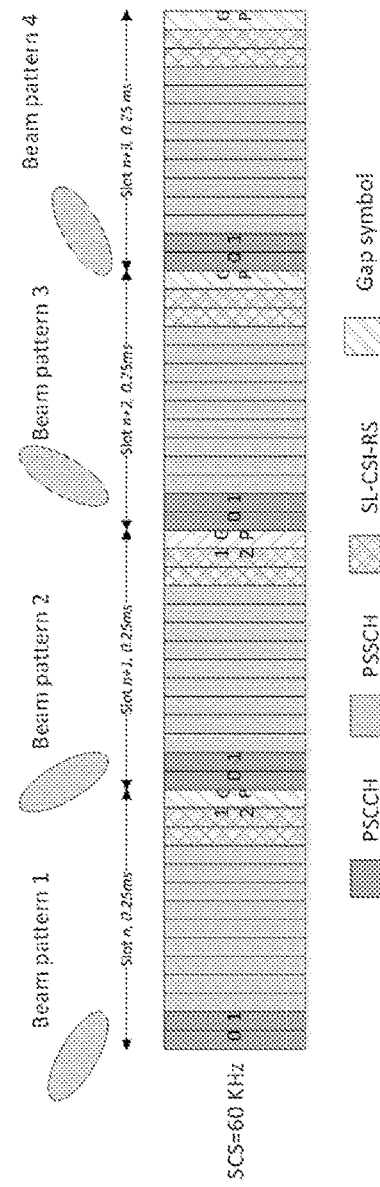
FIG. 8A
FIG. 8B (a) Data transmission within a monitoring window/interval (a) Two SL-CSI-RS transmission with multiple (e.g. 2) panels (b) Two SL-CSI-RS transmission with a single panel

LINK RECOVERY AND SIDELINK BEAMFORMING

CROSS-REFERENCE TO RELATED APPLICATIONS

This application is the National Stage Application of International Patent Application No. PCT/US2020/060041, filed Nov. 11, 2020 which claims the benefit of U.S. Provisional Patent Application No. 62/933,824, filed 11 Nov. 2019, entitled "LINK RECOVERY AND SIDELINK BEAMFORMING", the contents of which are hereby incorporated by reference herein.

BACKGROUND

Long Term Evolution (LTE) vehicle-to-everything (V2X) Transmission Mode: Rel-14 introduces two new V2X communication modes (modes 3 and 4) specifically designed for Vehicle-to-Vehicle Communication (V2V) communications. In mode 3, the cellular network selects and manages the radio resources used by vehicles for their direct V2V communications. In mode 4, V2X user equipment (UE) autonomously select the radio resources for their direct V2V communications. LTE V2X mode 4 can operate without cellular coverage and is therefore considered the baseline V2V mode since safety applications cannot depend on the availability of cellular coverage. Mode 4 includes a distributed scheduling scheme for vehicles to select their radio resources and includes the support for distributed congestion control. In LTE V2X, only broadcast V2X communication is supported.

New Radio (NR) V2X Transmission Mode: Like LTE V2X transmission mode 3 and 4, NR supports two modes, i.e., mode 1 and mode 2 for V2X transmission in Rel-16. In NR V2X, sidelink resource allocation mode 1 and mode 2 are supported. In mode 1, the network (e.g. gNB) schedules the sidelink resources used by the V2X UE for sidelink transmission. In mode 2, V2X UE determines the sidelink resources used for sidelink transmission within the sidelink resources configured by the base station or pre-configured sidelink resources. Mode 1 supports the network (e.g. gNB) to assign the sidelink resources for both dedicated sidelink carrier and shared licensed carrier between Uu and sidelink through the Uu interface. The resources used for sidelink transmission may be dynamically allocated, or pre-configured by the Radio Resource Control (RRC) or based on activation and deactivation. Section 9 Sidelink, 3GPP TS 36.211 V15.5.0 and Section 14 UE procedures related to Sidelink, 3GPP TS 36.213 V15.5.0 are incorporated by reference in their entirety.

This background information is provided to reveal information believed by the applicant to be of possible relevance to the present invention. No admission is necessarily intended, nor should be construed, that any of the preceding information constitutes prior art against the present invention.

SUMMARY

Disclosed herein are methods, systems, and devices associated with BFR, SL-RS for BFD, radio link monitoring, or frequency assisted beam failure recovery, among other things. In a first example, there may be methods or systems for implementing beam failure recovery (BFR) procedures on sidelink (SL). The system may include 1) BFR at a transmitting UE (e.g., TX UE=source UE); or 2) BFR at a receiving UE (e.g., RX UE=target UE).

In a second example, there may be methods or systems for implementing sidelink reference signal (SL-RS) for beam failure detection (BFD) and candidate beam indication (CBI) on sidelink. The systems or methods may include 1) sidelink channel state information reference signal (SL-CSI-RS) based beam failure detection (BFD) or candidate beam identification (CBI); 2) sidelink demodulation reference signal (SL-DMRS) of physical sidelink control channel (PSCCH) based on BFD or CBI; or 3) SL-DMRS of physical sidelink shared channel (PSSCH) based on BFD or CBI.

In a third example, there may be methods or systems for implementing radio link monitoring procedures on sidelink. The systems or methods may include 1) semi-persistent scheduling (SPS) SL-CSI-RS based radio link monitoring; or 2) aperiodic (AP) SL-CSI-RS based radio link monitoring.

In a fourth example, there may be methods or systems for implementing frequency region 1 (FR1) assisted or frequency region 2 (FR2) beam failure recovery.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein:

FIG. 8A illustrates an exemplary burst structure for SCS=60, PSCCH and PSSCH;

FIG. 8B illustrates an exemplary burst structure for SCS=60, PSCCH, PSSCH and SL-CSI-RS;

DETAILED DESCRIPTION

Figure 1:
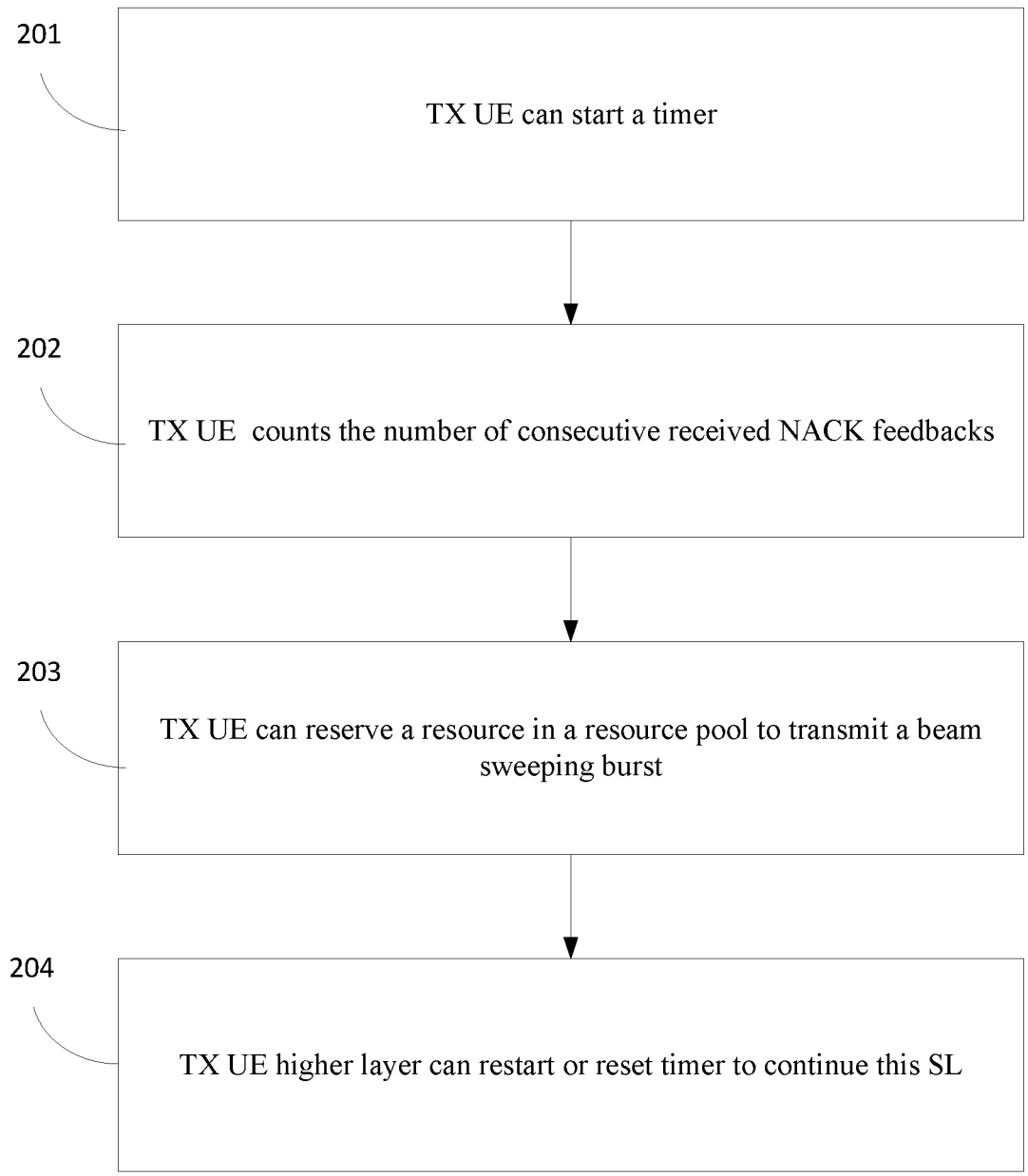
FIG. 1 illustrates an exemplary method for BFR performed at TX/source UE.

In NR, the BFR procedure may include the following steps: Step1: Beam Failure Detection (BFD) by measuring configured periodic CSI-RS(s) or SSB(s) based on hypothetical Block Error Rates (BLER); Step2: Identifying candidate beams by measuring configured periodic Channel State Information Reference Signal (CSI-RS) or synchronization signal block (SSB) based on L1-RSRP; Step3: Transmit Beam Failure Recovery reQuest (BFRQ) upon detecting beam failure on either based on Contention-Free Random Access (CFRA) or Contention-Base Random Access (CBRA) in Release-15, and Physical Uplink Shared Channel (PUSCH) in Release-16; and Step4: Monitoring gNB response.

In LTE V2X, it only supports broadcast. With regard to a first issue is that in NR V2X, it has been agreed to support unicast, groupcast, and broadcast. Therefore, there may be a need for link monitoring to ensure the beamformed channel is above or under a certain quality to prevent radio link failure. In NR Uu (e.g., the radio interface between the UE and the gNB) CSI-RS or SSB are used to derive a hypothetical PDCCH BLER to determine the link quality. In NR Uu, a UE can monitor link quality (e.g., beamformed PDCCH quality) based on SSB, periodical CSI-RS, or both. Sidelink Synchronization Signal (SLSS) may be used to provide sidelink synchronization information (SLI) and SyncRef to other SL UEs. In addition, SLSS may not be SL UE specific, e.g., SLSS is broadcast to vicinity UEs and not for a specific UE. For example, some V2X UEs do not need to transmit SLSS when they have SyncRef. Therefore, it is difficult to identify which V2X UE transmits SLSS. In NR, it has been agreed SL-CSI-RS cannot be transmitted standalone, e.g. SL-CSI-RS is transmitted when there is a triggered V2X communication. Furthermore, network may stop SLSS transmission for a UE. Therefore, on SL communication, both SLSS and SL-CSI-RS cannot be guaranteed to have periodical transmission.

Furthermore, in NR Uu, the UE may compare the quality with the thresholds $Q_{out,LR}$ configured by higher layer parameter rlmInSyncOutOfSyncThreshold for a link. When the radio link quality is worse than the threshold $Q_{out,LR}$, Physical layer will indicate to higher layers. When a measured CSI-RS or SSB quality is better than the threshold $Q_{in,LR}$ based on RSRP, the UE indicates having a new candidate beam. In NR Uu, beamformed link quality can be indicated to higher layer periodically because there are beam training reference signal such as CSI-RS and SS can be transmitted periodically. However, transmitting periodical sidelink CSI-RS (SL-CSI-RS) and SLSS in V2X SL communication may not feasible because SL-CSI-RS cannot be transmitted standalone; e.g., it only can be transmitted when there is a triggered V2X communication and V2X UE transmits SLSS with limitation like either explicitly configured by network or its RSRP is under a threshold with a V2X UE is in coverage. Therefore, the lack of periodical RS for performing beam failure detection is a first issue that should be addressed.

The UE may detect beam failure and may identify the candidate beam based on the periodical RS like SSB and periodical CSI-RS in NR link recovery procedure. With regard to a second issue, in NR Rel-15 link recovery procedure, a UE sends beam failure recovery request (BFR) to gNB using contention-free random access (CFRA) or contention-based random access (CBRA); and the UE monitors the response from gNB assuming it is QCL-ed with the indicated candidate beam. However, in NR V2X communication, random access procedure is not supported. In Rel-16; preferred candidate beam can be reported via PUCCH or PUSCH approaches.

Link recovery procedure on SL is a second issue that needs to be addressed without having the periodical reference signal transmission in Uu. Link recovery procedure on SL should be addressed to indicate the preferred candidate beam or reference signal and how the BFR is reported on SL without using random access channel as Uu.

Link recovery procedures on SL: To establish a unicast connection on sidelink, the discovery announcement procedure which a UE (e.g., source UE) may transmit the discovery message, e.g., "I am here.", or "who is there?" via PSSCH or dedicated physical sidelink discovery channel to neighbor or vicinity UE(s) should be completed. When a unicast connection is established after discovery has completed between the announce UE and response UE, a UE may start transmitting unicast data to the other UE on sidelink. Thereafter, denoted herein, the UE transmitting sidelink data as TX or source UE and the UE monitor and receiving the transmitted data as RX or target UE. On SL, a UE may need to monitor multiple SL transmissions at a same time no matter whether the UE is the same SyncRef UE or not.

At NR Uu interface, Beam Failure Recovery (BFR) or link recovery procedure may involve the following steps: e.g., Beam Failure Detection (BFD), Candidate Beam Identification (CBI), Beam Failure Request (BFRQ), and Beam Recovery Response (BFR) from network. However, on SL communication, NR Uu BFR procedure may not be suitable for SL BFR. For instance, on SL, there may be no periodical beamformed reference signal like CSI-RS or SS will be guaranteed to be transmitted because aperiodic transmission property on SL communication. In addition, the receive UE may leave or be away from the transmit UE after a certain period. Those cases could result in no SL data transmission in a reporting or monitoring period for beam or link monitoring on sidelink. In this scenario, UE may decide whether there is a need to maintain the link or not on SL communication. In other word, if the transmit UE has nothing to transmit or due to data traffic congestion in a reporting or monitoring period, equivalently, there may be no reception data at the receive UE. In this case, the receive UE may not perform BFD, find the candidate beams, and trigger beam failure request (BFRQ). Therefore, link recovery procedure on SL should consider when there is nothing to measure and thus to report or indicate to the higher layer by an RX UE.

Disclosed herein beam failure recovery (BFR) may be supported for beamformed SL communication with the following options for BFR: 1) BFR performed at TX/source UE; 2) BFR performed at RX/target UE; or 3) FR2 BFR assisted by FR1.

BFR performed at TX/source UE: If TX UE performs beam failure recovery, then there may be no need to trigger the beam failure request (BFRQ) as Uu link recovery procedure and link recovery procedure may be simplified. In this case, TX UE may be responsible for beam switching and management to maintain the radio link quality. The BFRQ in TX UE may not be required. Disclosed below are options for BFR performed at TX/source UE side to omit BFRQ.

For a first option, there may be BFR based on HARQ-A/N feedback (FIG. 1). At step 201, TX UE may start a timer $T_1$ (e.g., in ms, slots, or subframes) after the link establishes with the RX UE. Timer $T_s$ may be equal to a time duration (e.g. 100 ms) of the intended transmission for the TX UE to the Rx UE. A TX UE may monitor one or more unicast transmissions on SL, for example, i=1, . . . $L_{SL}$, where $L_{SL}$ is dependent on UE's ability. Each unicast link may be associated with an independent timer $T_1$.

At step 202, TX UE (e.g., PHY or MAC layer) may count the number of consecutive (e.g., accumulated) received NACK feedbacks or no feedback (e.g. DTX) from RX UE. If the number of consecutive-received NACK or no feedbacks exceed a certain (pre-) configured threshold N, then TX UE physical layer may report a beam failure indication to a higher layer for indicating the link failure (e.g., failure on link i). The threshold may be (pre-) configured by RRC for mode 1 or by PC5 RRC for mode 2. RRC or PC5 RRC may provide a threshold list (or multi-level threshold) for different QoS or priority requirements for TX UE to select the threshold. For example, it can be based on the priority of the intended transmission, number of transmission or the network congestion, etc. Another approach is that no feedback and NACK feedback may be treated differently, such as (1) having different thresholds for NACK feedback and no feedback respectively; (2) gives larger weighting (e.g. higher scores) for no feedback case than NACK case. Sidelink can determine no-feedback and NACK cases separately since no feedback case can be treated as more serve or bad channel condition than NACK case. For a sidelink when RX UE cannot successfully decode the control information on PSCCH, the RX UE has no (e.g. NACK) feedback to TX UE or is still able to decode the PSSCH and transmitted a feedback (e.g. NACK or ACK) to TX UE.

At step 203, upon a higher layer receiving one or more beam failures from physical layer and if no ACK indication (including no-feedback) is received from physical layer before timer $T_1$ expiry, then TX UE may attempt to reserve a resource in a resource pool to transmit a beam sweeping burst. In mode 2, TX UE may reserve the resource pool to transmit a beam sweeping burst based on sensing (e.g., long or short sensing) or TX UE can transmit the beam sweeping burst on a resource in a resource pool. A beam sweeping burst is a composite of several blocks, in which PSCCH and PSSCH will be transmitted in each block for instance. The content of PSSCH may be based on the retransmission of previous data. The number of blocks in a burst may be dependent on numerology, e.g. on FR2 with subcarrier spacing (SCS) is equal to 120 KHz, the maximum number of blocks per burst is 32. The reserved HARQ-ACK/NACK resource in a resource pool may be for RX UE to feedback or acknowledge, thus TX UE can know which preferred beam for link recovery. In mode 1, TX UE can send a request to network for reserving the resource or use configured grant resource to transmit a beam sweeping burst and HARQ-ACK/NACK feedback resource. More detail of beam sweeping burst and feedback resources is addressed herein. After the beam sweeping burst transmission, TX UE may start a timer $T_2$ and behaviors as follows in Table 1.

TABLE 1

If timer $T_2$ is not expired, then TX UE keep monitoring the feedback from RX UE
    If TX UE receives one ACK then
        TX UE sends an indication(s) to higher layer and TX UE continues
        (re)transmission with RX UE; stop timer $T_2$ and reset timer $T_1$ if timer TABLE 1-continued

```
T₁
    expire
else
if timer T₁ is not expired then
    TX UE perform (re)transmitting the beam sweeping burst and restart
    timer T₂
else
    goes to Step 4
end
```

At step 204, if sidelink link fail does not occur or no beam failure indication no send to the higher layer upon the expiry of timer $T_1$, then TX UE higher layer (e.g., MAC) may determine restarting or resetting $T_1$ timer for continuation of this SL when TX UE still has data to transmit to RX UE (e.g., based on sidelink buffer status report), or TX UE may decide to terminate this SL and perform rediscovery procedure if there is no intention to send the data to RX UE.

For a second option (FIG. 2), there may be BFR based on detection of "no-feedback" when HARQ-A/N is enabling. Step 211 is the same as step 201. At step 212, TX UE may count the number of (e.g. consecutive or accumulated) no-feedbacks (e.g. neither ACK nor NACK feedback in between) from RX UE that exceed a certain (pre-) configured threshold N', then TX UE physical layer may report a beam failure indication to higher layer for indicating this link (e.g., link i) failure, When RX UE cannot successfully decode PSCCH, it will result in no feedback (e.g. NACK) to TX UE. The threshold may be (pre-) configured by RRC for mode 1 or by PC5 RRC for mode 2.

Step 213 is the same as step 203.
Step 214 is the same as step 204.

Figure 2:
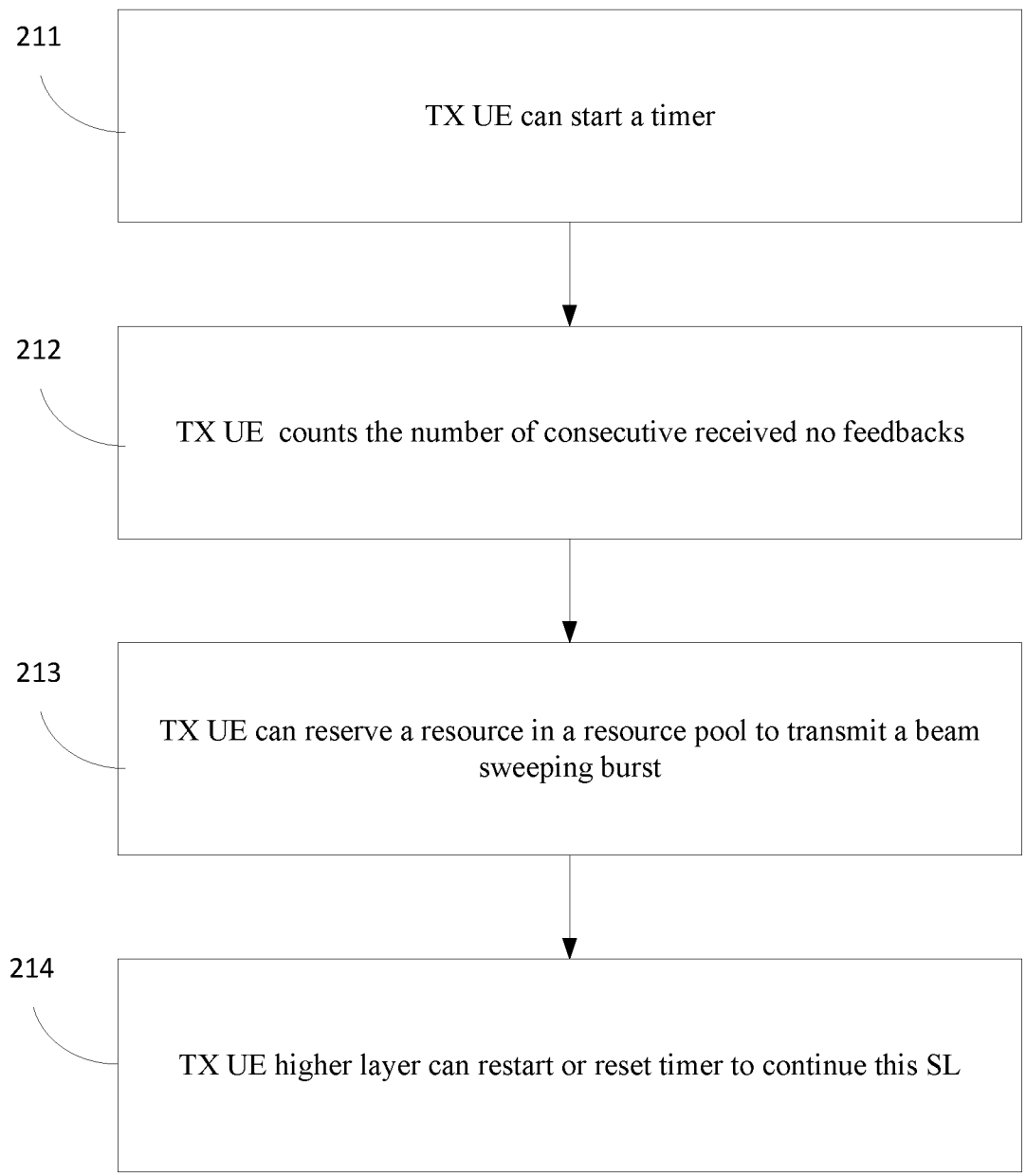
FIG. 2 illustrates an exemplary method for BFR performed at RX/target UE.

With regards the methods of FIG. 1 and FIG. 2, there is a case that if the number of measured samples is too low then it may impact the beam failure detection. This impact is because the threshold may be set improperly to impact the declaration of the beam failure detection. The measured samples may be defined as the number of collected feedback (e.g., the number of NACK or no-feedback) in a period. However, if the number of measured samples is too low in a period then this may be equivalent to the case that the number of PSSCH(s) transmission is low in the same period. Hence, disclosed below are ways that may address this issue. In a first way, TX UE may force transmission of "dummy data" (or "zero-padded" data) to RX UE to increase the number of measured samples in a period. The detail implementation of "zero-padded" data please refer to "zero-padded" PSSCH herein. In a second way, TX UE may use a multi-level threshold to determine whether to declare a beam failure or not. The multi-level threshold may be dependent on number of transmitted PSCCH and PSSCH, e.g., the number of expected feedbacks from RX UE if HARQ feedback is enabled.

For a third option (FIG. 3), there may be BFR based on monitoring feedback channel, (e.g., measuring PSFCH channel quality). Step 221 may be the same as step 201.

At step 222, TX UE may monitor feedback channel PSFCH(s) quality. The measurement may be based on a (pre-)defined metric (e.g., L1-RSRP, RSRQ, SINR, or hypothetical BLER) under a certain (pre-)configured threshold, then TX UE physical layer may report a beam failure indication to higher layer for indicating this link (e.g., link i) failure. When there is no SL-CSI-RS case, RSRP, RSRQ or hypothetical BLER can be based on other SL reference signal e.g. SL-DMRS of PSFCH, as the performance metric for determining the SL channel quality. For sequence based PSFCH, e.g. PUCCH-format-0 like, may use RSSI or SINR as performance metric. The feedback channel PSFCH may share the spatial information as PSCCH. If PSFCH is sequence based, then PSFCH signal (e.g. sequence) may be used for measurement. If PSFCH is modulation based (e.g., coding based) with SL-DMRS, then SL-DMRS for PSFCH can be used for measurement (e.g., RSRP). The feedback PSFCH may use the following feedback channel: 1) PSFCH for HARQ-ACK/NACK, 2) PSFCH for HARQ-ACK/NACK with CSI, or 3) PSFCH for CSI Monitoring PSFCH quality can be an analog to monitor PSCCH quality from a RX UE when PSFCH use the same spatial information of SL-DMRS for PSCCH. Besides, if TX UE detect a "no feedback" from RX UE, then TX UE may also count this sample into L1-RSRP SINR, or hypothetical BLER calculation.

Step 223 may be the same as step 203.
Step 224 may be the same as step 203.

Figure 4:
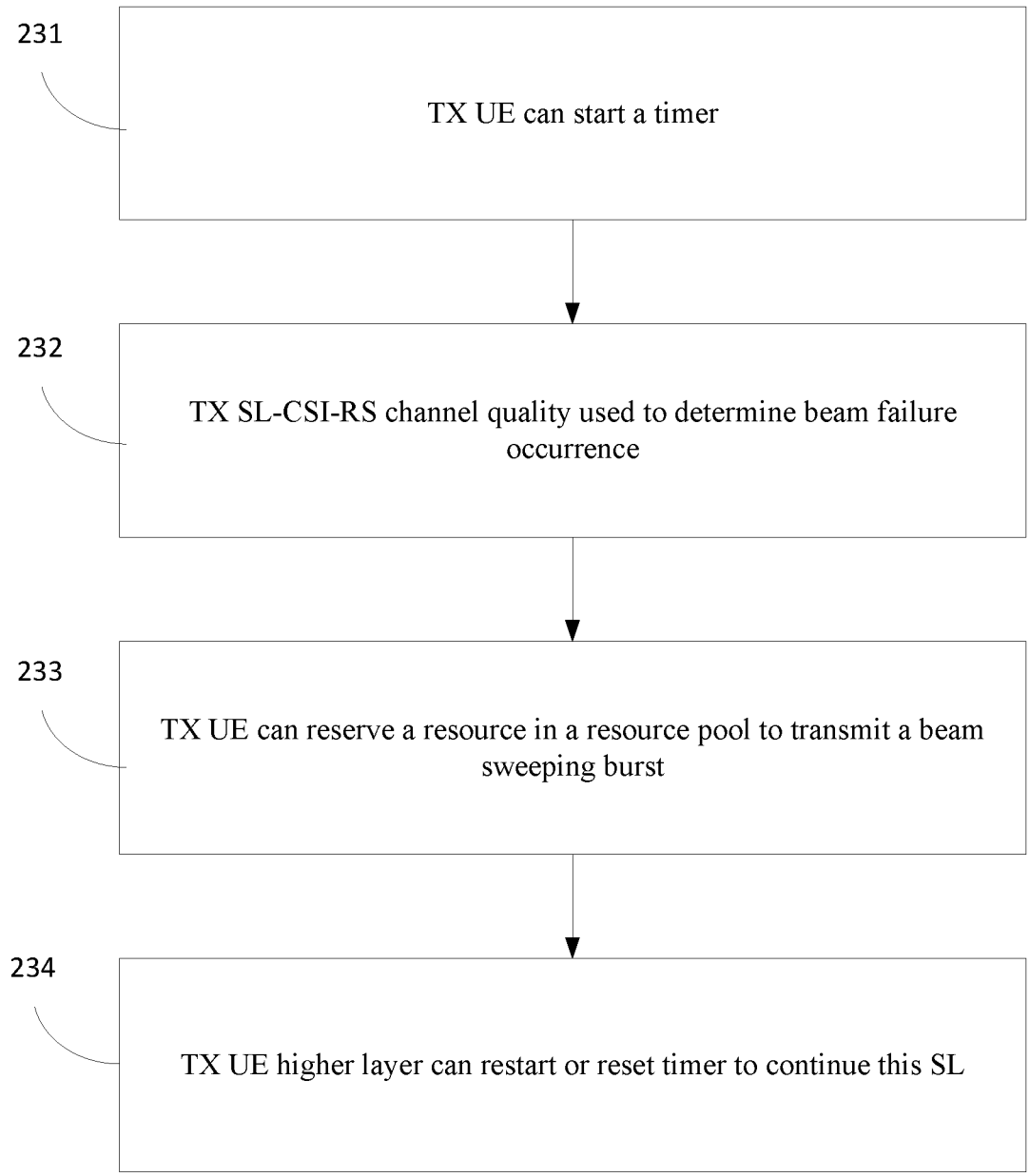
FIG. 4 illustrates an exemplary method for BFR based on monitoring RX UE SL-CSI-RS reporting.

For a fourth option, there may be BFR based on monitoring RX UE SL-CSI-RS reporting (FIG. 4). Step 231 may be the same as step 201.

At step 232, SL-CSI-RS channel quality can be used for determination whether there is a beam failure occurring or not. RX UE may measure the received SL-CSI-RS and report the metric (e.g. L1-RSRP/RSRQ, SINR, or hypothetical BLER) to TX UE. The feedback of SL-CSI-RS reporting may use PSFCH or PSCCH and PSSCH. When TX UE receive the channel quality report then TX UE may decide whether there is a beam failure that should be reported to a higher layer for indicating this link (e.g., link i) failure or not. In mode 2, if feedback reporting uses sidelink control channel (e.g. PSCCH) and data channel (e.g. PSSCH) for RX UE, then the feedback resource for RX UE can be based on the following approaches: (1) RX UE may reserve or select a resource via channel sensing, or (2) TX UE can reserve a resource in advance for RX UE transmitting the feedback. If the feedback channel is based on a dedicated SL data channel e.g., PFSCH then TX UE may reserve a resource for RX UE in advance for RX UE transmitting the feedback. For SL mode 1, network may reserve a resource in advance for RX UE. SL-CSI-RS quality can be analog to monitor PSCCH quality when SL-CSI-RS is QCLed with RX UE PSCCH. If TX UE cannot detect the RX UE SL-CSI-RS where there is an expected feedback from RX UE then TX UE may also count this sample into L1-RSRP SINR/RSRQ, or hypothetical BLER calculation.

Step 233 may the same as step 203.
Step 234 may the same as step 204.

Figure 5A:
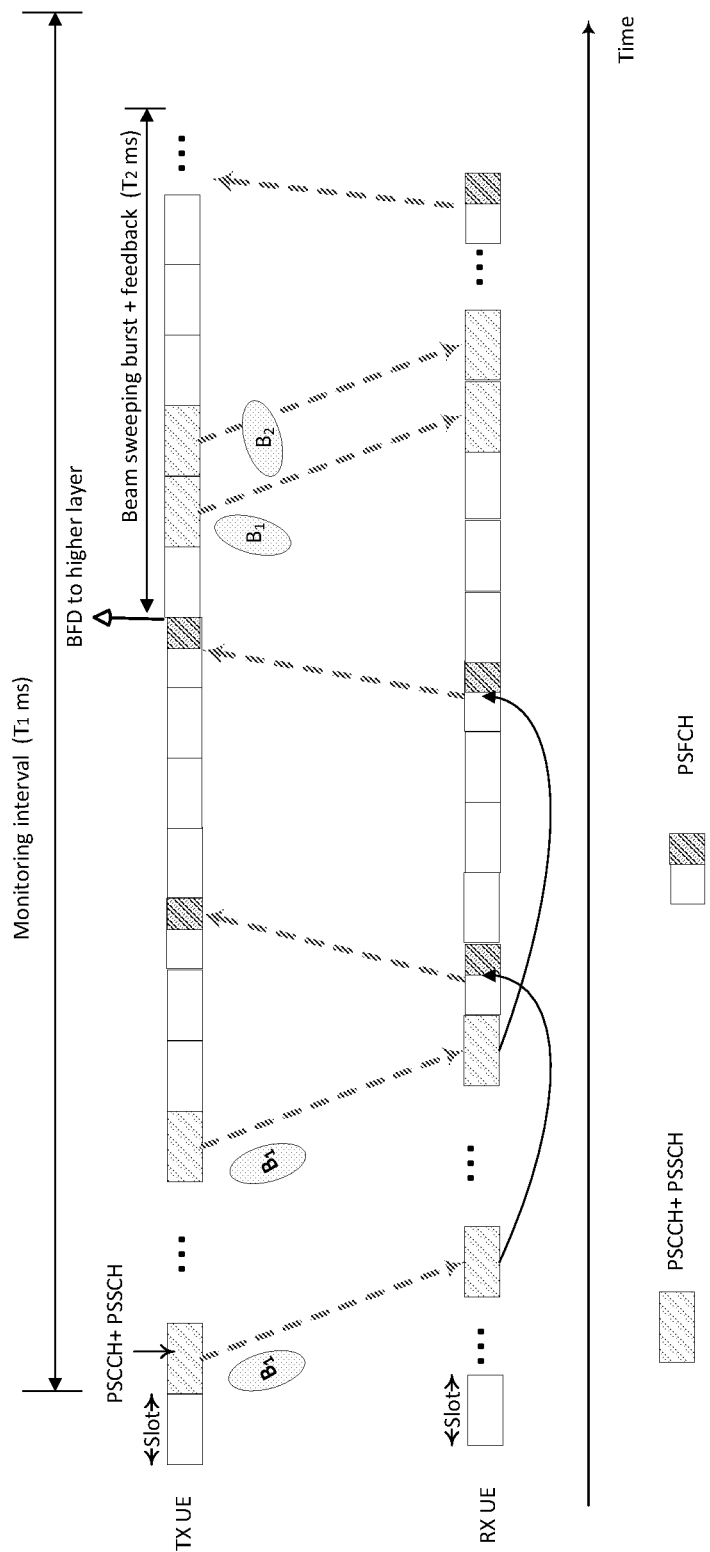
FIG. 5A illustrates exemplary link recovery method for SL with data transmission.
Figure 5B:
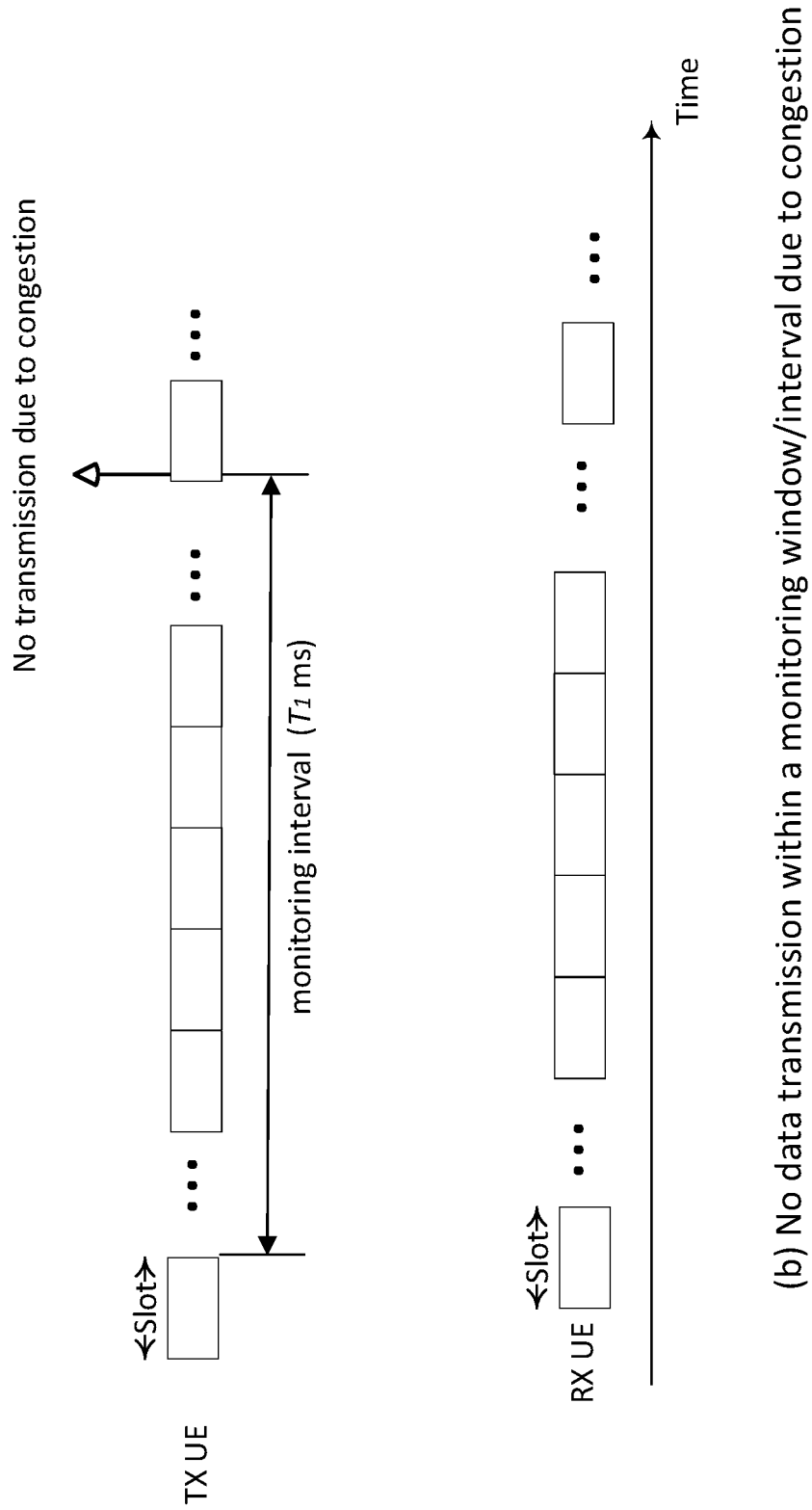
FIG. 5B illustrates exemplary link recovery method for SL with no data transmission due to congestion in a period.
Figure 6:
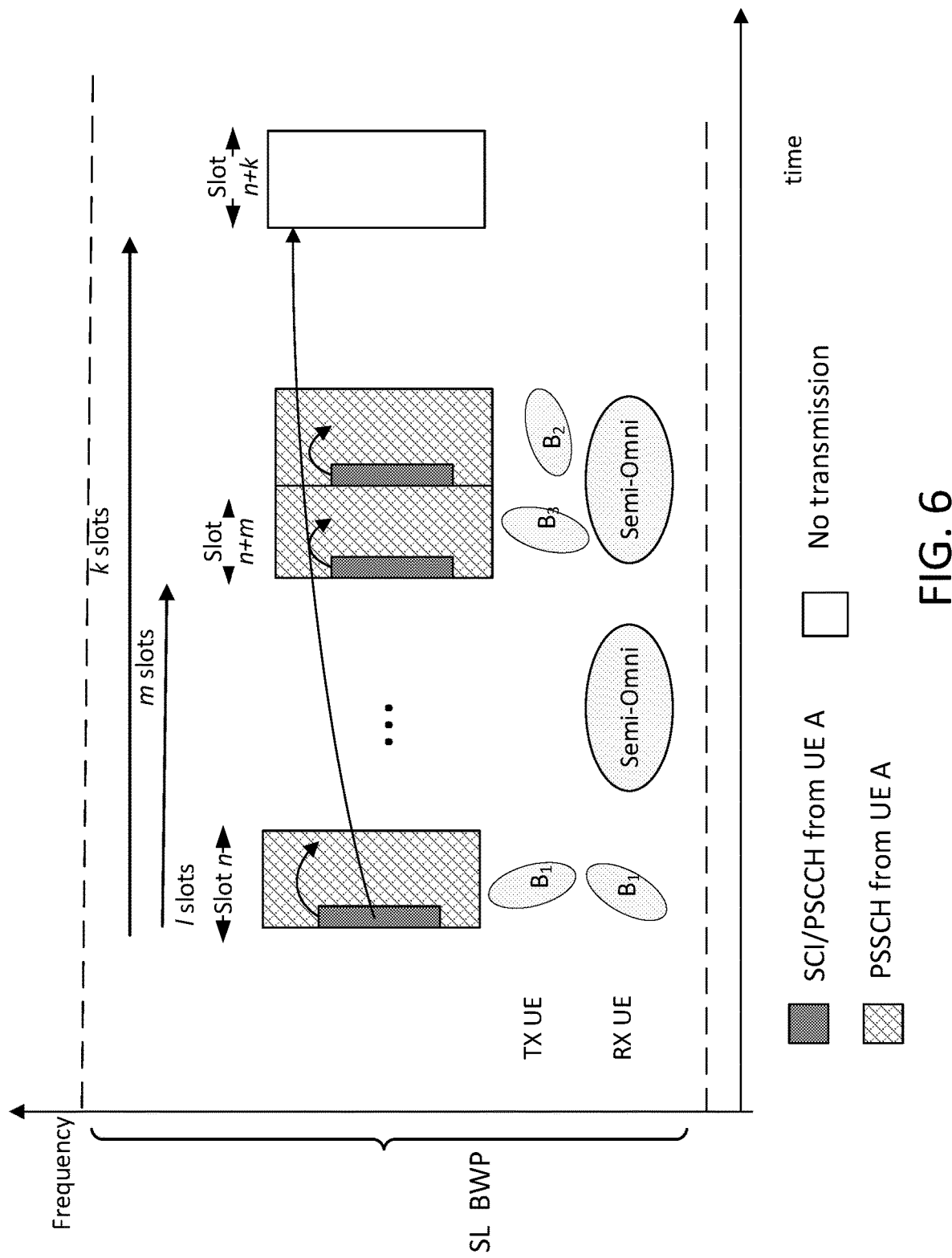
FIG. 6 illustrates an exemplary resource selection for a beam sweeping burst by TX UE and RX UE may monitor the beam.
Figure 7:
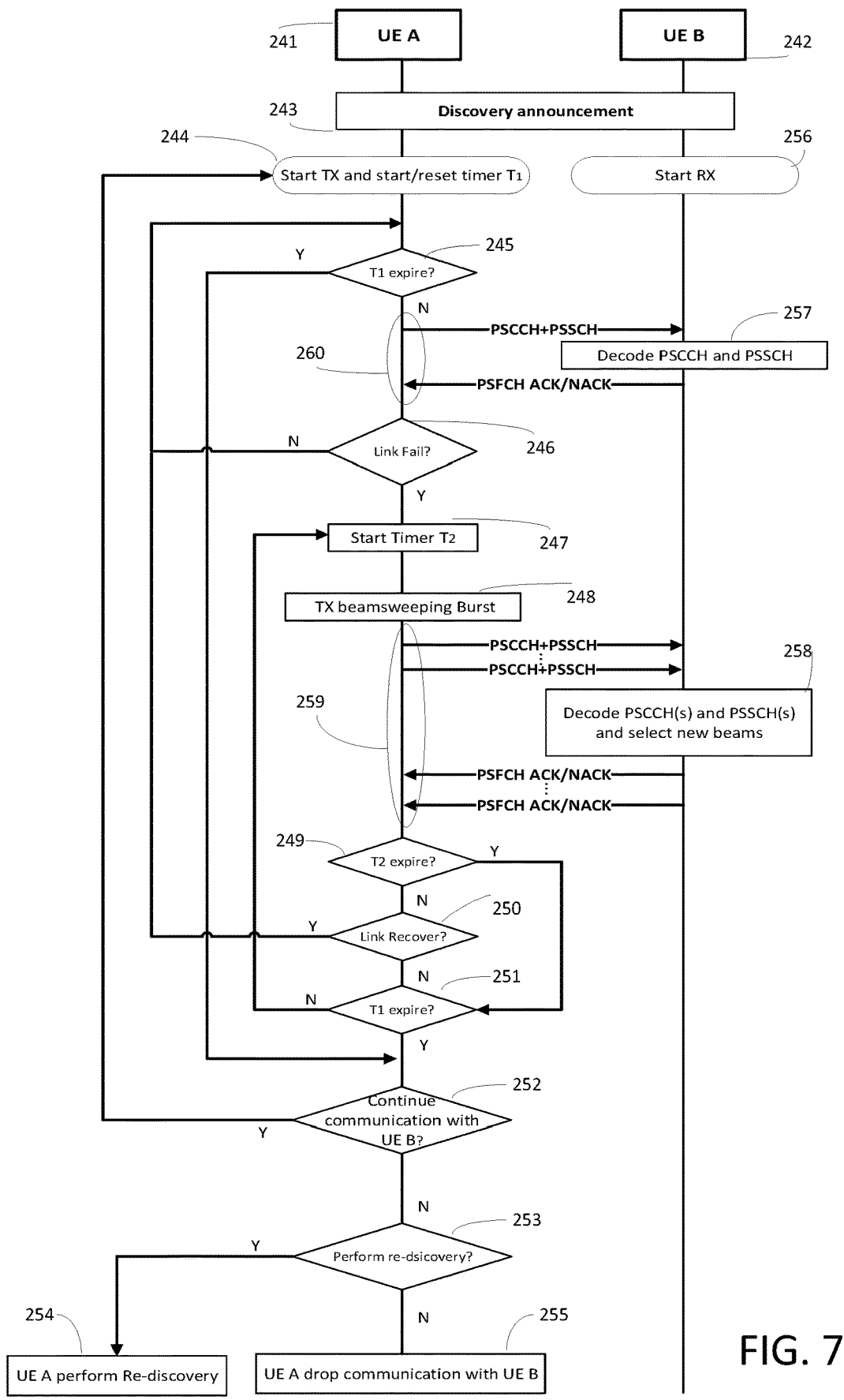
FIG. 7 illustrates an exemplary (TX) UE behavior for link recovery on SL.

The timing relation for the disclosed methods for a link when there is data transmission or no data transmission due to congestion is illustrated in FIG. 5A and FIG. 5B, respectively. If TX UE cannot send unicast data to RX UE during $T_1$ period because of congestion (e.g. no reserved resource for data transmission during $T_1$), then TX UE may keep timer $T_1$ running and report "no transmission due to congestion" to higher layer when $T_1$ timer expires as shown in FIG. 5B. In this case, TX UE may decide whether to maintain this link or perform rediscovery procedure.

A TX UE that handles link recovery may have the following advantages than handling at RX UE. First, RX UE cannot know PSCCH transmissions from TX UE when PSCCH decoding is failed. Second, accurate PSCCH decoding performance may be difficult to measure by a few PSCCH receptions. UE procedure for the disclosed method is summarized in FIG. 3.

Figure 3:
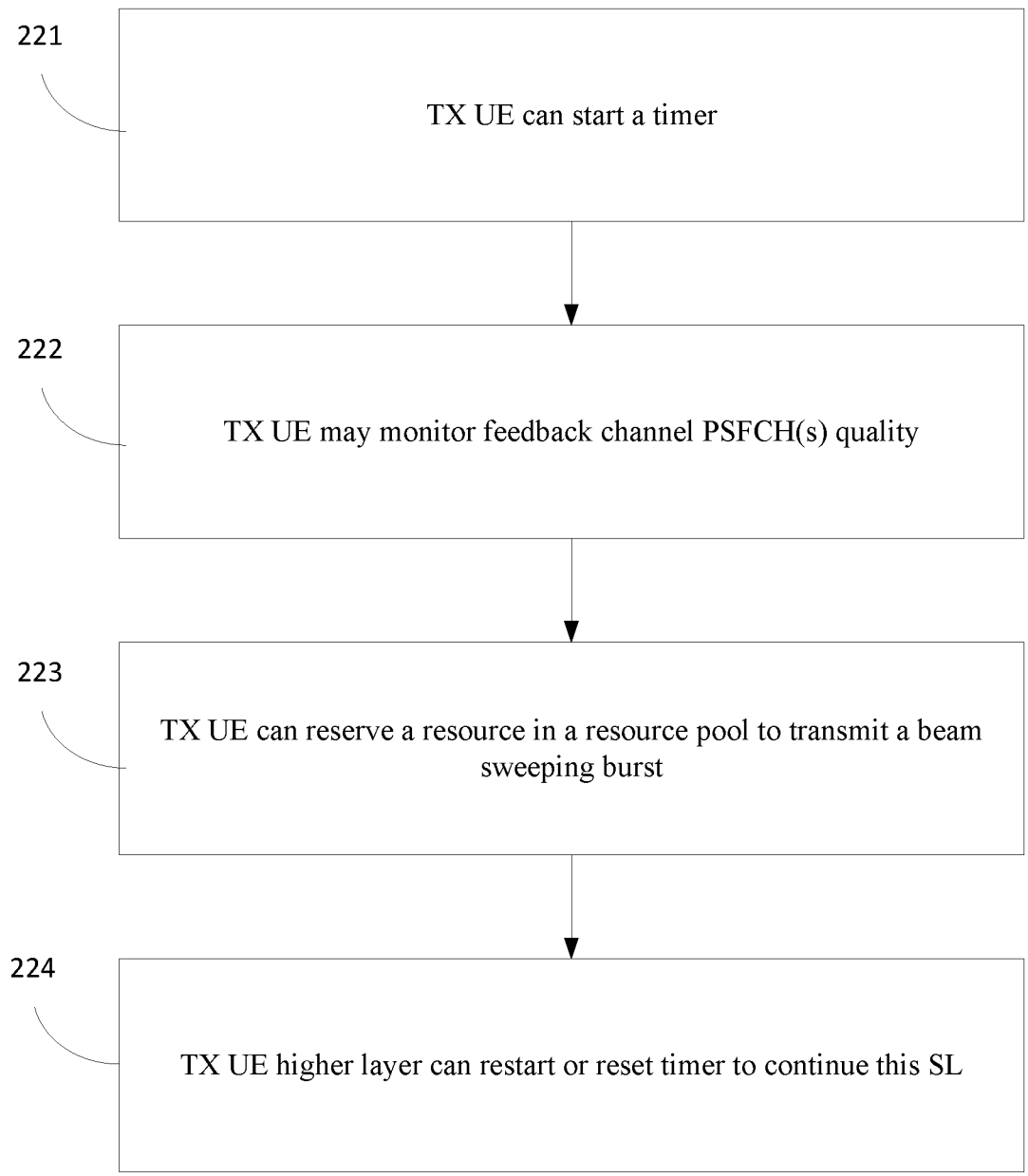
FIG. 3 illustrates an exemplary method for FR2 BFR assisted by FR1.

With continued reference to FIG. 3, at step 253, a discovery announcement procedure may occur. The discovery announcement procedure may involve UE 241 and UE 242. Subsequent to the discovery announcement procedure, there may be a start of TX and start/reset of timer T1 at UE 241. At step 245, there is determination of whether T1 expired. If T1 expired then proceed to step 252, if T1 not expired then proceed to step 260. Step 260 may include sending PSCCH+ PSSCH to UE 242 or receiving PSFCH ACK/NACK from UE 242. At step 246, UE 241 may determine a link failure. If no link failure, then proceed to step 245, but if there is a link failure proceed to step 247 (start timer T2). At step 248, UE 241 does TX beam sweeping burst. At step 259, there may be more sending PSCCH+PSSCH to UE 242 or receiving PSFCH ACK/NACK from UE 242. At step 249, UE 241 determines whether T2 expires, if so, then proceed to step 251. If T2 is not expired, then determine whether link recovered at step 250. If link is not recovered then proceed to step 251, if the link is recovered then proceed to step 245.

At step 252, determine whether to continue communication with UE 241. If no continued communication with UE 242 then determine whether re-discovery should be performed at step 253. If yes, then proceed to perform rediscovery at step 254, if no, at step 255 then UE 241 may drop communication with UE 242.

With continued reference to FIG. 3, UE 242 may start RX. At step 257 and at step 258, UE 242 may decode received PSCCH and PSSCH or select new beams.

Beam sweeping burst: A TX UE (e.g., UE 241) may transmit a beam sweeping burst for link recovery. A beam sweeping burst is composited by multiple beamformed blocks and a beamformed block may be a NR (SL) slot, multiple SL slots or a SL slot may contain more than one beamformed blocks. For example, in a beamformed block may contain PSCCH, PSSCH, or SL-CSI-RS. The content of PSSCH may be based on the initial transmission of a new data, retransmission of a previous data, or dummy data. The maximum number of beamformed blocks in a burst may be dependent on the numerology. For example, as listed follow, the actual number of beamformed blocks transmissions within one burst period is (pre)configurable for supported NR numerology, as shown in Table 2.

TABLE 2

- For FR1:
  - For 15kHz SCS, {1}
  - For 30kHz SCS, {1, 2}
  - For 60kHz SCS, {1, 2, 4}
- For FR2:
  - For 60kHz SCS, {1, 2, 4, 8, 16}
  - For 120kHz SCS, {1, 2, 4, 8, 16, 32}

It may be up to TX UE (e.g., UE 241 or WTRU 102a); TX UE can decide the number of beamformed blocks in a (beam sweep) burst for link recovery. For example, for 60 kHz SCS, UE can transmit 1, 2, 4, 8, or 16 beamformed blocks.

A UE (e.g., UE 241) may assume each beamformed block duration may be equal to one slot or mini-slot duration.

In mode 2, when a TX UE transmits a data packet at a slot n, TX UE may reserve a resource for next transmission at slot n+k, e.g., after k slots or RX UE can derive the reserved resource for PSSCH transmission. For instance, the reserved resource information may be carried via TX SCI for next transmission being reserved by TX UE. Therefore, RX UE can transmit in the next reserved resource with the RX beam (i.e., TX UE and RX UE has established a beam correspondence) to TX UE. TX UE also may reselect the resource for the transmission resource(s) based on the number of TX blocks and HARQ-ACKNACK feedback (e.g., TX UE may reserve a new resource for both data and feedback resources for RX UE). In addition, RX UE should monitor the SL resource from other UEs transmission unless the reserved resource (e.g., a slot) is known to RX UE from a specific TX UE (e.g., from the previous transmission by TX UE). As shown in FIG. 2, RX UE monitors the received data at a timeslot n from TX UE with a correspondence beam and TX UE also reserve the next transmission opportunity after k slots. Therefore, RX UE expects to use the same (correspondence) RX beam to receive the data after k slots. However, if beam failure is detected/occurred before the next transmission which it is reserved by TX UE, then TX UE may reselect a new resource to transmit a beam sweeping burst for link recovery. In this way, RX UE may try to receive and attempt to decode the beam sweeping burst (e.g. a beam sweeping burst is comprised with multiple beamformed blocks), via (semi)-omni direction beam pattern. When a block is successfully detected (e.g., the PSCCH and PSSCH are successfully decoded), then RX UE identify the new beam for link recovery.

In mode 1, TX UE may send a request to the network (e.g., Node-Bs 140a, 140b, or 140c) to reserve and select a resource for beam sweeping burst transmission. Like mode 2 case, the new selected resource and dynamically scheduled SL resource will not overlap the resource which is reserved by the previous transmission.

Figure 8C:
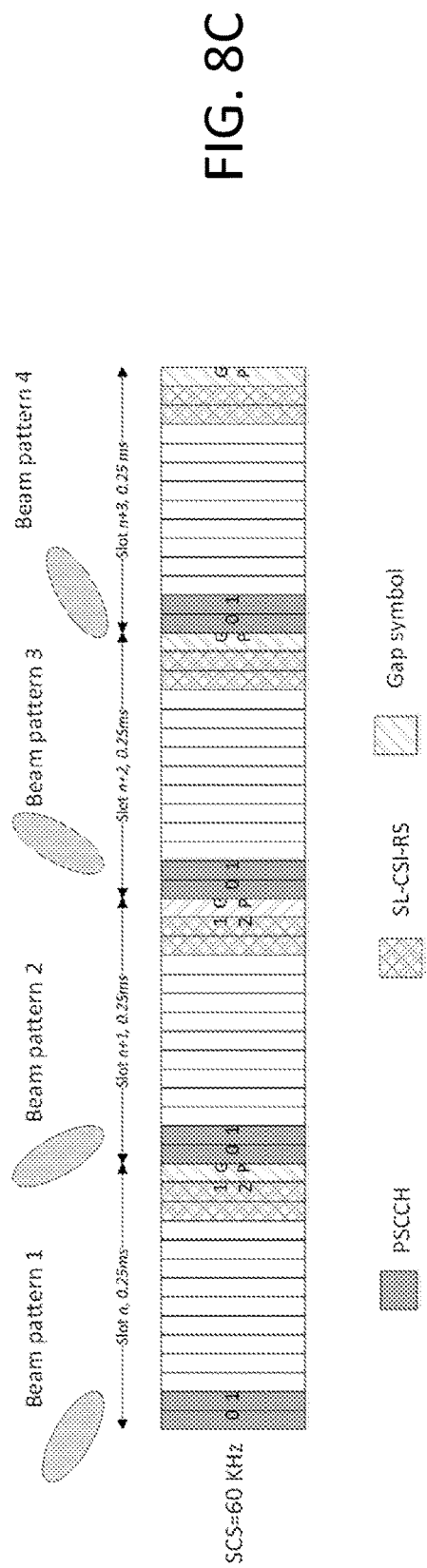
FIG. 8C illustrates an exemplary burst structure for SCS=60, PSCCH and SL-CSI-RS.
Figure 8D:
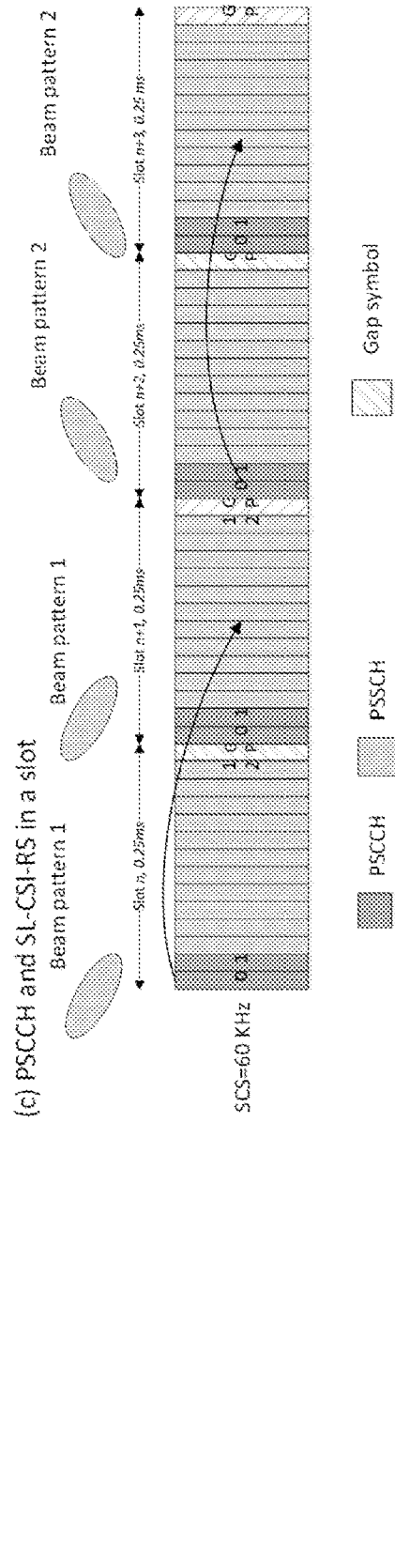
FIG. 8D illustrates an exemplary burst structure for SCS=60, PSCCH reserve repetition slots.

In each slot, a beam sweeping block may be composed of PSCCH and PSSCH, PSCCH and PSSCH and SL-CSI-RS, or PSCCH and SL-CSI-RS. An example burst with 4 blocks for 60 kHz SCS and 8 blocks for 120 kHz SCS are shown in FIG. 4A-FIG. 4D, when subcarrier spacing is equal to 60 KHz (a) PSCCH and PSSCH, (b) PSCCH, PSSCH and SL-CSI-RS and (c) PSCCH and SL-CSI-RS, respectively. If SL-CSI-RS and PSCCH are transmitted in a same slot or within a time duration (e.g. multiple slots), then RX UE can assume SL-CSI-RS and SL-DMRS PSCCH are QCLed. In addition, TX UE can decide the spatial information for each beamformed block in a beam sweeping burst. If reserved multiple slots for PSCCH repetition transmission for enhancing reception (the repetition can be signaling by PSCCH, SL-MAC-CE or SL-RRC signaling), then RX UE can assume reserved slots for PSCCH repetition transmission are QCLed (e.g., using the same spatial information) as shown in FIG. 8D. For example, in FIG. 8D, two slots are reserved for the repetition transmission.

To avoid the unnecessary of beam switching between PSCCH and PSSCH for SL transmission, RX UE may assume PSCCH and PSSCH are QCL (e.g. SL-DMRS for PSCCH and PSSCH with Doppler shift, Doppler spread, average delay, delay spread, spatial Rx parameter) in a same slot (or we suggest PSSCH and PSCCH are using a same beam/spatial information). The last symbol in a slot is reserved for a gap symbol. The feedback of RX UE can be based on implicit or explicit method, as described herein.

Figure 9:
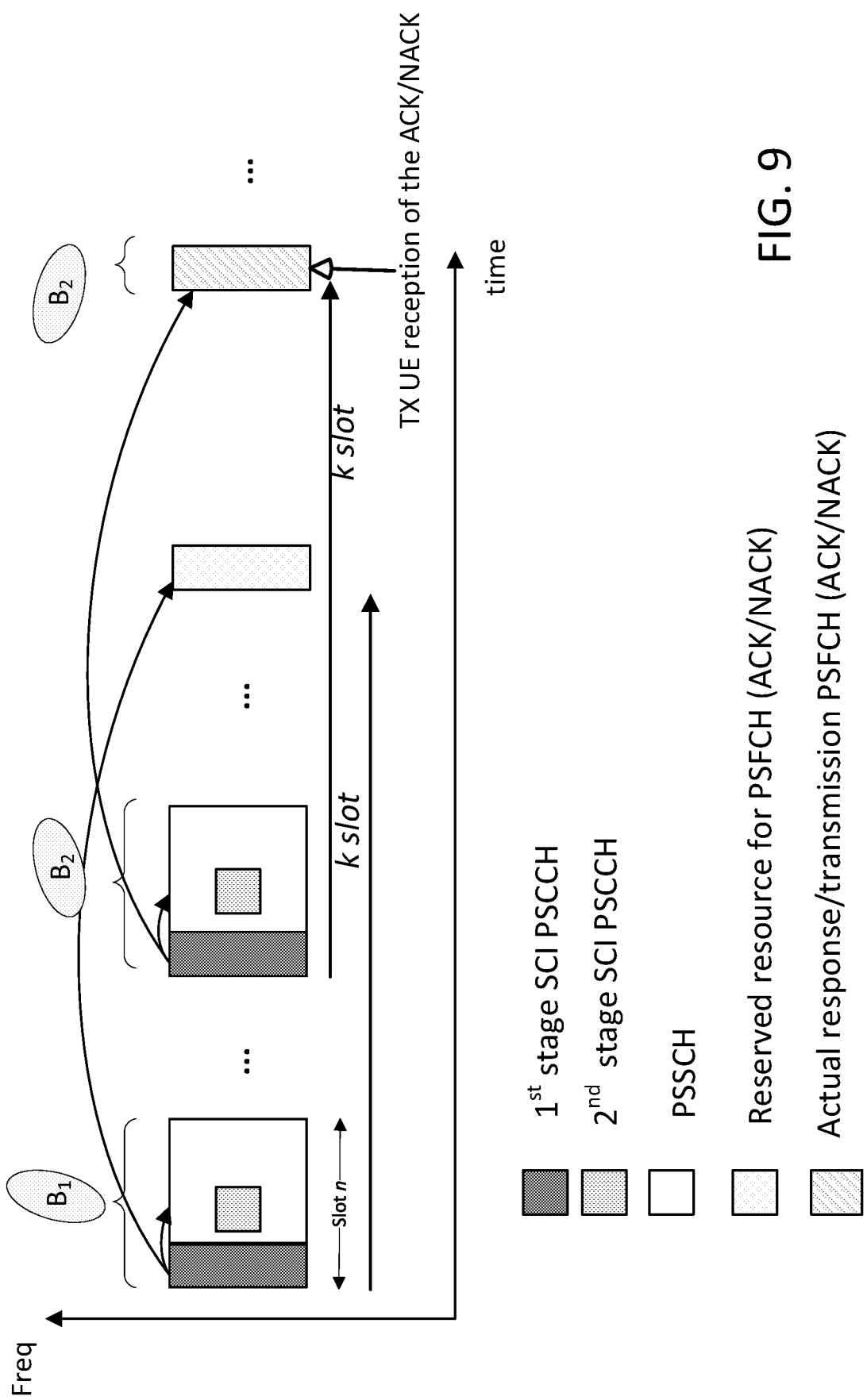
FIG. 9 illustrates an exemplary reserved acknowledgement/negative-acknowledgement (ACK/NACK) resource as implicit beam indication.

Implicit beam ID feedback: FIG. 9 illustrates an exemplary reserved ACK/NACK resource as implicit beam indication. We propose the SL resources for ACK/NACK feedback can use the following approach, first, TX UE reserve the SL resources for feedback resource in advance, second, RX UE can derive ACK/NACK feedback resources either from the received PSCCH or PSSCH. Disclosed herein, each transmission block may be mapped to a beam (or multiple beams) and each transmission block (e.g. a transmission block duration is a SL slot duration or multiple slots) can be associated/mapped with a SL resource for feedback. Once RX UE can successfully detect and decode one of the beamformed slots, then TX UE is able to receive the ACK/NACK from RX UE in the reserved SL. Therefore, in this way, it can be avoid to transmit the beam (or spatial information) identifier for either in SCI, PSSCH or both. In addition, RX UE may determine the preferred transmit beam. For example, if 2-stage SCI is applied, the 2-stage SCI indicates the reserve the ACK/NACK resource for RX UE response. For example, in this case, $1^{st}$ stage SCI only carry target ID and $2^{nd}$ stage SCI carry the reserve ACK/NACK resource. In a beam sweeping block, it may be assumed PSCCH and PSCCH are QCLed. Since each reserved ACK/NACK (PSFCH) resource should not overlap in a same time slot, hence, TX UE is able to distinguish which block is successfully decoded by RX UE, thus beam correspondence may be completed without the block identifier. For example, in FIG. 8A-FIG. 8D, two beamformed slots are transmitted and two separate ACK/NACK (PSFCH) are reserved. The $1^{st}$-stage SCI indicates the reserved resource for PSFCH. In this example, RX UE successfully decode the $2^{nd}$ beamformed slot and TX UE expect to receive the ACK/NACK after k slots of the transmit $2^{nd}$ beamformed slot. Therefore, there is no ambiguity in the reception of PSFCH and TX UE can distinguish which PSFCH is from which transmit beamformed slot. In this way, without embedding the beam or block identifier in SCI or data. The beam correspondence can be quickly established, and the link is restored. The feedback can be based on the following: 1) RX UE may feedback a single HARQ-ACK/NACK and transmit the feedback channel (PSFCH) to TX UE, in which RX UE may choose the best link quality for feedback; or 2) RX UE may feedback multiple HARQ-ACK/NACK and transmit the feedback channel (PSFCH) at the correspondence reserved feedback resource.

Figure 10:
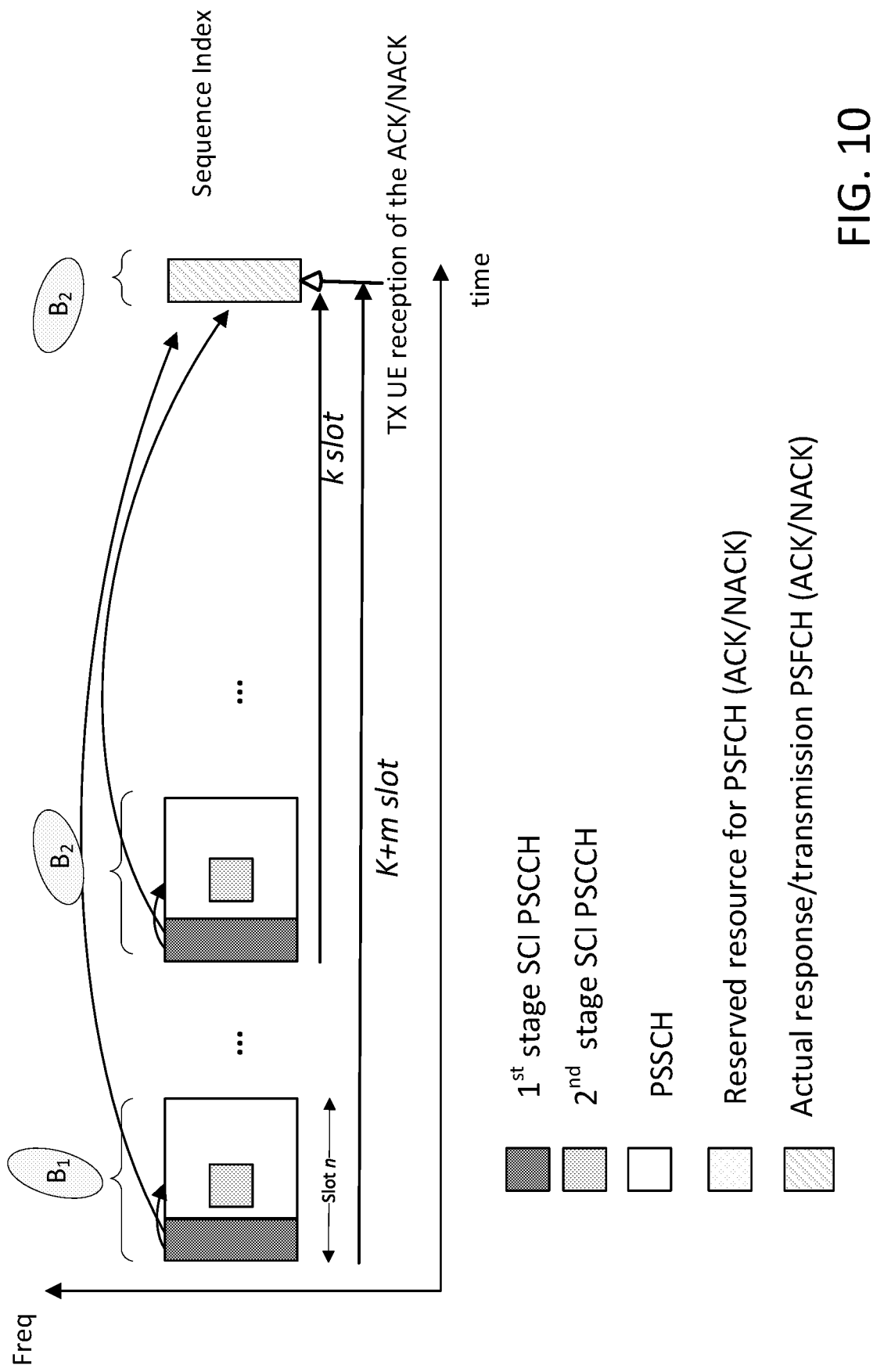
FIG. 10 illustrates an exemplary reserved ACK/NACK resource carried on single SCI or 1st-stage SCI as explicit beam indication.

Explicit beam ID feedback: FIG. 10 illustrates an exemplary Reserved ACK/NACK resource carried on single SCI or 1st-stage SCI as explicit beam indication. As disclosed, single or multiple resources for ACK/NACK feedback may be reserved by TX UE or the reserved resources(s) for ACK/NACK feedback can be derived from the received PSSCH. In addition, each block ID may be mapped to a PSFCH sequence ID. If PSFCH for HARQ-ACK/NACK is based on sequence design and the sequence is adopted from Zadoff-Chu sequence. Further defined herein, a sequence $r_{u,v}^{(\alpha)}(n) = e^{j\alpha n}\bar{r}_{u,v}^{(\alpha)}(n)$ as PSFCH for HARQ-ACK/NACK base sequence, where $0 \leq n \leq N$ is the length of PSFCH for HARQ-ACK/NACK sequence. The base sequence may be defined as the cyclic extension of the Zadoff-Chu sequence $\bar{r}_{u,v}^{(\alpha)}(n) = x_q(n \bmod N_{SC})$ where $N_{SC}$ is the length of Zadoff-Chu sequence that is given by the largest prime number such that $N_{SC} < N$. When $$N > 36, \text{ let } x_q(m) = e^{-j\frac{\pi qm(m+1)}{N_{SC}}} \text{ and } N < 36, \text{ let } x_q(m) = e^{-j\frac{(q+1)(m+1)(m+2)}{N_{SC}}}$$

where q is q-th root Zadoff-Chu sequence. Note, q value is derived from value of u and v. HARQ-ACK/NACK information like {0, 1} or {00, 01, 10, 11} may be mapped to different (cyclic-shift) values of $\alpha$ for a root ID. For an exemplary design, we may construct (one or more) PSFCH for HARQ-ACK/NACK via assigning different or distinct q-th root. Therefore, multiple PSFCH for HARQ-ACK/NACK sequences may be multiplexed at a same reserved resource in a resource pool. For example, if a beam sweeping burst transmits 4 blocks and the block ID is set to b(1)=0, b(2)=1, b(3)=2 and b(4)=3, respectively, then each block ID can be mapped to a root ID e.g. (b(m)+10) mod $N_{SC}$ (note: $N_{SC}$ is a prime number). In this way, the mapping of PSFCH sequence can be derived from the block ID where it can be signaled by SCI. The block ID may be carried by the SCI and the HARQ-ACK/NACK resource is reserved by $1^{st}$-stage SCI. As shown in FIG. 10, a SL resource is reserved for HARQ-ACK/NACK feedback for multiple PSSCH. The PSFCH for HARQ-ACK/NACK may be based on the sequence design. For example, a set of orthogonal sequence can be mapped to a set of block ID. The mapping of sequence ID to block ID can be standardized. RX UE may feedback a single or multiple PSFCH. In an example, RX UE may feedback a single HARQ-ACK/NACK and transmit the correspondence PSFCH (block ID link to the PSFCH sequence ID) at the reserved resource to TX UE. RX UE may choose the best link quality for feedback. In an example, RX UE may feedback multiple HARQ-ACK/NACK and transmit multiple feedback channels (PSFCHs) at the reserved feedback resource.

BFR performed at RX/target UE: If RX UE performs beam failure recovery, in this case, RX UE may be responsible for-monitoring the link quality from TX UE. RX UE may use SL-RS (e.g. SL-DMRS for PSCCH or PSSCH) sent from TX UE to perform hypothetical BLER measurement and determine whether there is a beam failure or not. In addition, RX UE may monitor multiple SL-CSI-RS(s) or other SL-RS (e.g. SL-DMRS for PSCCH, SL-DMRS for PSSCH, etc.) for identification of candidate beam for beam correspondence recovery. RX UE can trigger a beam failure request (BFRQ) to TX UE when there is a beam failure occurring. BFR performed at RX/target UE side doesn't require that SL HARQ feedback must be enabled.

Disclosed herein are options for BFR performing at RX/target side.

Figure 11:
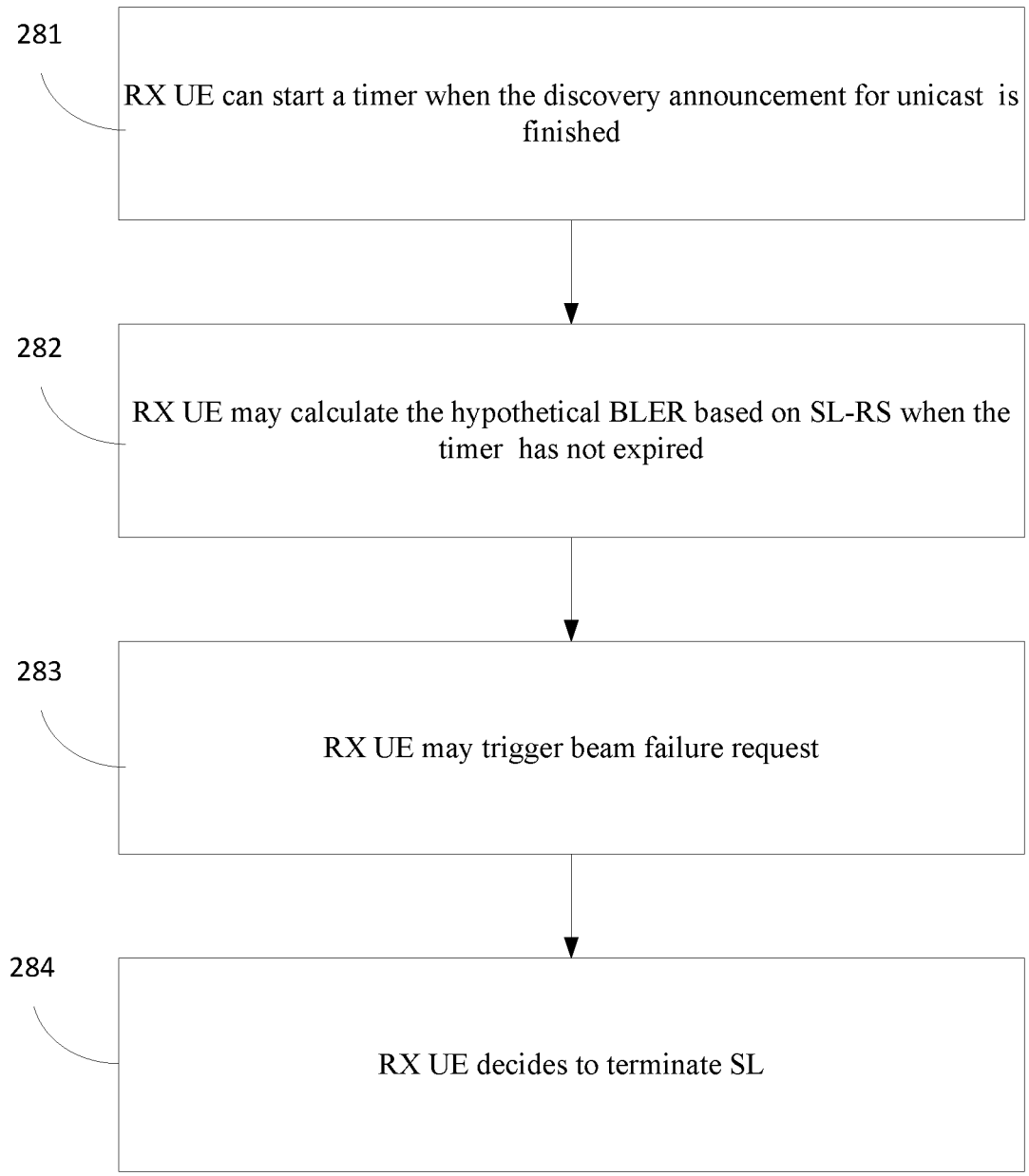
FIG. 11 illustrates an exemplary method in which a UE may perform BFD, CBI, or BFRQ.

With regard to a first option, RX UE (e.g., UE 242) may perform BFD, CBI, or BFRQ. As shown in FIG. 11, at step 281, RX UE can start a timer $T_1$ (e.g. in terms of ms) after the discovery announcement/procedure for a unicast sidelink i is completed. A RX UE may monitor multiple unicast of SL, for example, i=1, ... $L_{SL}$, where the maximum value of $L_{SL}$ is dependent on RX UE's ability. Each unicast link may be associated an independent timer $T_1$.

At step 282, RX UE may calculate the hypothetical BLER based on SL-RS when the timer $T_1$ has not expired. For example, the SL-RS may be based on (1) SL-DMRS for PSCCH, (2) SL-SL-CSI- RS QCLed with PSCCH, or (3) SL-DMRS for PSSCH with or without QCLed with SL-DMRS for PSCCH. More details of SL-RS are addressed herein. If measured SL-RS's hypothetical BLER is under a certain (pre-) configured $Q_{out,SL}$, then UE physical layer can report a beam failure indication to higher layer and indicate this link (e.g., link i) failure. At the same time, RX UE may monitor SL-CSI-RS(s) for candidate beam identification when the measured SL-CSI-RS L1-RSRP exceeds a certain (pre-) configured $Q_{in,SL}$. Once a candidate beam is identified, RX UE may report the following to higher layer: 1) SL-CSI- RS configuration indices only, or 2) SL-CSI-RS configuration indices and the corresponding L1-RSRP/RSRQ or SINR measurements to higher layer.

At step 283, upon a higher layer receiving one or more beam failure indications when timer $T_1$ has not expired, then RX UE may trigger beam failure request (BFRQ). RX UE may use identified candidate SL-CSI-RS resource configuration index $q_{new}$ provided by higher layers for transmission over PSSCH or PSFCH channel. TX UE may determine which beam to use for this BFRQ reception: (1) each candidate beam in set $\bar{q}_{1,SL}$ may be associated with a dedicated resource reserved by TX UE and RX UE mapped the select $q_{new}$ to the correspondence reserved resource by TX UE. Note the monitored candidate beams set $\bar{q}_{1,SL}$ is configured by TX UE. More of details for the transmission resource for BFRQ over PSFCH are addressed herein. In a second example, TX UE may determine which beam to use for this BFRQ reception based on the following: (2) RX UE select a resource to transmit BFRQ. If TX UE sends a PSCCH and PSSCH to the RX/target UE using the spatial information provided from $q_{new}$ before the timer $T_2$ expires, then RX UE can stop the timer $T_2$ and physical layer continues with reception because the radio link has recovered, otherwise, when timer $T_2$ expires but not $T_1$, RX UE can resend the BFRQ to TX UE.

At step 284, if there is no beam failure indication sent to higher layer upon expiry of timer $T_1$, then RX UE may decide to terminate this SL.

Figure 12A:
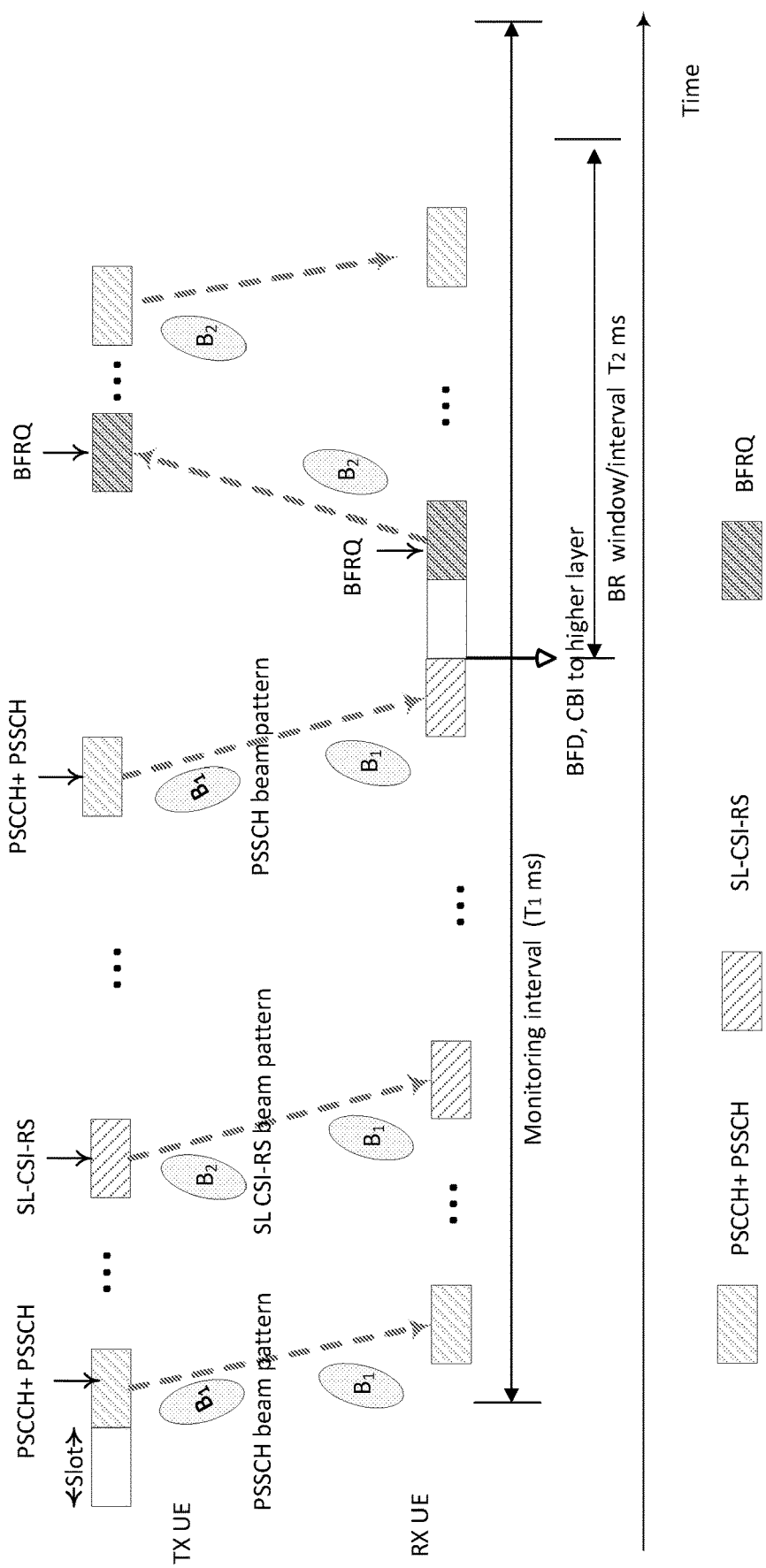
FIG. 12A illustrates exemplary indications of SL beam failure detection (BFD) and candidate beam identification (CBI): Data with SL-CSI-RS are transmit for BFD+CBI.
Figure 12B:
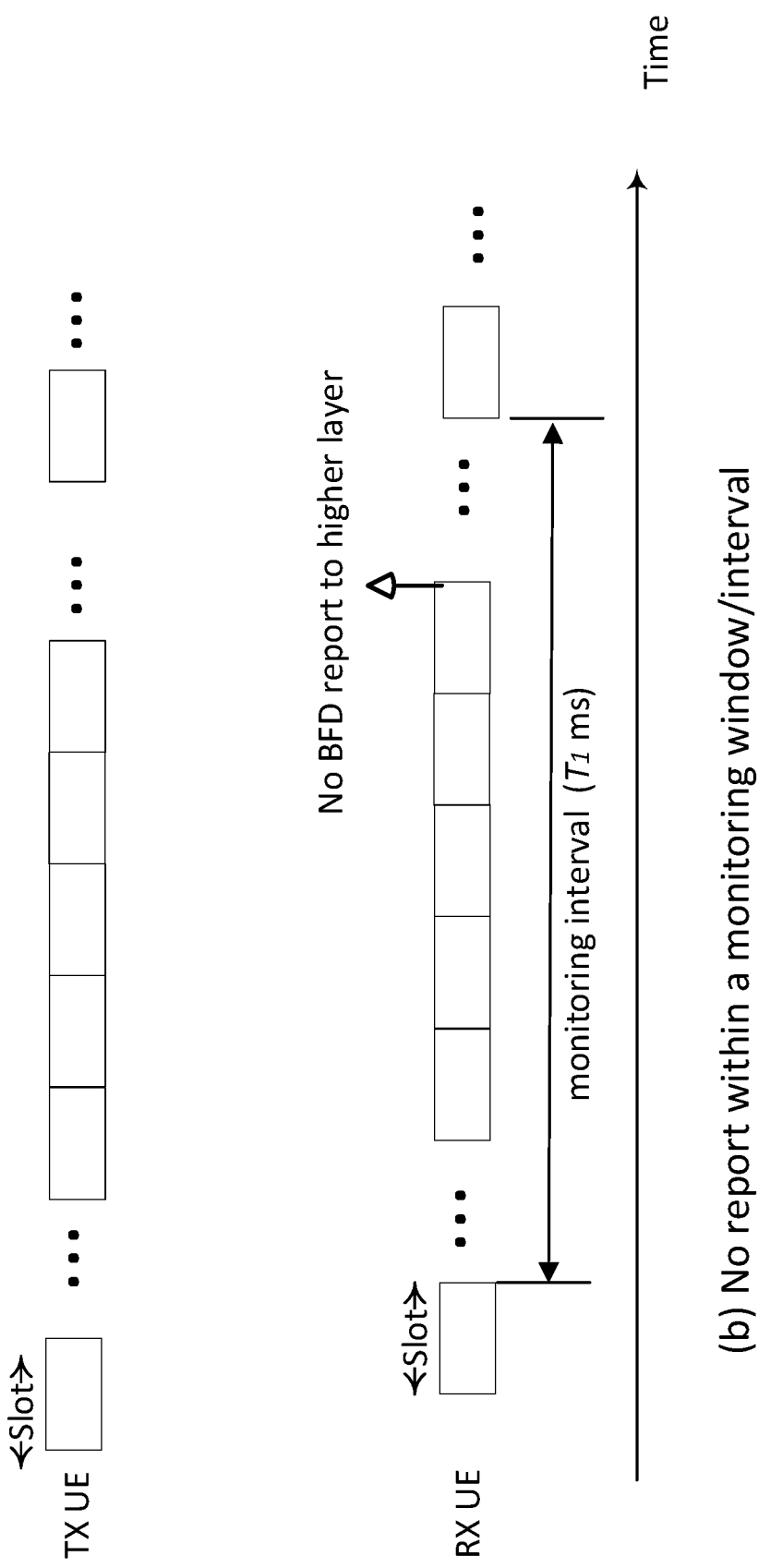
FIG. 12B illustrates exemplary indications of SL beam failure detection (BFD) and candidate beam identification (CBI): No BFD report is found in a monitoring window/interval.

The indication of sidelink BFD, CBI, or BFRQ triggering mechanism is illustrated in FIG. 12A-12B. In each BFD/CBI report occasion, there is an associated monitoring window (or a periodical interval $T_1$), if the monitored SL-RS's hypothetical BLER (e.g., SL-DMRS for PSCCH) is under a (pre-) configured threshold $Q_{out,SL}$ within the monitoring period, then the RX UE indicates BFD to the higher layer. In addition, upon request from higher layers, if there are SL-RS(s) being identified as candidate beams, e.g., when SL link quality (e.g., L1-RSRP, SIRN or hypothetical BLER) is greater or better than a (pre-) configured $Q_{in,SL}$ then the candidate SL-RS(s) can be reported to higher layer. Otherwise, if no BFD is detected within the associated monitoring window/period $T_1$, then RX UE may designate no BFD report to the higher layer. Hence, periodic indications of beam failure may be provided based on operation of the timer $T_1$, e.g. if TX UE reset timer $T_1$ after it expires then the link may be periodically monitored by UE. Note: periodically monitoring a link doesn't mean RX UE will expect periodically receiving data packet for this link. UE procedure for BFR performed at RX UE side is summarized in FIG. 13.

Figure 13:
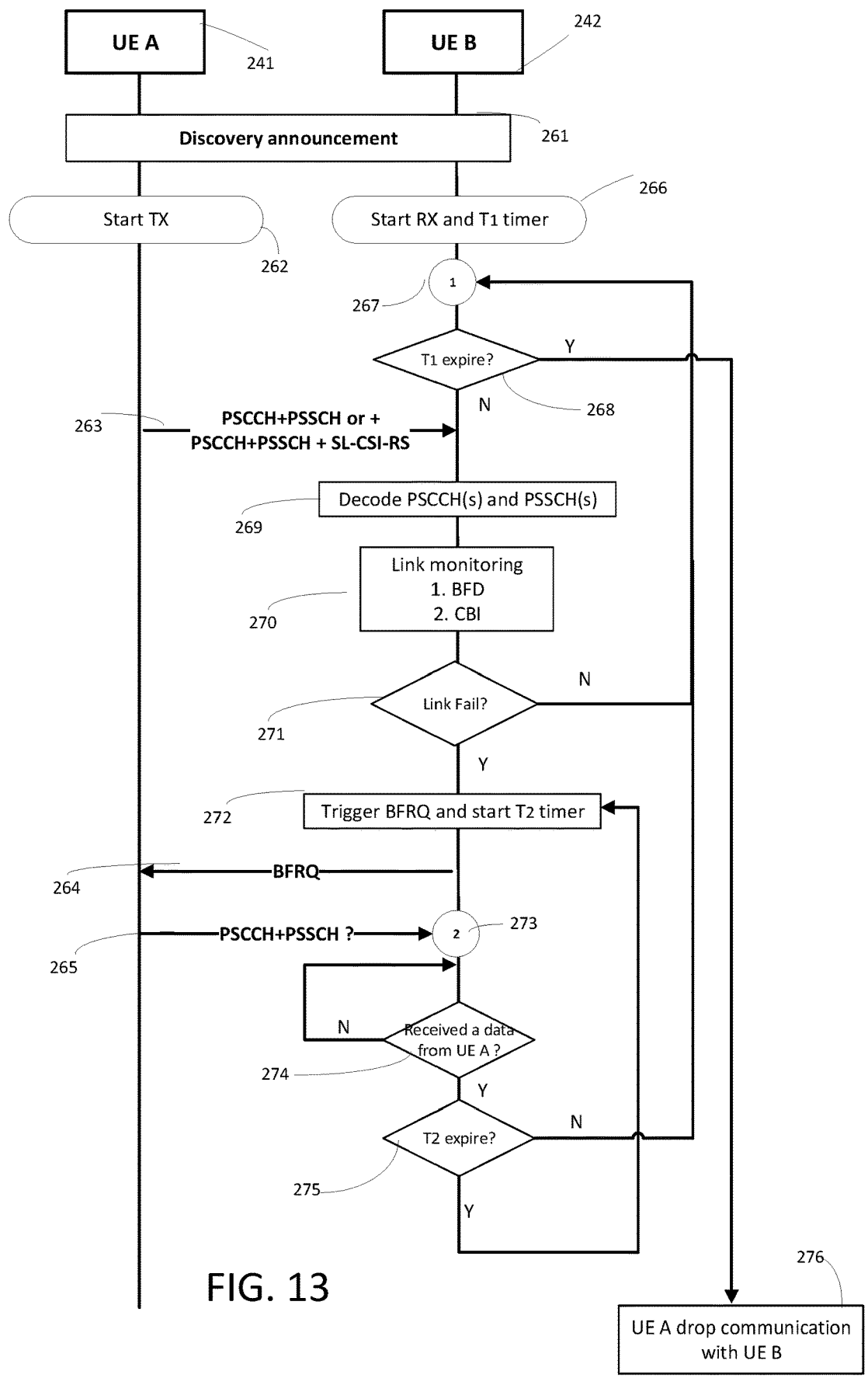
FIG. 13 illustrates an exemplary (RX) UE behavior using option 1 method for link recovery on SL.

With continued reference to FIG. 13, at step 261, a discovery announcement procedure may occur. The discovery announcement procedure may involve UE 241 and UE 242. Subsequent to the discovery announcement procedure, at step 266, there may be a start of RX and start of timer T1 at UE 242 while at UE 241 there may be a start of TX. At step 268, there is determination of whether T1 expired. If T1 expired, then proceed to step 276 (Communication dropped between UEs), if T1 not expired then proceed to step 269. Step 263 may include receiving PSCCH+PSSCH from UE 242 or receiving PSCCH+PSSCH+SL-CSI-RS from UE 242. At step 269, UE 242 may decode one or more PSSCHs or PSCCHs. At step 270, UE 242 may execute link monitoring using BFD or CBI. At step 271, UE 242 may determine a link failure. If no link failure, then proceed to step 267, but if there is a link failure proceed to step 272 (trigger BFRQ and start T2 timer). At step 264, UE 242 may send BFRQ. At step 265, in response to BFRQ of step 264, UE 242 may monitor PSCCH+PSSCH. At step 274, UE 242 determines whether data is received from UE 241. If data is received, then proceed to step 275 and if data is not received proceed to step 273 (monitor PSCCH+PSSCH). At step 275, if T2 is determined to have expired then proceed to step 267. If T2 is determined to he expired then proceed to step 272.

The transmission resource for sidelink beam failure recovery request (SL BFRQ) may use the following options. With regard to a first SL BFRQ option, the transmission resource may be reserved by TX UE. In an example, TX UE reserves the resource(s) for RX to transmit BFRQ with PSCCH and PSSCH. In another example, TX UE reserves the PSFCH to feedback BFRQ to TX UE. With regard to a second SL BFRQ option, RX UE reserves the SL BFRQ resource.

With reference to the use of the first SL BFRQ option, the transmit resource may be reserved when there is SL-CSI-RS transmitted by TX UE (e.g., UE 241). The reserved resource (by TX UE) may be based on the SL-CSI-RS resource(s) configured in set $\bar{q}_{1,SL}$. RX UE may use those reserved resource(s) to transmit SL BFRQ with PSCCH and PSFCH which it is associated with a (new) candidate beam identified in set $\bar{q}_{1,SL}$. For example, there may be four SL-CSI-RS configured n in set $\bar{q}_{1,SL}$ and TX UE may reserve four different resources (e.g. resource ID 1, 2, 3 and 4). In this example, each reserved resource can be mapped to SL-CSI-RS one by one configured in set $\bar{q}_{1,SL}$. Once RX UE identifies a candidate SL-CSI-RS (e.g., ID=3 which corresponds to a specific beam) then RX UE may select the correspondent resource to transmit the BFRQ. Therefore, TX UE may perform the proper receiving beam for BFRQ reception.

Figure 14:
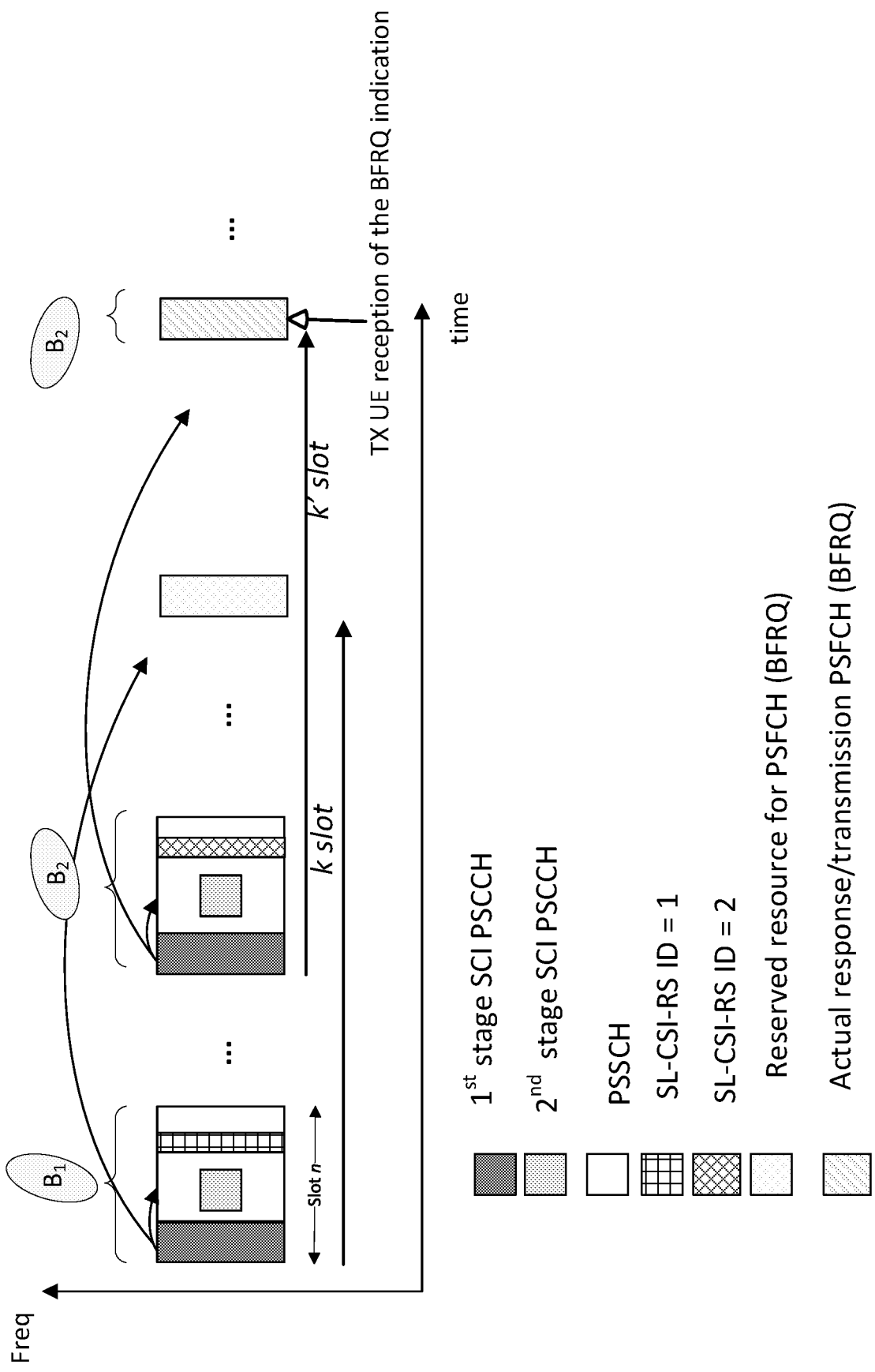
FIG. 14 illustrates an exemplary Reserved BFRQ resource carried on single SCSI or 1st-stage SCI as explicit beam indication.

Another approach is to design PSFCH for BFRQ indication via the explicit (beam) indication. As disclosed, a single or multiple feedback resource(s) for BFRQ feedback may be reserved by TX UE or RX UE can be derived from the received PSSCH from TX UE. Each SL-CS-RS ID configured in the set $\bar{q}_{1,SL}$ may be mapped to a PSFCH sequence ID for BFRQ. If PSFCH for BFRQ is based on sequence design and the sequence is adopted from Zadoff-Chu sequence, then we further define a sequence $r_{u,v}^{(\alpha)}(n) = e^{j\alpha n} \bar{r}_{u,v}^{(\alpha)}$ = as PSFCH for BFRQ base sequence, where $0 \leq n \leq N$ is the length of PSFCH for BFRQ sequence. The base sequence is defined as the cyclic extension of the Zadoff-Chu sequence $\bar{r}_{u,v}^{(\alpha)}(n) = x_q$ (n mod $N_{SC}$) where $N_{SC}$ is the length of Zadoff-Chu sequence that is given by the largest prime number such that $N_{SC} < N$. When $$N > 36, \text{ let } x_q(m) = e^{-j\frac{\pi q m(m+1)}{N_{SC}}} \text{ and } N < 36, \text{ let } x_q(m) = e^{-j\frac{(q+1)(m+1)(m+2)}{N_{SC}}}$$

where q is q-th root Zadoff-Chu sequence. Note, q value is derived from the value of u and v. For a exemplary design, we can construct (multiple) PSFCH for BFRQ sequences by assigning different or distinct q-th root. Therefore, multiple PSFCH for BFRQ sequences may be multiplexed at a same reserved resource or may be transmitted at different resources in a resource pool. For example, if four SL-CSI-RS are configured in set $\bar{q}_{1,SL}$ and each SL-CSI-RS ID is set as s(1)=0, s(2)=1, s(3)=2 and s(4)=3, respectively, then each block ID may be mapped to a root ID, e.g. s(m) mod $N_{SC}$ (note: $N_{SC}$ is a prime number). In this way, the mapping of PSFCH sequence ID to SL-CSI-RS configured in the set $\bar{q}_{1,SL}$ can have one-to-one mapping. As shown in FIG. 14, two reserved resources are reserved for two SL-CSI-RS. RX UE may feedback a single or multiple PSFCH and TX UE may perform the proper receiving beam for BFRQ reception. In an example, RX UE may feedback a single BFRQ and transmit the correspondence PSFCH (SL-CSI-RS ID link to the PSFCH sequence ID) at the reserved resource to TX UE. RX UE may choose the best link quality identified in set $\bar{q}_{1,SL}$ for feedback. In an example, RX UE may feedback multiple BFRQ and transmit multiple feedback channels (PSFCHs) at the reserved feedback resource.

If TX UE reserves the SL resources in a SL resource pool, then TX UE may apply with a beam direction/spatial filter to detect or receive with the beam selected or identified by RX UE. If there is no transmission resource reserved by TX UE or the feature for reservation of the BFRQ resource is not supported, then RX UE may reserve a transmit resource based on sensing and then set higher priority in SCI. When RX UE reserves the resource based on sensing in a resource pool, in this case, further disclosed herein, BFRQ may be used with beam sweeping as the following Option 2 method, e.g., BFRQ can be transmitted with a beam sweeping burst.

Figure 15:
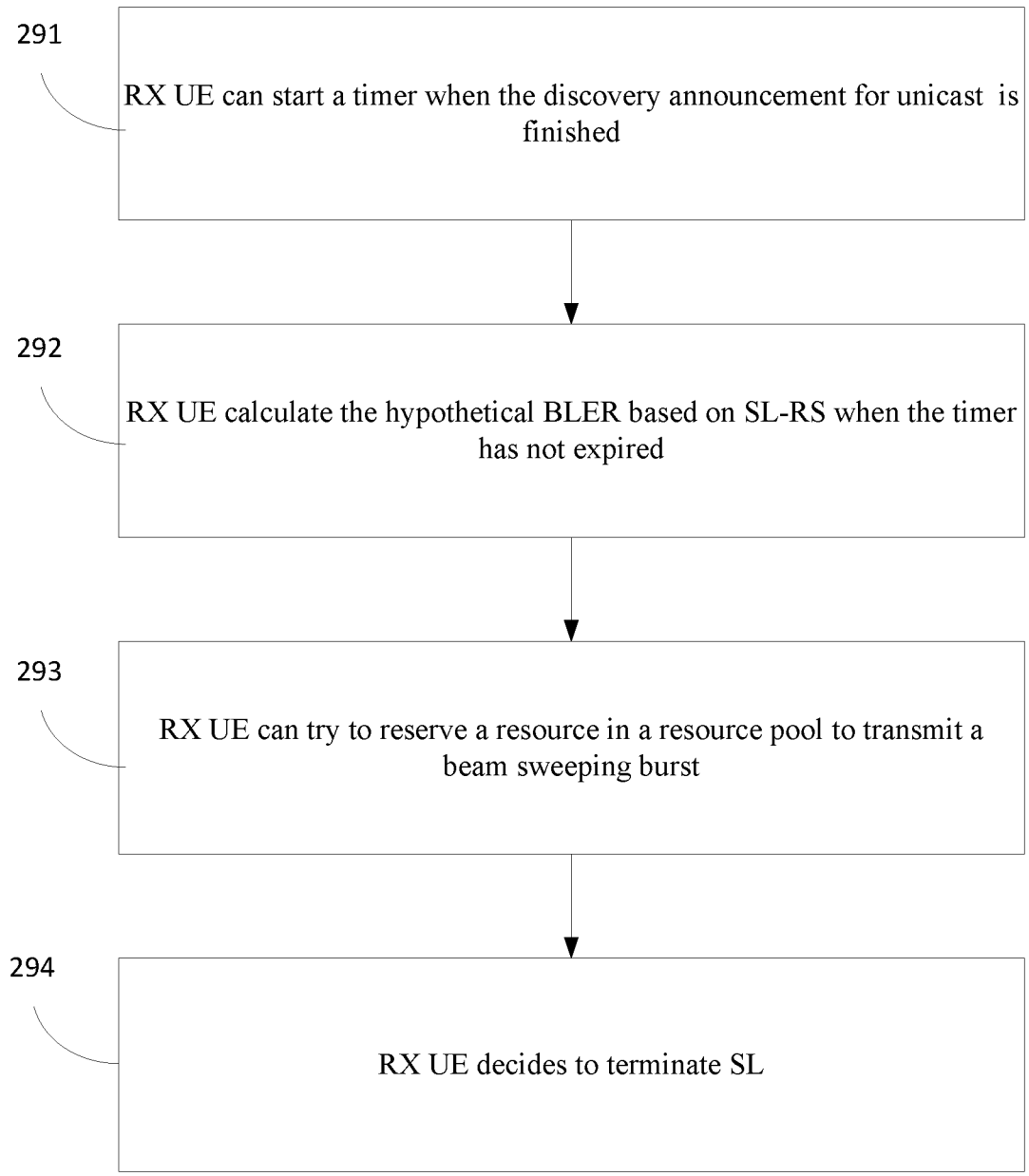
FIG. 15 illustrates an exemplary method in which a UE may transmit a beam sweeping burst.

With reference to the use of the second SL BFRQ option (FIG. 15), RX UE may transmit a beam sweeping burst. Step 291: Same as the Step 281 in first option for RX UE.

At step 292, RX UE calculate the hypothetical BLER based on SL-RS when the timer $T_1$ has not expired. For example, the SL-RS may be based on SL-DMRS for PSCCH or SL-CSI-RS QCLed with PSCCH. If measured SL-RS's hypothetical BLER is under a certain (pre-) configured $Q_{out,SL}$, then UE physical layer may report a beam failure indication to higher layer and indicate this link (e.g., link i) failure.

At step 293, upon higher layer receiving one or more beam failure indication when timer $T_1$ has not expired, then RX UE may attempt to reserve a resource in a resource pool to transmit a beam sweeping burst. Note that BFRQ indication may be transmitted with or without in each beam sweeping block in a burst. The BFRQ may be carried in SCI or in PSSCH if support. In mode 2, RX UE may reserve a resource in a resource pool to transmit a beam sweeping burst which may be based on sensing (e.g., long or short sensing) or RX UE may transmit the beam sweeping burst on a (SPS) resource in a resource pool or TX UE may instruct RX UE for the transmission resource. In mode 1, RX UE may send a request to network for reserving the resource or use configured grant resource to transmit a beam sweeping burst with or without HARQ-ACK/NACK feedback resource. The detail of beam sweeping burst may refer to beam sweeping burst as associated with the above BFR performed at TX/source UE. If RX UE physical layer sends an indication(s) to higher layer upon successfully decoding a data from TX UE before the timer $T_1$ expires, then RX UE may reset the timer $T_1$ and physical layer continues with (re)transmission with TX UE because the radio link has recovered.

At step 294, if there is not any beam failure indication, sends to higher layer upon expiry of timer $T_1$, then RX UE may determine to keep monitoring or terminate this SL i.

If RX UE reserves a resource in a resource pool, then TX UE is able to detect this beam sweeping burst because TX UE keep sensing all resource in a resource pool when there is no data to send. If the reserved resource for RX transmitting a beam sweeping burst is instructed by TX UE, then TX UE is able to detect the beam sweeping burst transmitted by RX UE.

Figure 16:
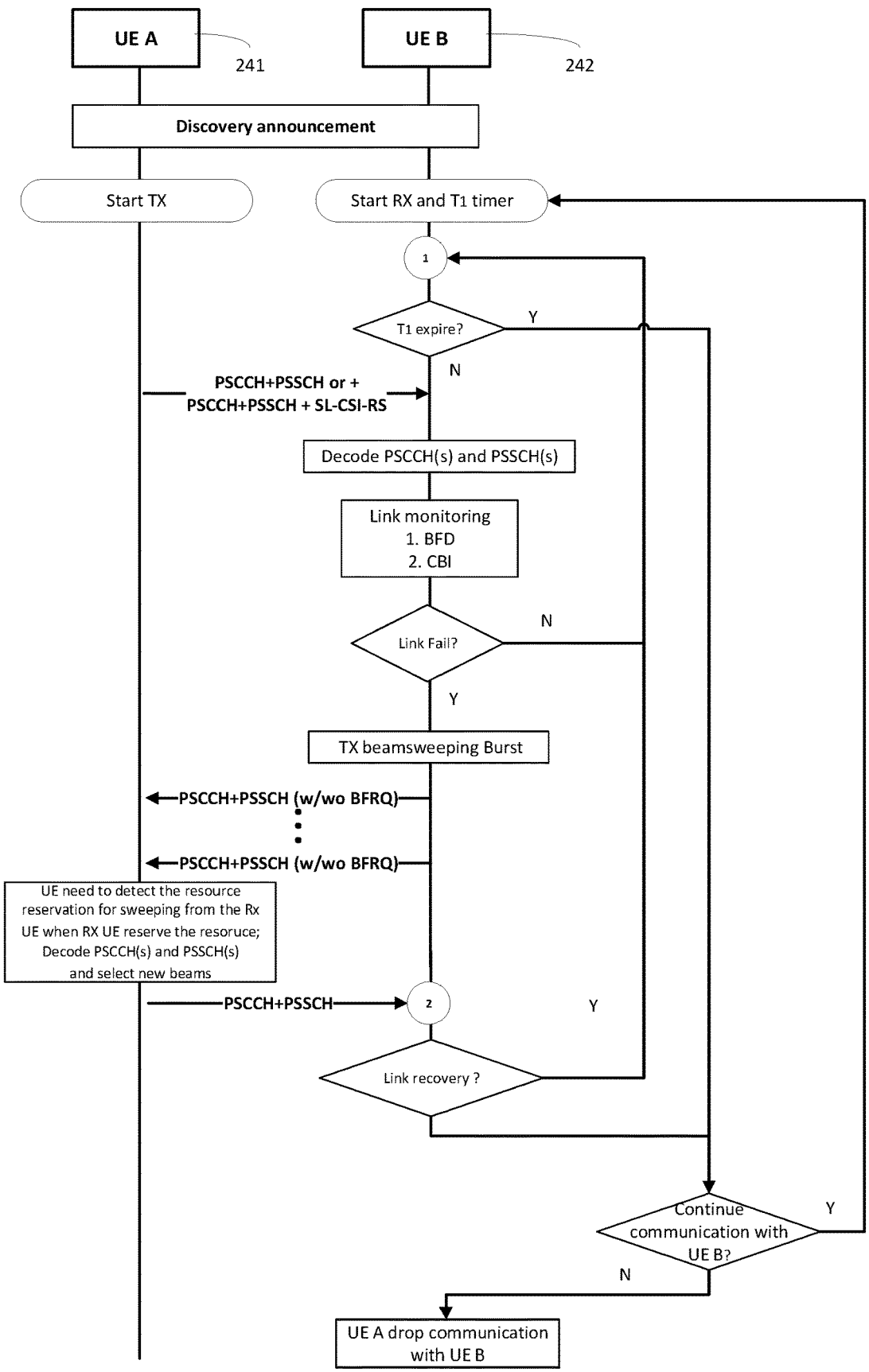
FIG. 16 illustrates an exemplary (RX) UE behavior using option 2 method for link recovery on SL.

UE procedure for BFR performed at RX UE side without using BFRQ is summarized in FIG. 16.

Sidelink Beam Failure Detection (BFD) or Candidate Beam Identification (CBI): In NR Uu detecting a beam failure (BFD) procedure, the UE assesses the radio link quality according to the periodic CSI-RS resource configurations or SS/PBCH blocks in the failureDetectionResource set $\bar{q}_0$ that are QCL with the DM-RS of PDCCH receptions monitored by the UE. The periodic CSI-RS resource configurations or SS/PBCH blocks in the failureDetectionResource set $\bar{q}_0$ can be explicitly indicated by higher layer or implicitly indicated by TCI states.

The radio link quality on SL communication, e.g., SL BFD may be for indicating status to higher layers. The radio link quality on SL is monitored by UE(s) after the discovery announcement has been established between the announce UE and response UE.

The source UE may perform BFD measurement based on a sidelink reference signal (SL-RS). In NR V2X, SL-RS cannot be transmitted standalone, e.g., it should transmit with sidelink data channel PSSCH. If multibeam operation is supported for numerology supported on SL communication, then the UE may be explicitly configured with a set $\bar{q}_{1,SL}$ with a set of resource indexes, through a corresponding set of higher layer parameters SL-failureDetectionResource for each monitored unicast SL. If SL failureDetectionResource is not explicitly configured by higher layer, then RX UE may use SL-DMRS for PSCCH in a search space (or in a CORESET), SL-DMRS for PSSCH (if QCLed with SL-DMRS for PSCCH) or configured SL-CSI-RS QCLed with PSCCH.

The following explicit configuration method for SL BFD operation is disclosed:

UE may be explicitly configured with one or multiple SL-failureDetectionResources sets $\bar{q}_{0,SL,k}$ and candidateBeamRSList $\bar{q}_{1,SL,k}$ k=1 . . . N for SL radio link quality measurements to support beam failure detection (BFD) with single or multiple UE(s) SL transmission respectively, where N denotes the number of sidelinks (from the source UE to the target UE) is simultaneously monitored.

A UE won't be expected to monitor more than $N_{max}$ unicast on SL communication.

Each set of $\bar{q}_{0,SL,k}$ and $\bar{q}_{1,SL,k}$ k=1 . . . N can be independently associated with multiple resource sets of SL-RS and each resource set contain multiple configuration SL-RS resource indexes. Set $\bar{q}_{0,SL,k}$ can be a set of aperiodic NZP SL-CSI-RS resources.

The UE expects the set $\bar{q}_{0,SL,k}$ including up to M (e.g. two) RS resource indexes. The UE expects single resource (a single port or multiple ports) with a SL-RS resource index in each set $\bar{q}_{0,SL,k}$ for all k=1 . . . N.

The physical layer in the UE assesses the radio link quality according to the set $\bar{q}_{0,SL,k}$ of resource configurations against the threshold $Q_{out,LR}$ for N links.

For each set $\bar{q}_{0,SL,k}$, k=1 . . . N, the UE assesses the radio link quality only according to aperiodic SL-CSI-RS resource configurations that are quasi co-located with the SL-DMRS for PSCCH receptions monitored by the UE.

Higher layer provides a candidateBeanRSList set $\bar{q}_{1,SL,k}$ for candidate beam identification for SL k.

Figure 17:
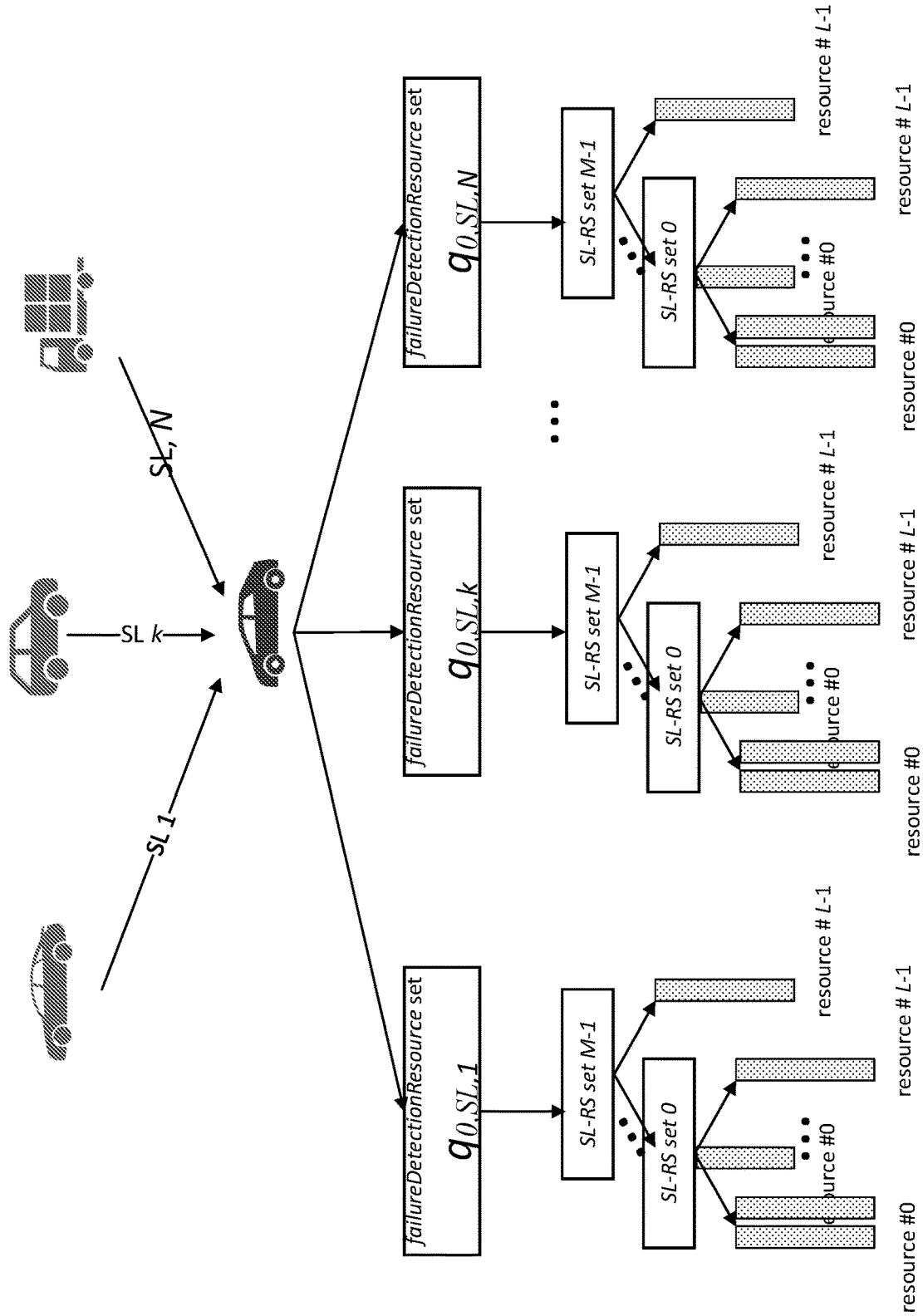
FIG. 17 illustrates an exemplary SL-failureDetectionResource mapping relationship with multiple SL.

Shown herein is an example for SL-failureDetectionResource set $\bar{q}_{0,SL,k}$, k=1 . . . N mapping relationship between different UE(s). In FIG. 17, it may be assumed that N is the total number of multi-unicast SL. Each radio link is associated with one or more transmission panel(s). Disclosed herein, each SL-failureDetectionResource set $\bar{q}_{0,SL,k}$ for link k may be independently provided by higher layers and each $\bar{q}_{0,SL,k}$ may be associated with SL-RS resource configuration indexes.

If RX UE is not provided any SL-failureDetectionResources, (e.g., implicit configuration for BFD), then RX UE can determine the SL-failureDetectionResources set $\bar{q}_{0,SL,k}$, for k-th link to include aperiodic CSI-RS resource configuration indexes with same values as the RS indexes in the RS sets indicated by TCI-state for RX UE uses for monitoring SL-DMRS for PSCCH or PSCCH and PSSCH. In this case, each set for $\bar{q}_{0,SL,k}$ for k-th link can be associated with via TCI-state to indicate corresponding aperiodic SL-CSI-RS when UE is not provided any SL-failureDetectionResources from higher layers.

Sidelink Reference Signal for BFD and CBI: The SL-RS configuration for SL-failureDetectionResources set $\bar{q}_{0,SL}$ can be based on the following.

If SL-RS is explicitly configured by higher layer, RX UE expects to monitor one or more of the following SL-RS for evaluating beam failure detection (BFD):
  SL-CSI-RS QCLed with PSCCH
  SL-CSI-RS QCLed with PSSCH
  SL-DMRS for PSCCH
  SL-DMRS for PSSCH
  SLSS If SL-RS is implicitly configured by higher layer, RX UE can monitor one or more of the following SL-RS for evaluating BFD:
  SL-DMRS for PSCCH
  SL-DMRS for PSSCH
  SLSS For candidate beam identification, the SL-RS configuration for candidateBeamRSList set $\bar{q}_{1,SL}$ may be based on SL-CSI-RS, SL-DMRS for PSSCH, SL-DMRS for PSCCH, or SLSS.

SL-CSI-RS: A UE can be configured with one or several SL-CSI-RS resource sets, referred to as NZP-SL-CSI-RS-ResourceSet. Each such resource set includes one or several configured SL-CSI-RS resource(s), each SL-CSI-RS resource can be mapped to a single or multiple SL-CSI-RS antenna port(s). Transmission of all SL-CSI-RS within an aperiodic resource set is jointly triggered by means of SCI. The following configuration options can be considered for configuration of SL-CSI-RS
  Option 1: For each transmission occasion, all SL-CSI-RS resources on SL-CSI-RS resource set can be applied with the same TX spatial filter. This can enable TX beam sweeping across different SL-CSI-RS resource sets.
  Option 2: For each transmission occasion, different SL-CSI-RS resource in a same SL-CSI-RS resource set can be applied with different TX spatial filters. This can enable TX beam sweeping across resources of SL-CSI-RS in a resource set.

In practice, a SL-CSI-RS is associated with a specific beam. The RX UE measures on the set of signals within a or multiple resource set(s) and reports the result to the TX UE as input to the beam-management (e.g., SL-CSI-RS can be used for BM), candidate beam identification, or beam failure monitoring. The SL-CSI-RS can be configured to cover the full SL bandwidth of the bandwidth part or just a fraction of the bandwidth. In the latter case, the SL-CSI-RS bandwidth and frequency-domain starting position are provided as part of the SL-CSI-RS configuration. SL-CSI-RS resources of a SL-CSI-RS resource set may be allocated inside one instance of SL-CSI-RS transmission occasion.

Within the configured SL-CSI-RS bandwidth, a SL-CSI-RS may be configured for transmission in every resource block, referred to as SL-CSI-RS density equal to one. A single-port SL-CSI-RS occupies a single resource element within a block corresponding to one resource block in the frequency domain and one slot in the time domain. SL-CSI-RS may be configured a single-port CSI-RS with a density of d, (e.g. d=3) in which case the SL-CSI-RS occupies three subcarriers within each resource block.

A SL-CSI-RS can be configured for aperiodic transmission. In the case of aperiodic SL-CSI-RS (e.g., no periodicity is configured), SL-CSI-RS is transmitted with PSSCH. Note: PSSCH is always associated with a PSCCH) or SL-CSI-RS is transmitted with PSCCH only. Rather, RX UE is explicitly informed ("triggered") about each SL-CSI-RS transmission instant by means of signaling in a single stage SCI or $2^{nd}$ stage SCI. RX UE can assume that transmission of a configured SL-CSI-RS will not collide with SL-DMRS for PSSCH transmissions and SL SS blocks.

Figure 18A:
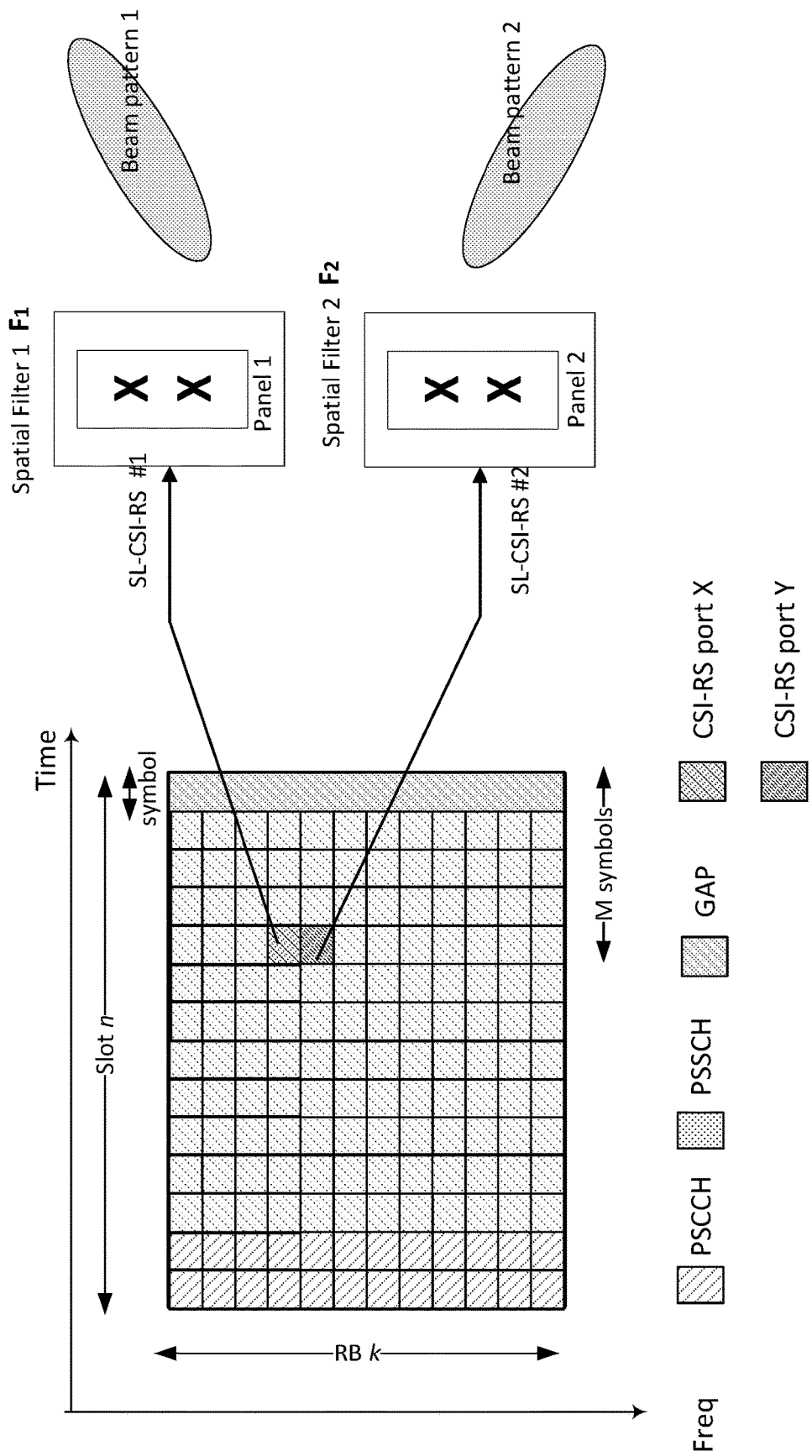
FIG. 18A illustrates exemplary SL-CSI-RS antenna ports mapping to REs and applied with spatial filters (F): a UE use multiple panels.
Figure 18B:
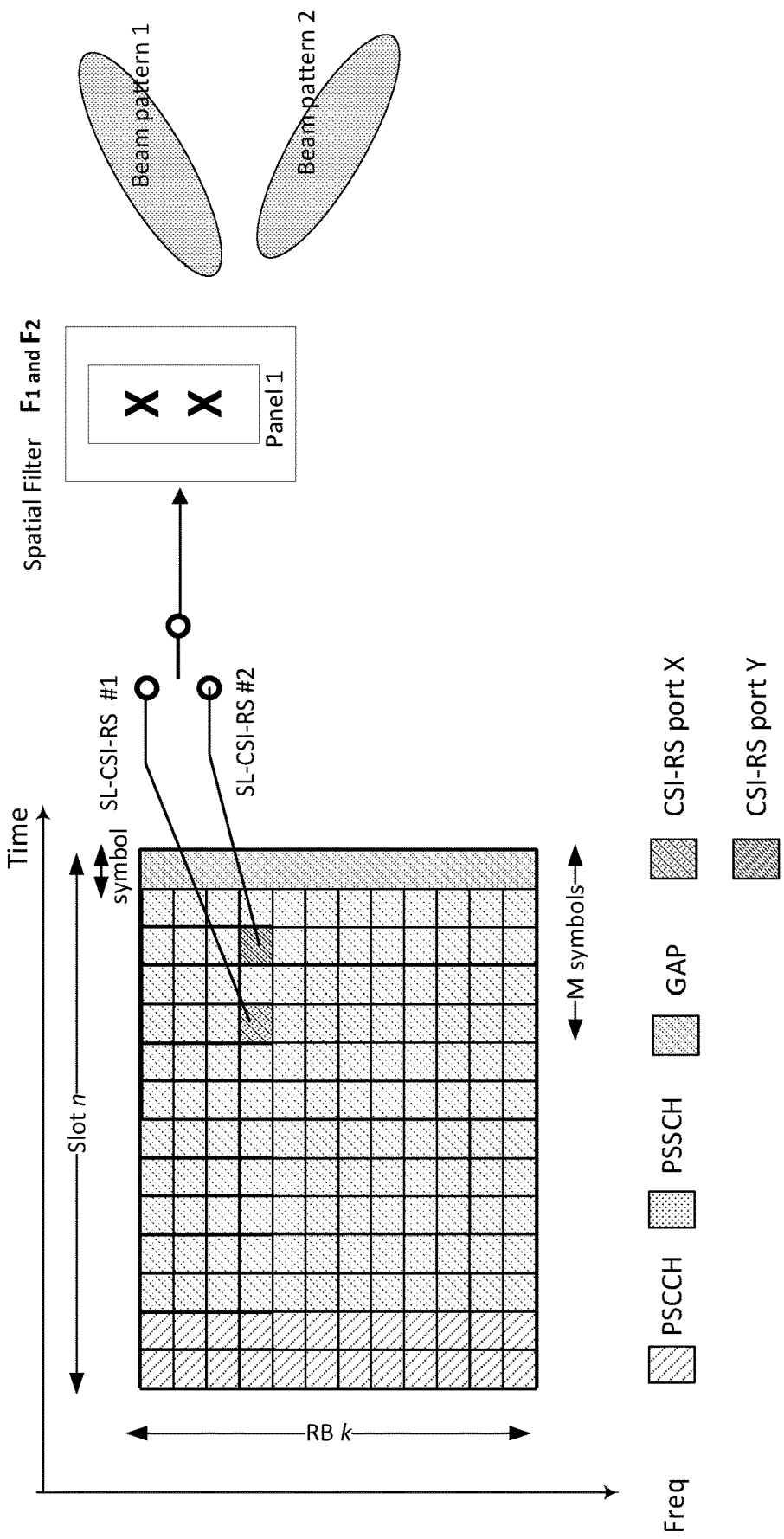
FIG. 18B illustrates exemplary SL-CSI-RS antenna ports mapping to REs and applied with spatial filters (F): a UE use a single panel to transmit SL-CSI-RS in a slot.

The mapping of SL-CSI-RS to one such panel is an example of a spatial information (filter) F from SL-CSI-RS antenna ports to the set of physical antennas. Transmission from different panels will then correspond to different spatial filters F as illustrated in FIG. 18A-FIG. 18B. In practice, depending on UE capability, UE may be equipped with a single panel or multiple panels for SL-CSI-RS transmission. To support SL-CSI-RS with different spatial transmission in a slot, different SL-CSI-RS can be separated at least one or multiple OFDM symbols away in a slot. Hence, TX UE can perform beam switching to apply with different spatial filter. If UE is equipped with multiple panels then UE can transmit multiple SL-CSI-RS with different spatial filters simultaneously or multiple panels transmit on the same antenna port. In FIG. 18A, two SL-CSI-RS are simultaneously transmitted using two different panels and spatial filters, while in FIG. 18B two SL-CSI-RS are transmitted at different OFDM symbols using a single panel with two different spatial filters. SL-CSI-RS is transmitted at the last M (e.g. 6) symbols in a slot or having time pattern, for example, such as at symbol l=5, 7, 9, 11 or l=9, 10, 11, 12 locations in a slot.

A multi-port SL-CSI-RS may be treated as multiple orthogonally transmitted per-antenna-port CSI-RS sharing the overall set of resource elements assigned for the configured multi-port SL-CSI-RS. A multi-port SL-CSI-RS corresponds to a set of antenna ports and the SL-CSI-RS may be used for sounding of the channels corresponding to those antenna ports.

This sharing may be based one or more of the following:
  Code-domain sharing (CDM, e.g. orthogonal covering codes), implying that different per-antenna-port SL-CSI-RS are transmitted on the same set of resource elements with separation achieved by modulating the SL-CSI-RS with different orthogonal patterns;
  Frequency-domain sharing (FDM), implying that different per-antenna-port SL-CSI-RS are transmitted on different subcarriers within an OFDM symbol;
  Time-domain sharing (TDM), implying that different per-antenna-port SL-CSI-RS are transmitted in different OFDM symbols within a slot.

In the frequency domain with CDM over two adjacent subcarriers (2×CDM), allowing for code-domain sharing between two per-antenna-port SL-CSI-RS. In the frequency and time domain with CDM over two adjacent subcarriers and four adjacent OFDM symbols (8×CDM), allowing for code-domain sharing between up to eight per-antenna-port SL-CSI-RS.

The UE may assume the reference-signal sequence r(m) for an SL-CSI-RS is defined by:

$$r(m) = \frac{1}{\sqrt{2}}(1 - 2c(2m)) + \frac{1}{\sqrt{2}}(1 - 2c(2m+1))$$

SL-CSI-RS can be constructed by a gold sequence; the gold sequence g(n) can be specified as follows:

$g(n)=(x_1(n+N_c)+x_2(n+N_c))\bmod 2$ $x_1(n+31)=(x_1(n+3)+x_1(n))\bmod 2$ $x_2(n+31)=(x_2(n+3)+x_2(n+2)+x_2(n+1)+x_2(n))\bmod 2$ where $N_c$ is a constant (e.g=1600) and the operator "+" is the modulo-2 addition. The $x_1$ and $x_2$ are polynomial generator with length 31. The pseudo-random sequence generator for SL CSI-S shall be initialized with follows.

$c_{init}=(2^M(N_{symb}^{slot}n_{s,f}^\mu+l+1)(2n_{ID}^{SL-CSI-RS}+1)+n_{ID}^{SL-CSI-RS})\bmod 2^{31}$ where $n_{s,f}^\mu$ is the slot number within a SL radio frame, l is the OFDM symbol number within a slot, and $n_{ID}^{SL-CSI-RS}$ sequence ID, where $n_{ID}^{SL-CSI-RS} \in \{0,1,\ldots,2^M-1\}$ and $M \geq 10$.

SL-DMRS for PSCCH: One advantage of measuring PSCCH is that it may not involve additional signal detection complexity in a system with sensing and occasional no channel access for the TX/source UE. The RX UE anyway can monitor the PSSCH and PSCCH and when a PSCCH is successfully decoded, it can reliably provide a measurement instance. Another advantage could be that the measured interference would more accurately reflect the PSCCH interference. Therefore, the RX/target UE can assume SL-DMRS for PSCCH as the default SL-RS for hypothetical BLER calculation for BFD when there is no explicitly configured SL-failureDetectionResources set $\bar{q}_{0,SL}$ or SL-CSI-RS is not transmitted with PSSCH. Furthermore, to support using SL-CSI-RS for hypothetical BLER calculation, QCL and TCI-state concept can be considered for SL communication to support beam switching with SL-CSI-RS.

Dummy SCI: If the TX/source UE does not transmit any regular PSCCH and PSSCH for scheduling during a time period, the UE could transmit a special PSCCH with a "dummy SCI", that does not schedule/indicate anything. Instead, the dummy SCI would be transmitted over PSCCH with the purpose to offer the RX UE a link monitoring occasion. RX UE may be configured with a timer $T_1$ where the time period after which RX UE PHY evaluates link quality to determine whether sends BFD or no indication to higher layer (e.g. MAC) or not. For example, the time period is typically set to the BFD-RS periodicity as in Uu. On SL, this time period (timer $T_1$) could be RRC or PC5 RRC configurable or based on a (pre-) configured fixed value in the spec, e.g. 10 ms.

SL-DMRS for PSSCH: If SL-DMRS for PSCCH is supported for SL-RS, then RX UE may use SL-DMRS for PSSCH can be jointly deriving the hypothetical BLER when SL-DMRS for PSCCH and SL-DMRS for PUSCH are QCLed. In this case, SL-DMRS for PSCCH can always associate with SL-DMRS of PSSCH for BFD hypothetical BLER calculation when there is no explicitly configured SL-failureDetectionResources set $\bar{q}_{0,SL}$ or SL-CSI-RS is not transmitted with PSSCH.

"Zero-padded" PSSCH or "Zero-power" PSSCH: If the TX/source UE does not transmit any regular PSSCH for scheduling during a time period (e.g. timer $T_1$), the UE may transmit a special PSSCH with a "zero padded" or "zero power." Instead, for zero-padded PSSCH case, a dummy data would be transmitted over PSSCH with the purpose to offer the RX UE a link monitoring occasion via using both SL-DMRS for PSCCH and PSSCH. For zero-power PSSCH case, the transmission of PSSCH is set to zero. Furthermore, SL-CSI-RS may transmit with PSSCH for RX UE to monitor the link quality to ensure there is enough samples for hypothetical BLER calculation. In this case, the transmission of SL-CSI-RS with PSSCH can be indicated by form of the single SCI or $2^{nd}$-stage SCI. RX UE may be configured with a timer $T_1$ where the time period after which RX UE evaluates link quality to determine whether sends BFD or no indication to higher layer (e.g., MAC) or not. For example, the time period may be normally set to the BFD-RS periodicity as in Uu. On SL, this time period (timer $T_1$) could be RRC or PC5 RRC configurable or based on a (pre-) configured fixed value in the spec, e.g. 10 ms.

Figure 19:
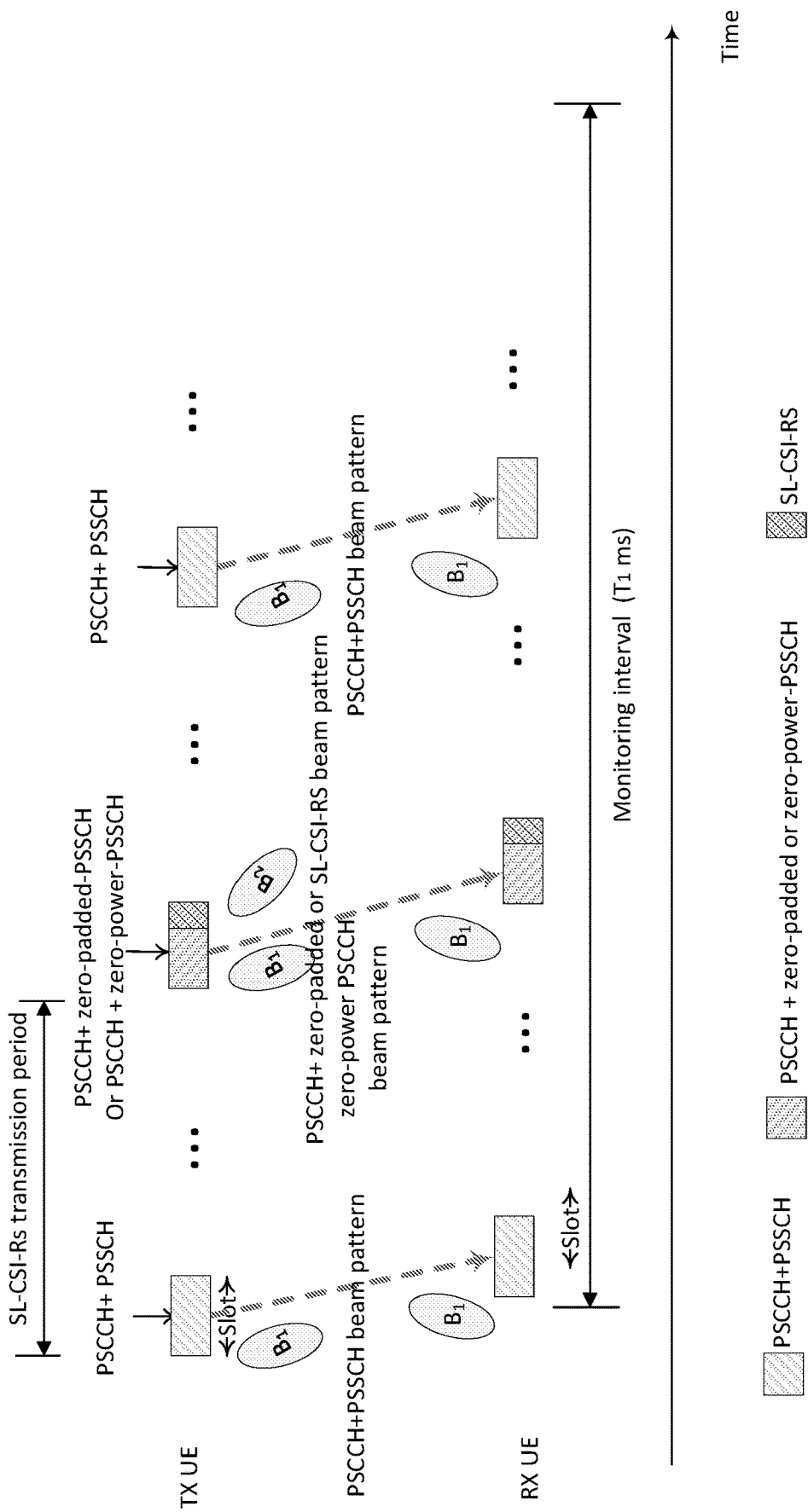
FIG. 19 illustrates an exemplary Aperiodic SL-CSI-RS that can be transmitted with a periodicity via supporting of "zero padded" or "zero-power" PSSCH for a SPS SL.

Furthermore, given the more intermittent nature of SL, if semi-persistent (SPS) transmission for SL transmission is supported, e.g. a SL could be (de-) activated based on semi-persistently. Therefore, SL-CSI-RS can be configured (or use) to support SPS SL with support of using a special PSSCH with a "zero padded" or "zero-power" PSSCH on SL even when there is no intended data to be sent at a time. In this way, SL-CSI-RS may be periodicity transmitted and is alike periodical SL-CSI-RS. As shown in FIG. 19, it shows the aperiodic SL-CSI-RS can be transmitted with a periodicity via supporting of "zero padded" PSSCH for a SPS SL transmission. Where there is a transmission occasion/opportunity but there is no actual data to be transmitted then, higher layer (e.g. MAC) may decide to transmit a "zero-padded" PSSCH and SL-CSI-RS. In this way, a periodical-like transmission of SL-CSI-RS can be implemented via "zero-padded" PUSCH.

Besides, UE may be able to activate/deactivate BFD functionality for SL (e.g., Semi-persistent (SP) or aperiodic (AP) sidelink), even if the corresponding signals (e.g., PSCCH, PSSCH, etc.) keep being transmitted or not. The activate/deactivate BFD functionality can be indicated by SCI or by MAC-CE.

Figure 20:
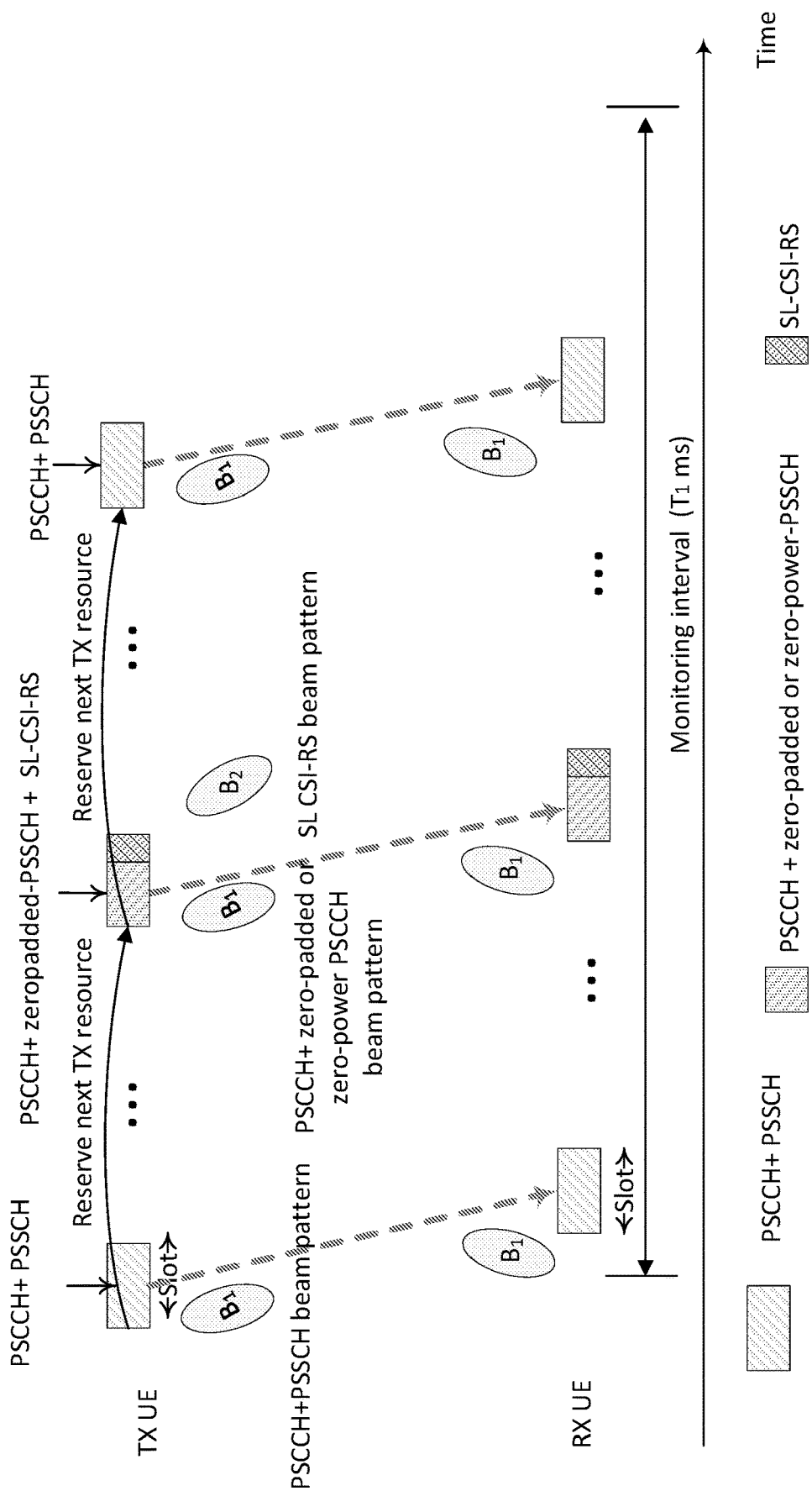
FIG. 20 illustrates an exemplary AP SL-CSI-RS and "Zero-padded" or "zero-power" PUSCH.

"Zero-padded" or "zero-power" PSSCH can also work with the aperiodic SL-CSI-RS transmission to support periodical-like transmission when TX UE can reserve the next transmission opportunity. This is because TX UE may reserve next PSCCH and PSSCH transmission occasion (e.g. a slot) by SCI. However, TX UE may not have the actual data to transmit when the reserved PSSCH transmission occasion. Therefore, higher layer (e.g. MAC) can transmit "zero-padded" PSSCH and SL-CSI-RS. In this way, the periodical-like transmission of SL-CSI-RS can be implemented via "zero-padded" or "zero-power" PUSCH with aperiodic SL-CSI-RS. As shown in FIG. 20, the SCI may reserve the next transmission opportunity/occasion at the $1^{st}$ transmission. However, there is no actual data that needs to be transmitted at the reserved transmission, thus higher layer (e.g. MAC) can transmit "zero-padded" PUSCH and SL-CSI-RS.

In NR V2X, SL synchronization signal (SLSS) is the only periodical signal. However, SS/PSBCH needs to transmit at a SL sync raster and the resource for SLSS transmission is based on a or multiple pre-defined resource(s) or the resource is scheduled by the network. Furthermore, SLSS carries SL SSID and MIB information. Besides, SL MIB doesn't carry any target ID and source ID information. Therefore, SLSS in general cannot be distinguished by RX UE to who is the sender, thus the sidelink synchronization signal may not be suitable for radio link monitoring unless the sender identifier can be recognized by vicinity RX UE or a group RX UE.

Figure 21:
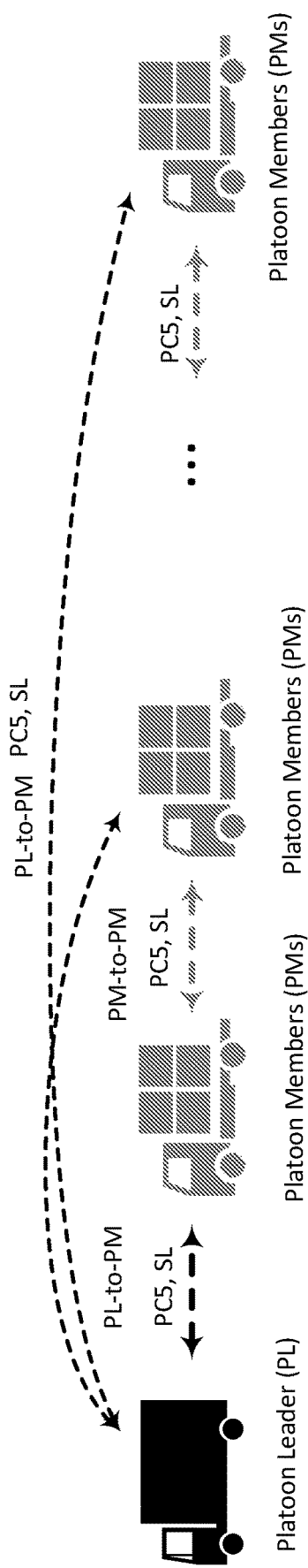
FIG. 21 illustrates an exemplary Platooning in V2X communications.

In platooning scenario, there is multiple ways of communications: a first way is platoon leader (PL) to platoon members (PM), e.g. PL-to-PM and platoon members (PMs) to platoon members (PMs), e.g., PM-to-PM. The PL-to-PM communication is point-to-multipoint (e.g. groupcast) and PM-to-PM is point-to-point communication (unicast). The PL-to-PM and PM-to-PM V2X communications are depicted in FIG. 21.

In the platooning scenario, PL may broadcast SLSS for PM(s) as SyncRef. Hence, if SLSS carry PL identification then PMs may use periodical SLSS as SL-RS for performing BFD and CBI for link recovery between PL and PM. In this case, SLSS can be configured for SL-failureDetectionResources set $\bar{q}_{0,SL}$ and candidateBeamRSList set $\bar{q}_{1,SL}$, respectively. PL identifier (ID) can be signaled via the following options SL SSID, e.g. assign one SSID from NR SL-SSID 0, . . . , M (e,g. M=672) as PL SSID. For example, SSID=2 as PL SSID.

SL PBCH, e.g., master bit information transmits over PSBCH. A single bit to indicate whether the sender is PL or not can be introduced on SL-PBCH content.

Measurement with the SL-DMRS or Sequence of Feedback Channel PSFCH: TX UE may use the SL-DMRS of feedback channel (e.g., modulation based PSFCH) or the sequence of the feedback channel (e.g., sequence based PSFCH) for measurement when HARQ-ACK/NACK or SL-CSI-RS reporting are/is enabling. Disclosed herein, PSFCH may be used for the following purposes:

HARQ-ACK/NACK only
SL CSI only
HARQ-ACK/NACK+SL CSI
BFRQ indication

PSFCH may be designed by the following methods:

Sequence based, in this case, HARQ-ACK/NACK information is based on a sequence. The PSFCH may be occupied more than 2 symbols in a slot. If Zadoff-Chu sequence is used for this design. For example, the following may be defined as a sequence $r_{u,v}^{(\alpha)}(n) = e^{j\alpha n} \bar{r}_{u,v}^{(\alpha)}(n)$, where $0 \leq n \leq N$ is the length of PSFCH for HARQ-ACK/NACK sequence. HARQ-ACK/NACK information like {0, 1} or {00, 01, 10, 11} can be mapped to different (cyclic-shift) values of a for a root sequence which is derived by parameters u and v.

UCI with SL-DMRS, in this case, UCI will use BPSK or QPSK for modulation order. The PSFCH may be occupied more than 2 symbols in a slot.

For example, HARQ-ACK/NACK only, BFRQ indication can be based on sequence based PSFCH. For SL CSI and HARQ-ACK/NACK+SL CSI, they can be based on UCI with DMRS based PSFCH.

FR1 assisted FR2 BFR: In some implementations, UE may utilize both SL FR1 and FR2 band for SL communication. For example, UE may use FR1 as the major carrier for SL communication and use FR2 as an auxiliary band. Therefore, when FR2 is blocked, UE may still use FR1 to communicate with each other. The discovery procedure (discovery announcement) between UE 241 and UE 242 may be done in FR1 band, as well as the support of FR2 bands' SL communications. After the discovery announcement procedure between UE 241 and UE 242, UE 241 and UE 242 may establish SL communication with the following cases.

For case 1, UE 241 and UE 242 are communicated on FR1 or FR2 at a time. For instance, if UE 241 and UE 242 has a SL on FR2, but the link fails due to the beam failing occurring. In this case, UE 241 and UE 242 may switch to the link on FR1, previously configured or default, for recovering the FR2 links.

For case 2, UE 241 and UE 242 are having (at least) two links, e.g., one link is on FR1 and the other is on FR2. In this case, if one of the links fails, for example, the link on FR2 fails due to beam failing then UE may decide whether to restore the link on FR2 or not. If UE want to restore the link on FR2, then UE may exchange signaling via the link on FR1 to recover the FR2 link if the link on FR1 is still functionable.

Figure 22:
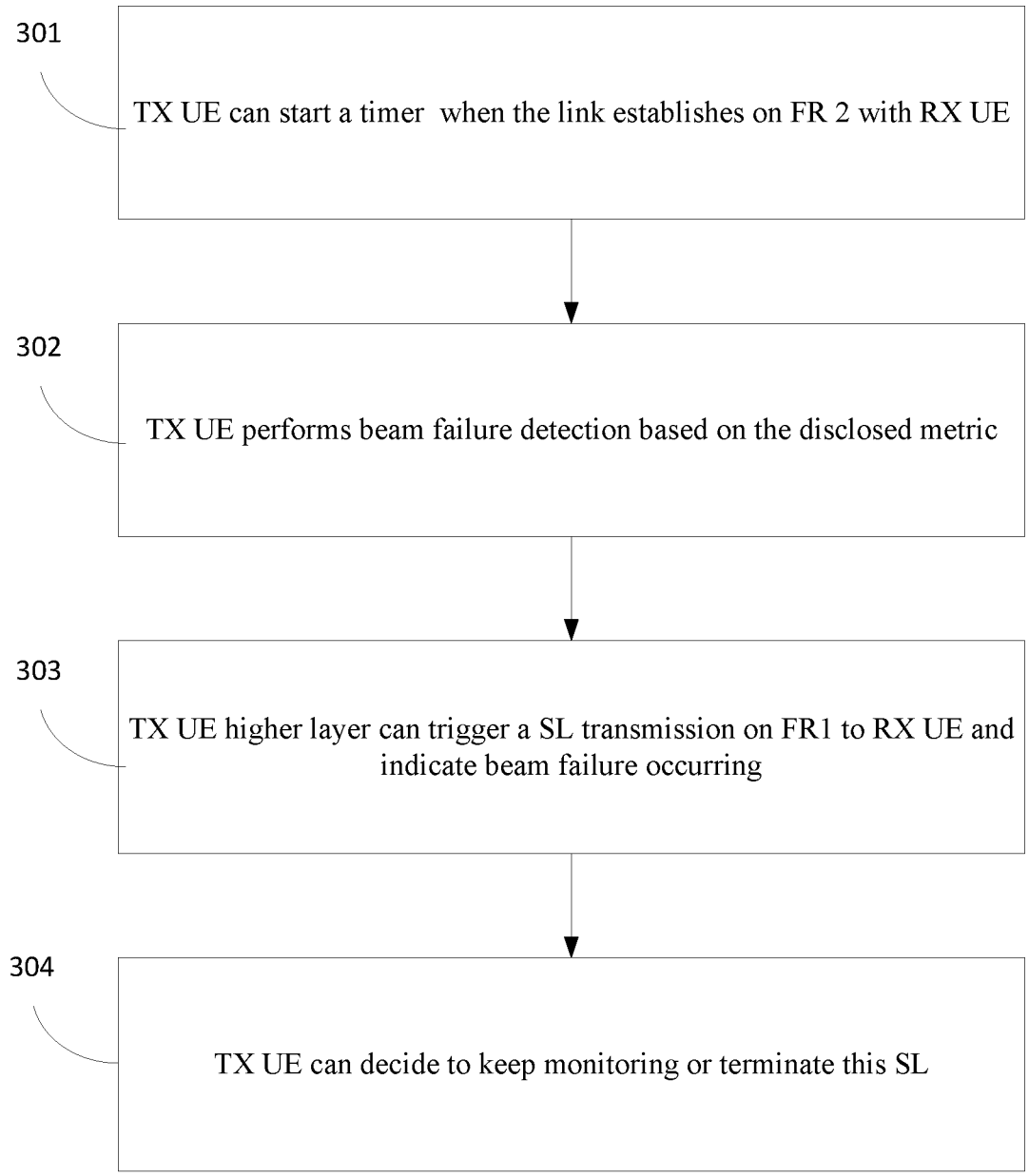
FIG. 22 illustrates an exemplary method for TX/source UE performing BFR via FR1 to assist FR2.

For above cases, when SL communication on FR2 fails due to beam failing, we disclose the following methods to use FR1 to assist FR2 when BFR occurs:

TX/source UE perform BFR via FR1 to assist FR2 (FIG. 22)

Step 301: TX UE can start a timer $T_1$ (in terms of ms) when the link establishes on FR2 with RX UE.

Step 302: TX UE performs beam failure detection based on the disclosed metric (e.g. based on HARQ-ACK/NACK, no-feedback, or PSFCH channel quality, the details can be referred to the section BFR performed at TX/source UE second step in Option 1, 2, or 3)

Step 303: Upon higher layer receiving one or more beam failure from physical layer and if no ACK indication is received from physical layer before timer $T_1$ expiry, then TX UE higher layer may trigger a SL transmission on FR1 to RX UE and indicate beam failure occurring. In this case, TX UE and RX UE may switch to the link on FR1 which is previously configured for recovering the FR2 links. TX UE may send a beam sweeping burst to RX UE. A beam sweeping burst may consist of multiple beam-formed blocks as aforementioned and each block duration is one slot, e.g. for SCS=15 KHz, only one block needs to be transmitted in a burst. Since RX UE constantly monitoring SL on FR1 in mode 2, hence, RX UE may receive the BF indication without TX UE reserving a resource based on sensing. For mode 1, network can dynamically schedule/reserve the resource on FR1 for TX UE to transmit the beam sweeping burst so RX UE can monitor the transmitted data from TX UE on FR1. When TX UE and RX UE are having (at least) two links, in this case, if one of the links fails, for example, the link on FR2 fails due to beam failing then UE may decide whether to restore the link on FR2 or not. If UE want to restore the link on FR2, then UE may exchange signaling via the link on FR1 to recover the FR2 link if the link on FR1 is still functionable. For case 2 when TX UE may try to recover the FR2 link, TX UE may not need to transmit a beam sweeping burst because the link on FR1 is still working. Hence, TX UE just (re)transmit a data (e.g. PSCCH and PSSCH) which carries BF indication and/or retransmission data. The PSCCH and PSSCH may be applied with the beam which is beam correspondence to RX UE. The transmitted content when BF occurs on FR2 may include which component carrier (CC) (e.g. FR2) index, resource pool index (on FR2) with or without new beam indices (e.g. a or multiple SL-CSI-RS(s)). In addition, it may include retransmission and feedback resource on FR2. Once RX UE receives the BFR indication on FR1 then RX UE can monitor the selected resource on FR2 to perform BFR and transmit the feedback back to TX UE on FR2. If TX UE physical layer sends an indication(s) to higher layer upon receiving one ACK from the RX/target UE on FR2 before the timer $T_1$ expires, then TX UE can reset he timer $T_1$ and physical layer continues with (re)transmission with RX UE on FR2 because the radio link on FR2 has recovered.

Step 304: If there is not any beam failure indication sends to higher layer upon expiry of timer $T_1$ on FR2, then TX UE determines to keep monitoring or terminate this SL.

Figure 23:
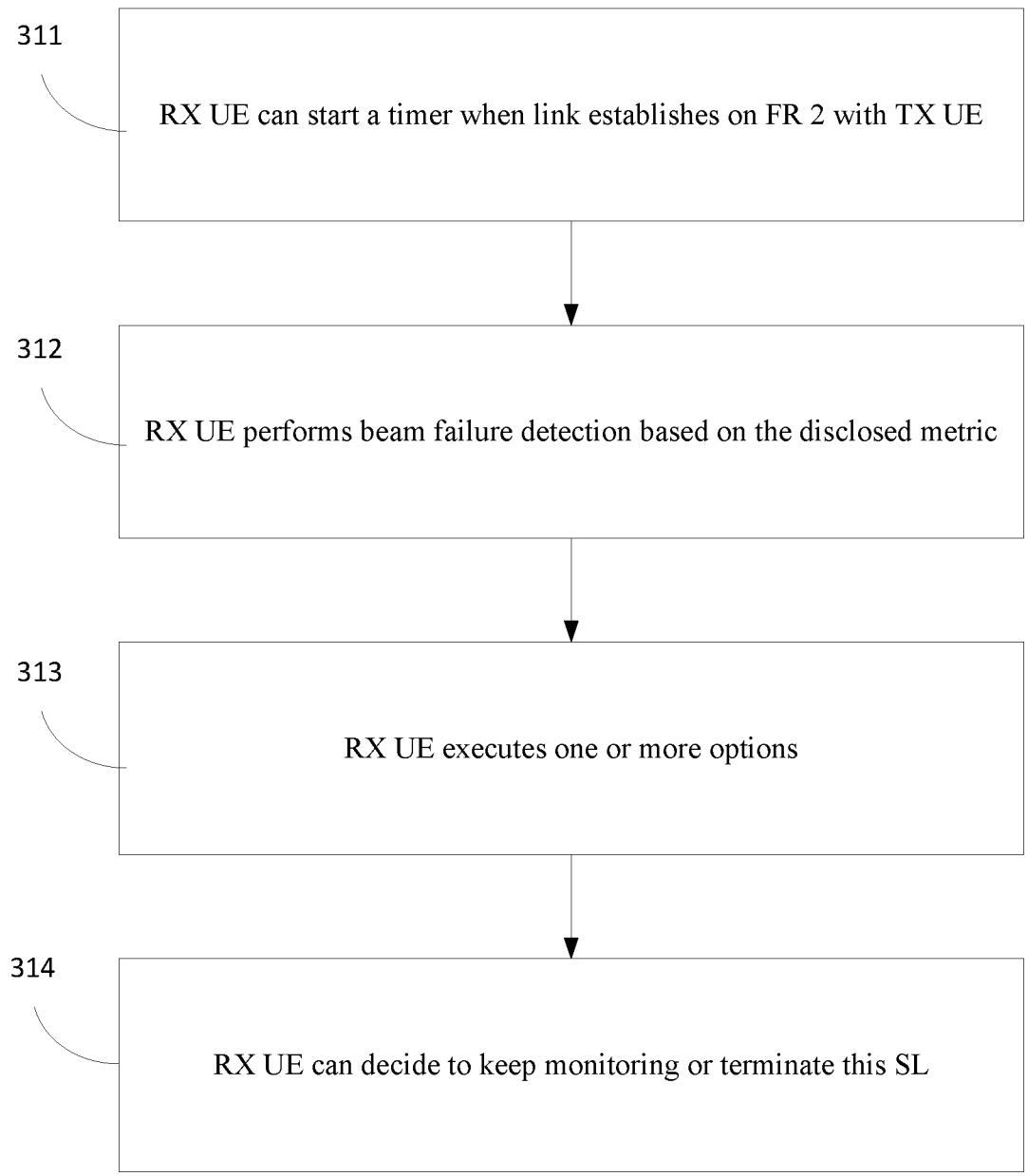
FIG. 23 illustrates an exemplary method for RX/target UE perform BFR via FR1 to assist FR2.

RX/target UE perform BFR via FR1 to assist FR2 (FIG. 23)

Step 311: RX UE can start a timer $T_1$ (in terms of ms) when link establishes on FR2 with TX UE.

Step 312: RX UE performs beam failure detection based on the disclosed metric (e.g. based on SL-RS, the details can be referred to the section BFR performed at RX/target UE second step in Option 1 or 2)

Step 313: Upon higher layer receiving one or more beam failure indication when timer $T_1$ has not expired, then RX UE:

can trigger beam failure request (BFRQ) and send BFRQ indication to TX UE on frequency range (FR1). The transmitted content of BFRQ may include the component carrier (FR2) failing index, resource pool index (on FR2) with or without reporting candidate beams (i.e. no SL-CSI-RS or other SL-RSs). If candidate beams are included in the content of BFRQ indication, then RX UE can send identified candidate SL-CSI-RS resource configuration index new provided by higher layers to TX UE via PSCCH and PSSCH on FR1. For SL recovery, we propose two options: For the option 1, TX UE and RX UE may switch to the link on FR1 which is previously configured for recovering the FR2 links. In case 1, RX UE may transmit a beam sweeping burst on FR1 try to restore the link on FR2. For the option 2, RX UE may just need to transmit a beam sweeping block on FR1 instead of using beam sweeping when the link on FR1 is still functionable. For case 2, if the link on FR1 is not functionable (i.e., link failing also on FR1) then like case 1, RX UE may transmit a beam sweeping burst on FR1 to try to restore the link on FR2. TX UE may constantly monitor SL on FR1 in mode 2, hence, TX UE can receive the BF indication without RX UE reserving a resource in advance; or RX UE may instruct TX UE to reserve a resource when there is a BF event occurring. For mode 1, network can reserve the resource on FR1 for TX UE to monitor an occurred BF when there is a request from RX UE. The transmitted content of BFRQ may include which component carrier (FR2) index, resource pool index (on FR2) as well as new beam indices (e.g. a or multiple SL-CSI-RS(s)/other SL-RS) if new beam(s) can be identified. If TX UE sends PSCCH and PSSCH to the RX/target UE on FR2 and RX UE can successfully decode the PSCCH and PSSCH before the timer $T_2$ and $T_1$ expires, then RX UE can stop the timer $T_2$ and physical layer continues with reception from TX UE on FR2, otherwise, when timer $T_2$ expires but not $T_1$. RX UE can resend the BFRQ again to TX UE on FR1.

Step 314: If there is not any beam failure indication, RX UE may send to higher layer upon expiry of timer $T_1$ on FR2, then RX UE may make a determination to keep monitoring or terminate this SL.

Figure 24A:
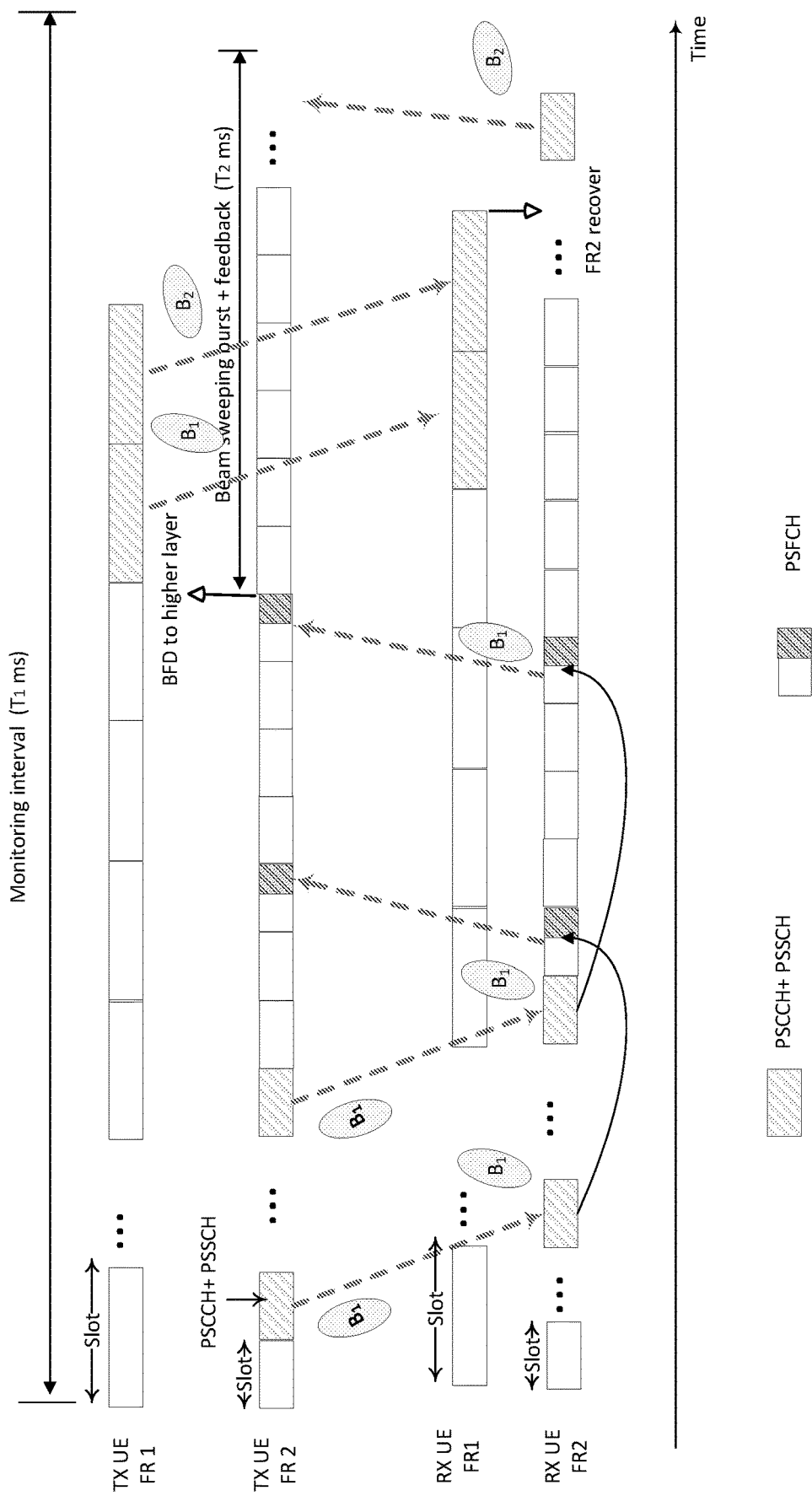
FIG. 24A illustrates exemplary FR1 assist FR2 BFR when TX UE and RX UE are communicated on FR2 or FR1 at a time: TX UE perform BFR.
Figure 24B:
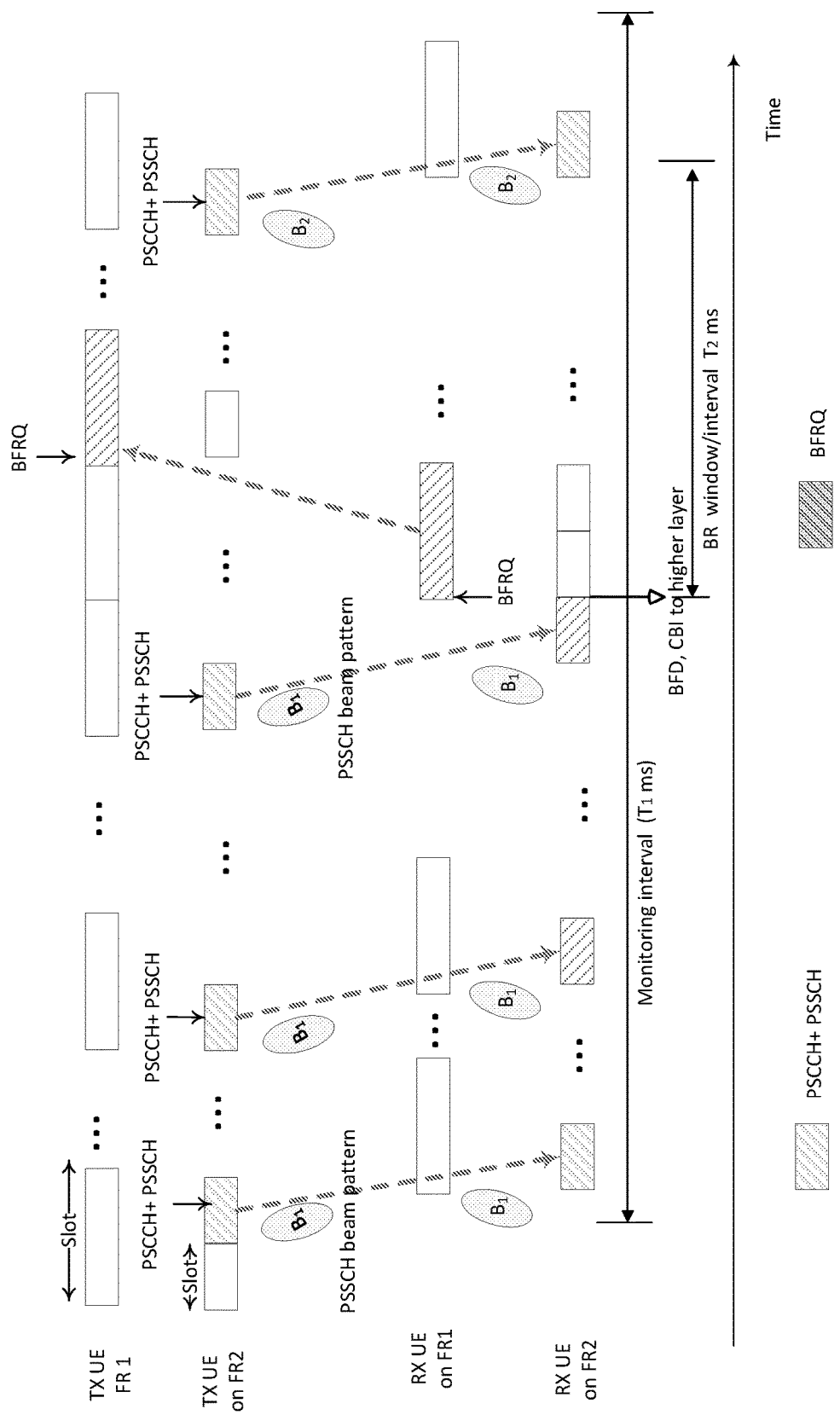
FIG. 24B illustrates exemplary FR1 assist FR2 BFR when TX UE and RX UE are communicated on FR2 or FR1 at a time: RX UE perform BFR.

The disclosed methods of FR1 assist FR2 BFR may be summarized in FIG. 16. In FIG. 24A-FIG. 24B, TX UE and RX UE are communicated on FR2 or FR1 at a time: TX UE perform BFR (FIG. 24A); or RX UE perform BFR (FIG. 24B).

SL Beam Indication: Disclosed herein, NR SL may support beam indication for unicast or groupcast. This may imply a certain PSCCH or PSSCH transmission uses the same transmission beam as a configured sidelink reference signal (e.g. SL-CSI-RS). Beam indication can be based on the configuration and signaling of TCI states on SL. Each TCI state includes information about a SL-RS (e.g. SL-CSI-RS) by associating PSCCH or PSSCH with a certain TCI. Since the TCI state is for the indication of SL-RS associating with PSCCH or PSSCH, therefore, TCI state can be carried by the 2nd-stage SCI. UE can assume that the SL transmission is done using the same spatial filter as the reference signal associated with that TCI. UE can be configured with up to M candidate TCI states on SL. For beam indication for PSCCH, a subset of the M configured candidate states are assigned by higher layer RRC signaling to each configured CORESET or search space for each SL bandwidth part (BWP). UE can assume that the PSCCH transmission uses the same spatial filter as the reference signal associated with the MAC-indicated TCI. On SL, PSSCH beam indication can be assumed it is QCLed with PSCCH when they are transmitted within a slot.

Figure 25:
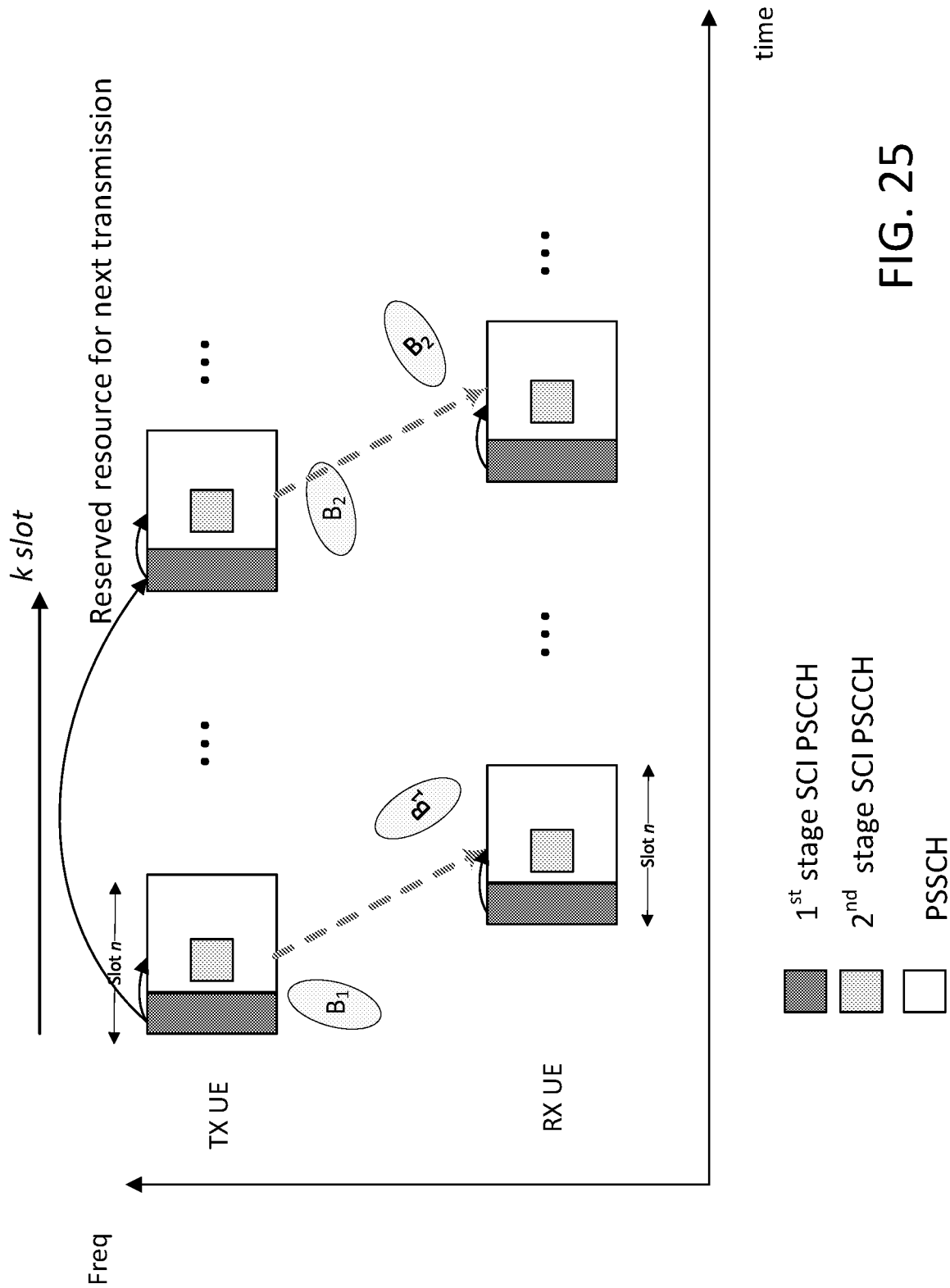
FIG. 25 illustrates exemplary TX UE indicate new beam switching for next transmission opportunity.

To save beam sweeping overhead and RX UE can perform fast beam training (i.e., beam refinement between TX and RX UE), we disclose if TX UE reserve the next transmission opportunity and the reserved transmission opportunity is Q slots away from the current transmission slot; then TX UE may indicate a beam indication via SCI for the reserved transmission opportunity at this current transmission opportunity. Therefore, RX UE can decide whether performing fast beam training or not at next reserved transmission opportunity. In FIG. 25, TX UE indicate new beam refinement/training for next transmission opportunity.

It is understood that the entities performing one or more steps illustrated herein, such as FIG. 1-FIG. 25, may be logical entities. The steps may be stored in a memory of, and executing on a processor of, a device, server, or computer system such as those illustrated in FIG. 19A-FIG. 19G. Skipping steps, combining steps, or adding steps between exemplary methods disclosed herein (e.g., FIG. 1, FIG. 7, FIG. 13, FIG. 16, FIG. 22, etc.) is contemplated. Table 3 shows abbreviations and definitions of terms that may be disclosed herein.

TABLE 3

| Abbreviations and Definitions | |
|---|---|
| Abbreviations | Definitions |
| BWP | Bandwidth Part |
| BFR | Beam Failure Recovery |
| CA | Carrier Aggregation |
| CRI | CSI-RS Resource Index' |
| CSI-RS | Channel State Information Reference Signal |
| DC | Dual Connectivity |
| DL | Downlink |

TABLE 3-continued

Abbreviations and Definitions

| Abbreviations | Definitions |
| --- | --- |
| DL-SCH | Downlink Shared Channel |
| DMRS | Demodulation Reference Signal |
| eNB | Evolved Node B |
| FDD | Frequency Division Duplex |
| FR1 | Frequency region 1 (sub 6 GHz) |
| FR2 | Frequency region 2 (mm Wave) |
| gNB | NR NodeB |
| HARQ | Hybrid ARQ |
| L1 | Layer 1 |
| LTE | Long Term Evolution |
| MAC | Medium Access Control |
| NR | New Radio |
| OFDM | Orthogonal Frequency Division Multiplexing |
| PHY | Physical Layer |
| PSCCH | Physical Sidelink Control Channel |
| PSSCH | Physical Sidelink Shared Channel |
| QCL | Quasi CoLocation |
| RACH | Random Access Channel |
| RLM | Radio Link Monitoring |
| RRC | Radio Resource Control |
| RS | Reference signal |
| RSRP | Reference Signal Received Power |
| RSRQ | Reference Signal Received Quality |
| SCI | Sidelink Control Information |
| SL | SideLink |
| SL-CSI-RS | Sidelink Channel State Information Reference Signal |
| SL-DMRS | Sidelink Demodulation Reference Signal |
| SL-RS | Sidelink Reference Signal |
| SLSS | Sidelink Synchronization Signal |
| SR | Scheduling Request |
| SPS | SemiPersistent Scheduling |
| TCI | Transmission Configuration Indicator |
| TDD | Time Division Duplex |
| UE | User Equipment |
| UL | Uplink |
| UL-SCH | Uplink Shared Channel |
| V2V | Vehicle-to-Vehicle |
| V2X | Vehicle-to-everything |

Figure 26:
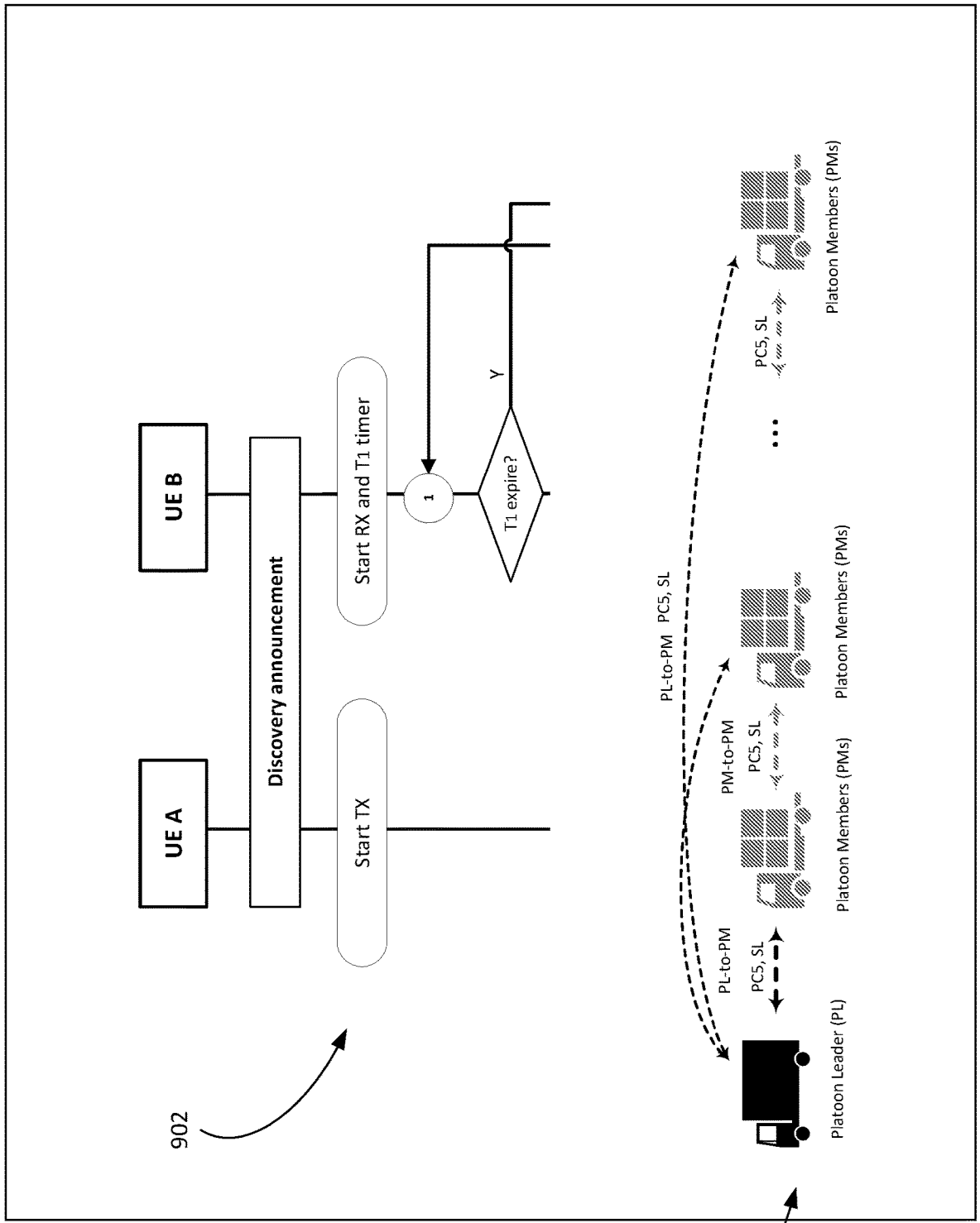
FIG. 26 illustrates an exemplary display (e.g., graphical user interface) that may be generated based on the methods, systems, and devices of link recovery and sidelink beamforming.

FIG. 26 illustrates an exemplary display (e.g., graphical user interface) that may be generated based on the methods, systems, and devices of link recovery and sidelink beamforming, as discussed herein. Display interface 901 (e.g., touch screen display) may provide text in block 902 associated with link recovery and sidelink beamforming, such as related parameters, method flow, and associated current conditions. Progress of any of the steps (e.g., sent messages or success of steps) discussed herein may be displayed in block 902. In addition, graphical output 902 may be displayed on display interface 901. Graphical output 903 may be the topology of the devices implementing the methods, systems, and devices of link recovery and sidelink beamforming, a graphical output of the progress of any method or systems discussed herein, or the like.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

Figure 27A:
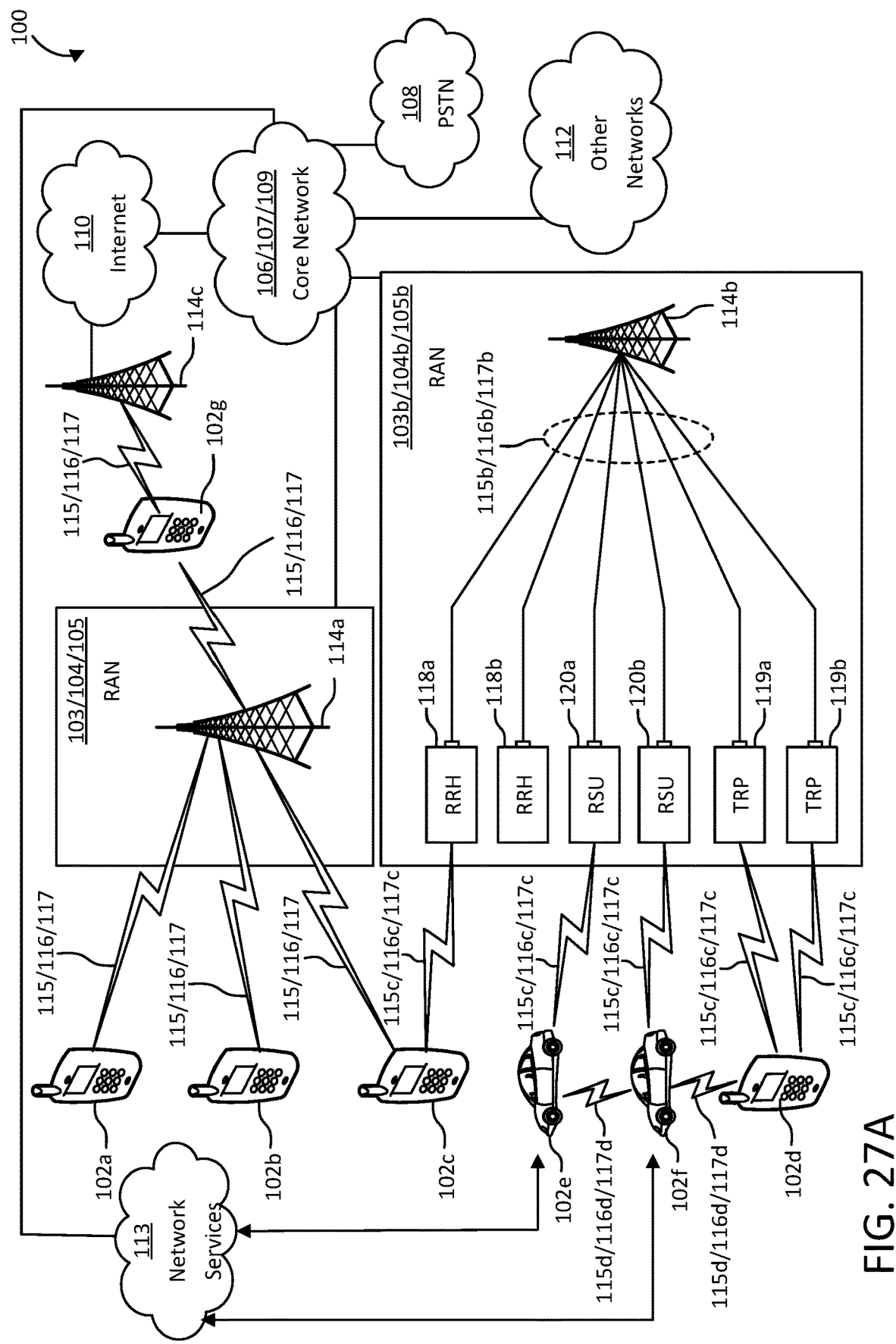
FIG. 27A illustrates an example communications system.

FIG. 27A illustrates an example communications system 100 in which the methods and apparatuses of link recovery and sidelink beamforming, such as the systems and methods illustrated in FIG. 5 through FIG. 21 described and claimed herein may be used. The communications system 100 may include wireless transmit/receive units (WTRUs) 102a, 102b, 102c, 102d, 102e, 102f, or 102g (which generally or collectively may be referred to as WTRU 102 or WTRUs 102). The communications system 100 may include, a radio access network (RAN) 103/104/105/103b/104b/105b, a core network 106/107/109, a public switched telephone network (PSTN) 108, the Internet 110, other networks 112, and Network Services 113. Network Services 113 may include, for example, a V2X server, V2X functions, a ProSe server, ProSe functions, IoT services, video streaming, or edge computing, etc.

It will be appreciated that the concepts disclosed herein may be used with any number of WTRUs, base stations, networks, or network elements. Each of the WTRUs 102a, 102b, 102c, 102d, 102e, 102f, or 102g may be any type of apparatus or device configured to operate or communicate in a wireless environment. Although each WTRU 102a, 102b, 102c, 102d, 102e, 102f, or 102g may be depicted in FIG. 27A, FIG. 27B, FIG. 27C, FIG. 27D, FIG. 27E, or FIG. 27F as a hand-held wireless communications apparatus, it is understood that with the wide variety of use cases contemplated for 5G wireless communications, each WTRU may comprise or be embodied in any type of apparatus or device configured to transmit or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus, truck, train, or airplane, and the like.

The communications system 100 may also include a base station 114a and a base station 114b. In the example of FIG. 27A, each base stations 114a and 114b is depicted as a single element. In practice, the base stations 114a and 114b may include any number of interconnected base stations or network elements. Base stations 114a may be any type of device configured to wirelessly interface with at least one of the WTRUs 102a, 102b, and 102c to facilitate access to one or more communication networks, such as the core network 106/107/109, the Internet 110, Network Services 113, or the other networks 112. Similarly, base station 114b may be any type of device configured to wiredly or wirelessly interface with at least one of the Remote Radio Heads (RRHs) 118a, 118b, Transmission and Reception Points (TRPs) 119a, 119b, or Roadside Units (RSUs) 120a and 120b to facilitate access to one or more communication networks, such as the core network 106/107/109, the Internet 110, other networks 112, or Network Services 113. RRHs 118a, 118b may be any type of device configured to wirelessly interface with at least one of the WTRUs 102, e.g., WTRU 102c, to facilitate access to one or more communication networks, such as the core network 106/107/109, the Internet 110, Network Services 113, or other networks 112

TRPs 119a, 119b may be any type of device configured to wirelessly interface with at least one of the WTRU 102d, to facilitate access to one or more communication networks, such as the core network 106/107/109, the Internet 110, Network Services 113, or other networks 112. RSUs 120a and 120b may be any type of device configured to wirelessly interface with at least one of the WTRU 102e or 102f, to facilitate access to one or more communication networks, such as the core network 106/107/109, the Internet 110, other networks 112, or Network Services 113. By way of example, the base stations 114a, 114b may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114a may be part of the RAN 103/104/105, which may also include other base stations or network elements (not shown), such as a Base Station Controller (BSC), a Radio Network Controller (RNC), relay nodes, etc. Similarly, the base station 114b may be part of the RAN 103b/104b/105b, which may also include other base stations or network elements (not shown), such as a BSC, a RNC, relay nodes, etc. The base station 114a may be configured to transmit or receive wireless signals within a particular geographic region, which may be referred to as a cell (not shown). Similarly, the base station 114b may be configured to transmit or receive wired or wireless signals within a particular geographic region, which may be referred to as a cell (not shown) for methods, systems, and devices of link recovery and sidelink beamforming, as disclosed herein. Similarly, the base station 114b may be configured to transmit or receive wired or wireless signals within a particular geographic region, which may be referred to as a cell (not shown). The cell may further be divided into cell sectors. For example, the cell associated with the base station 114a may be divided into three sectors. Thus, in an example, the base station 114a may include three transceivers, e.g., one for each sector of the cell. In an example, the base station 114a may employ multiple-input multiple output (MIMO) technology and, therefore, may utilize multiple transceivers for each sector of the cell.

The base stations 114a may communicate with one or more of the WTRUs 102a, 102b, 102c, or 102g over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b, TRPs 119a, 119b, or RSUs 120a, 120b, over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b, TRPs 119a, 119b or RSUs 120a, 120b, may communicate with one or more of the WTRUs 102c, 102d, 102e, 102f over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

The WTRUs 102a, 102b, 102c,102d, 102e, or 102f may communicate with one another over an air interface 115d/116d/117d, such as Sidelink communication, which may be any suitable wireless communication link (e.g., radio frequency (RF), microwave, infrared (IR), ultraviolet (UV), visible light, cmWave, mmWave, etc.). The air interface 115d/116d/117d may be established using any suitable radio access technology (RAT).

The communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b,TRPs 119a, 119b and RSUs 120a, 120b, in the RAN 103b/104b/105b and the WTRUs 102c, 102d, 102e, 102f, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) or Evolved HSPA (HSPA+). HSPA may include High-Speed Downlink Packet Access (HSDPA) or High-Speed Uplink Packet Access (HSUPA).

In an example, the base station 114a and the WTRUs 102a, 102b, 102c, or RRHs 118a, 118b, TRPS 119a, 119b, or RSUs 120a, 120b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) or LTE-Advanced (LTE-A). In the future, the air interface 115/116/117 or 115c/116c/117c may implement 3GPP NR technology. The LTE and LTE-A technology may include LTE D2D and V2X technologies and interfaces (such as Sidelink communications, etc.). Similarly, the 3GPP NR technology includes NR V2X technologies and interface (such as Sidelink communications, etc.).

The base station 114a in the RAN 103/104/105 and the WTRUs 102a, 102b, 102c, and 102g or RRHs 118a, 118b, TRPS 119a, 119b or RSUs 120a, 120b in the RAN 103b/104b/105b and the WTRUs 102c, 102d, 102e, 102f may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 27A may be a wireless router, Home Node B, Home eNode B, or access point, for example, and may utilize any suitable RAT for facilitating wireless connectivity in a localized area, such as a place of business, a home, a vehicle, a train; an aerial, a satellite, a manufactory, a campus, and the like, for implementing the methods, systems, and devices of link recovery and sidelink beamforming, as disclosed herein. In an example, the base station 114c and the WTRUs 102, e.g., WTRU 102e, may implement a radio technology such as IEEE 802.11 to establish a wireless local area network (WLAN). Similarly, the base station 114c and the WTRUs 102d, may implement a radio technology such as IEEE 802.15 to establish a wireless personal area network (WPAN). In yet another example, the base station 114c and the WTRUs 102, e.g., WTRU 102e, may utilize a cellular-based RAT (e.g., WCDMA, CDMA2000, GSM, LTE, LTE-A, NR, etc.) to establish a picocell or femtocell. As shown in FIG. 27A, the base station 114c may have a direct connection to the Internet 110. Thus, the base station 114c may not be required to access the Internet 110 via the core network 106/107/109.

The RAN 103/104/105 or RAN 103b/104b/105b may be in communication with the core network 106/107/109, which may be any type of network configured to provide voice, data, messaging, authorization and authentication, applications, or voice over internet protocol (VoIP) services to one or more of the WTRUs 102a, 102b, 120c, 120d. For example, the core network 106/107/109 may provide call control, billing services, mobile location-based services, pre-paid calling, Internet connectivity, packet data network connectivity, Ethernet connectivity, video distribution, etc., or perform high-level security functions, such as user authentication.

Although not shown in FIG. 27A, it will be appreciated that the RAN 103/104/105 or RAN 103b/104b/105b or the core network 106/107/109 may be in direct or indirect communication with other RANs that employ the same RAT as the RAN 103/104/105 or RAN 103b/104b/105b or a different RAT. For example, in addition to being connected to the RAN 103/104/105 or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 120a, 102b, 120c, 120d, 120e to access the PSTN 108, the Internet 110, or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned or operated by other service providers. For example, the networks 112 may include any type of packet data network (e.g., an IEEE 802.3 Ethernet network) or another core network connected to one or more RANs, which may employ the same RAT as the RAN 103/104/105 or RAN 103b/104b/105b or a different RAT.

Some or all of the WTRUs 102a, 102b, 120c, 120d, 120e, and 120f in the communications system 100 may include multi-mode capabilities, e.g., the WTRUs 102a, 102b, 120c, 120d, 120e, and 120f may include multiple transceivers for communicating with different wireless networks over different wireless links for implementing methods, systems, and devices of link recovery and sidelink beamforming, as disclosed herein. For example, the WTRU 102g shown in FIG. 27A may be configured to communicate with the base station 114a, which may employ a cellular-based radio technology, and with the base station 114c, which may employ an IEEE 802 radio technology.

Although not shown in FIG. 27A, it will be appreciated that a User Equipment may make a wired connection to a gateway. The gateway maybe a Residential Gateway (RG). The RG may provide connectivity to a Core Network 106/107/109. It will be appreciated that many of the ideas contained herein may equally apply to UEs that are WTRUs and UEs that use a wired connection to connect to a network. For example, the ideas that apply to the wireless interfaces 115, 116, 117 and 115c/116c/117c may equally apply to a wired connection.

Figure 27B:
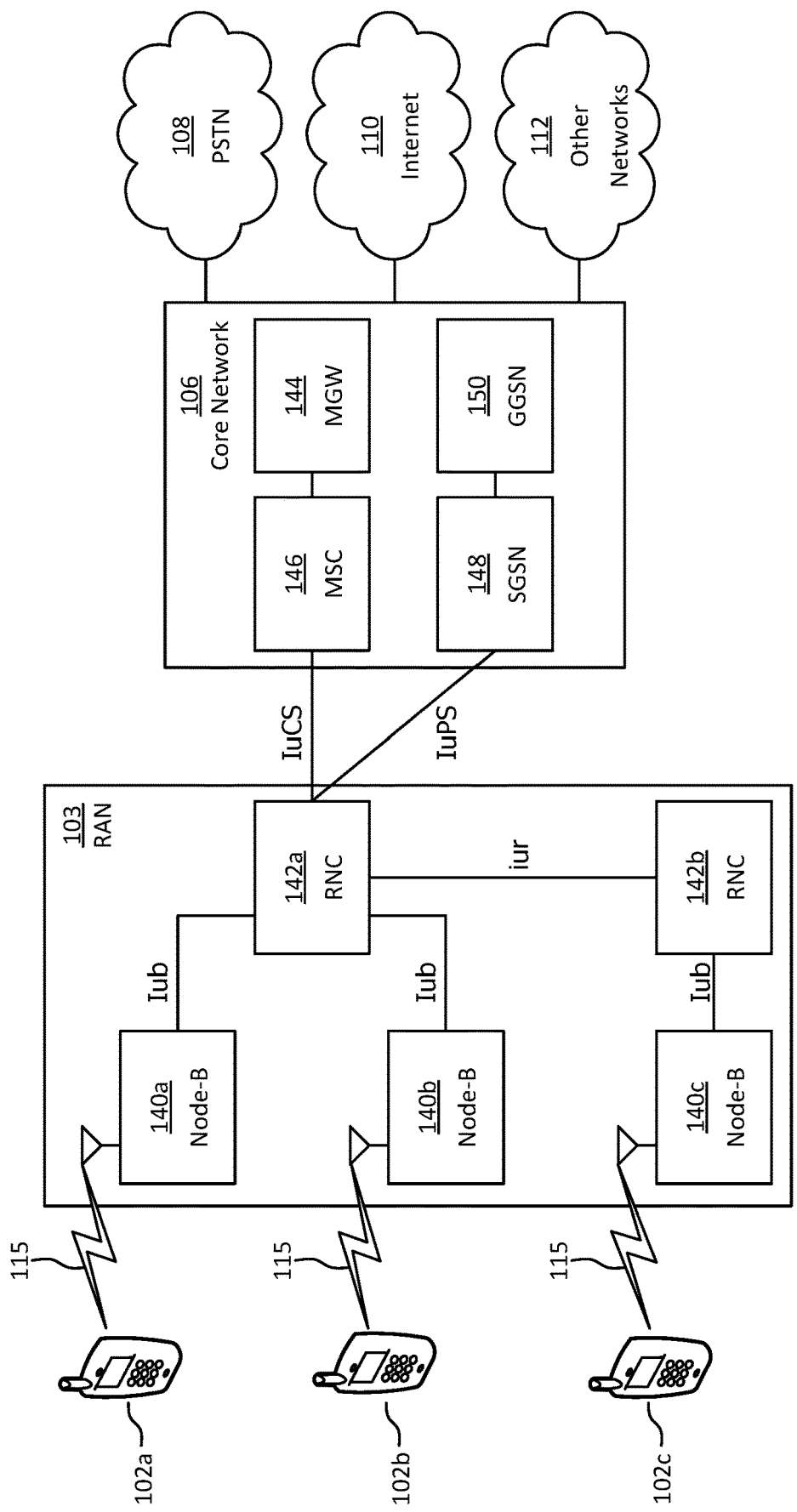
FIG. 27B illustrates an exemplary system that includes RANs and core networks.

FIG. 27B is a system diagram of an example RAN 103 and core network 106 that may implement methods, systems, and devices of link recovery and sidelink beamforming, as disclosed herein. As noted above, the RAN 103 may employ a UTRA radio technology to communicate with the WTRUs 102a, 102b, and 102c over the air interface 115. The RAN 103 may also be in communication with the core network 106. As shown in FIG. 27B, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a, 142b. It will be appreciated that the RAN 103 may include any number of Node-Bs and Radio Network Controllers (RNCs).

As shown in FIG. 27B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a nd 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 27B may include a media gateway (MGW) 144, a Mobile Switching Center (MSC) 146, a Serving GPRS Support Node (SGSN) 148, or a Gateway GPRS Support Node (GGSN) 150. While each of the foregoing elements are depicted as part of the core network 106, it will be appreciated that any one of these elements may be owned or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 120a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned or operated by other service providers.

Figure 27C:
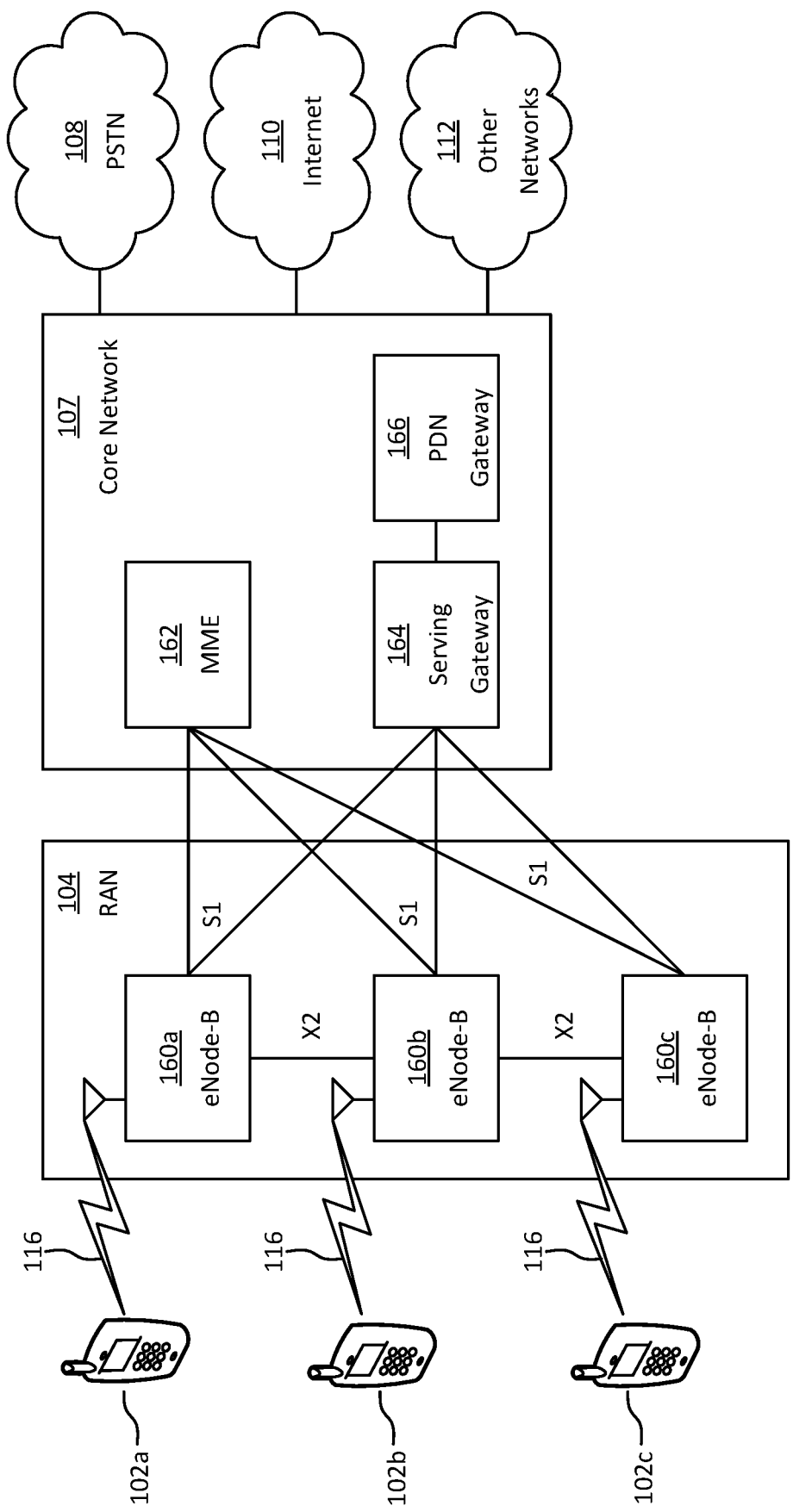
FIG. 27C illustrates an exemplary system that includes RANs and core networks.

FIG. 27C is a system diagram of an example RAN 104 and core network 107 that may implement methods, systems, and devices of link recovery and sidelink beamforming, as disclosed herein. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink or downlink, and the like. As shown in FIG. 27C, the eNode-Bs 160a, 160b, and 160c may communicate with one another over an X2 interface.

The core network 107 shown in FIG. 27C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the Si interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 120c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 120c with access to the networks 112, which may include other wired or wireless networks that are owned or operated by other service providers.

Figure 27D:
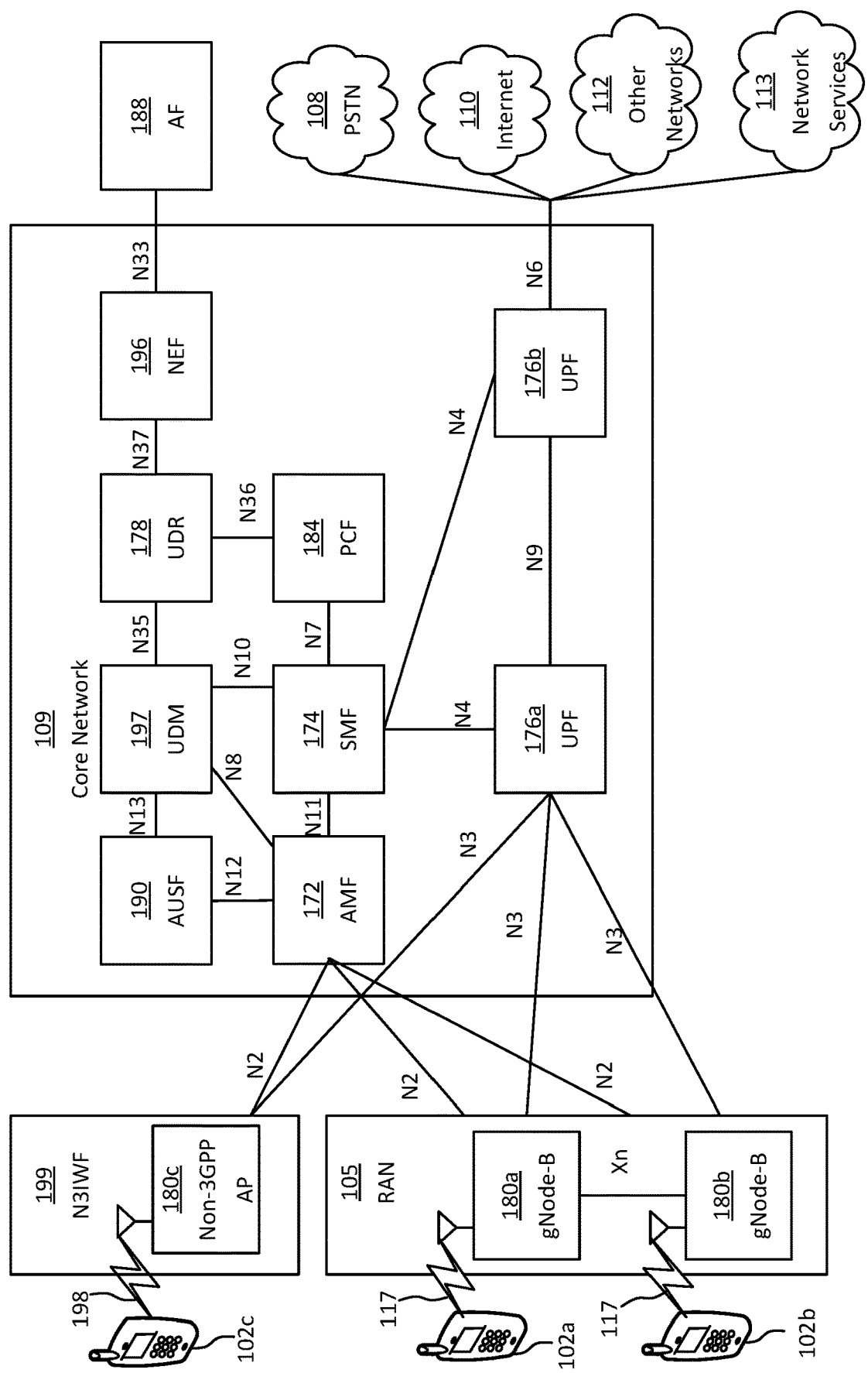
FIG. 27D illustrates an exemplary system that includes RANs and core networks.

FIG. 27D is a system diagram of an example RAN 105 and core network 109 that may implement methods, systems, and devices of link recovery and sidelink beamforming, as disclosed herein. The RAN 105 may employ an NR radio technology to communicate with the WTRUs 102a and 120b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 120b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, or digital beamforming technology. Thus, the gNode-B 180a, for example, may use multiple antennas to transmit wireless signals to, and receive wireless signals from, the WTRU 102a. It should be appreciated that the RAN 105 may employ of other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink or downlink, and the like. As shown in FIG. 27D, the gNode-Bs 180a and 180b may communicate with one another over an Xn interface, for example.

The core network 109 shown in FIG. 27D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless or network communications or a computer system, such as system 90 illustrated in FIG. 27G.

In the example of FIG. 27D, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned or operated by an entity other than the core network operator. It will also be appreciated that a 5G core network may not consist of all of these elements, may consist of additional elements, and may consist of multiple instances of each of these elements. FIG. 27D shows that network functions directly connect to one another, however, it should be appreciated that they may communicate via routing agents such as a diameter routing agent or message buses.

In the example of FIG. 27D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 27D.

The SMF 174 may be connected to the AMF 172 via an N11 interface. Similarly, the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 120b, and 102c, management and configuration of traffic steering rules in the UPF 176a and UPF 176b, and generation of downlink data notifications to the AMF 172.

The UPF 176a and UPF 176b may provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 27D. The PCF 184 may provide policy rules to control plane nodes such as the AMF 172 and SMF 174, allowing the control plane nodes to enforce these rules. The PCF 184, may send policies to the AMF 172 for the WTRUs 102a, 102b, and 102c so that the AMF may deliver the policies to the WTRUs 102a, 102b, and 102c via an N1 interface. Policies may then be enforced, or applied, at the WTRUs 102a, 102b, and 120c.

The UDR 178 may act as a repository for authentication credentials and subscription information. The UDR may connect to network functions, so that network function can add to, read from, and modify the data that is in the repository. For example, the UDR 178 may connect to the PCF 184 via an N36 interface. Similarly, the UDR 178 may connect to the NEF 196 via an N37 interface, and the UDR 178 may connect to the UDM 197 via an N35 interface.

The UDM 197 may serve as an interface between the UDR 178 and other network functions. The UDM 197 may authorize network functions to access of the UDR 178. For example, the UDM 197 may connect to the AMF 172 via an N8 interface, the UDM 197 may connect to the SMF 174 via an N10 interface. Similarly, the UDM 197 may connect to the AUSF 190 via an N13 interface. The UDR 178 and UDM 197 may be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect to an AF 188 via an N33 interface and it may connect to other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 27D, in a network slicing scenario, a WTRU 102a, 120b, or 120c may connect to an AMF 172, via an N1 interface, The AMF may be logically part of one or more slices. The AMF may coordinate the connection or communication of WTRU 120a, 102b, or 120c with one or more UPF 176a and 176b, SMF 174, and other network functions. Each of the UPFs 176a and 176b, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilitates communication via the short message service. For example, the 5G core network 109 may facilitate the exchange of non-IP data packets between the WTRUs 102a, 102b, and 102c and servers or applications functions 188. In addition, the core network 170 may provide the WTRUs 102a, 102b, and 102c with access to the networks 112, which may include other wired or wireless networks that are owned or operated by other service providers.

The core network entities described herein and illustrated in FIG. 27A, FIG. 27C, FIG. 27D, or FIG. 27E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIG. 27A, FIG. 27B, FIG. 27C, FIG. 27D, or FIG. 27E are provided by way of example only, and it is understood that the subject matter disclosed and claimed herein may be embodied or implemented in any similar communication system, whether presently defined or defined in the future.

Figure 27E:
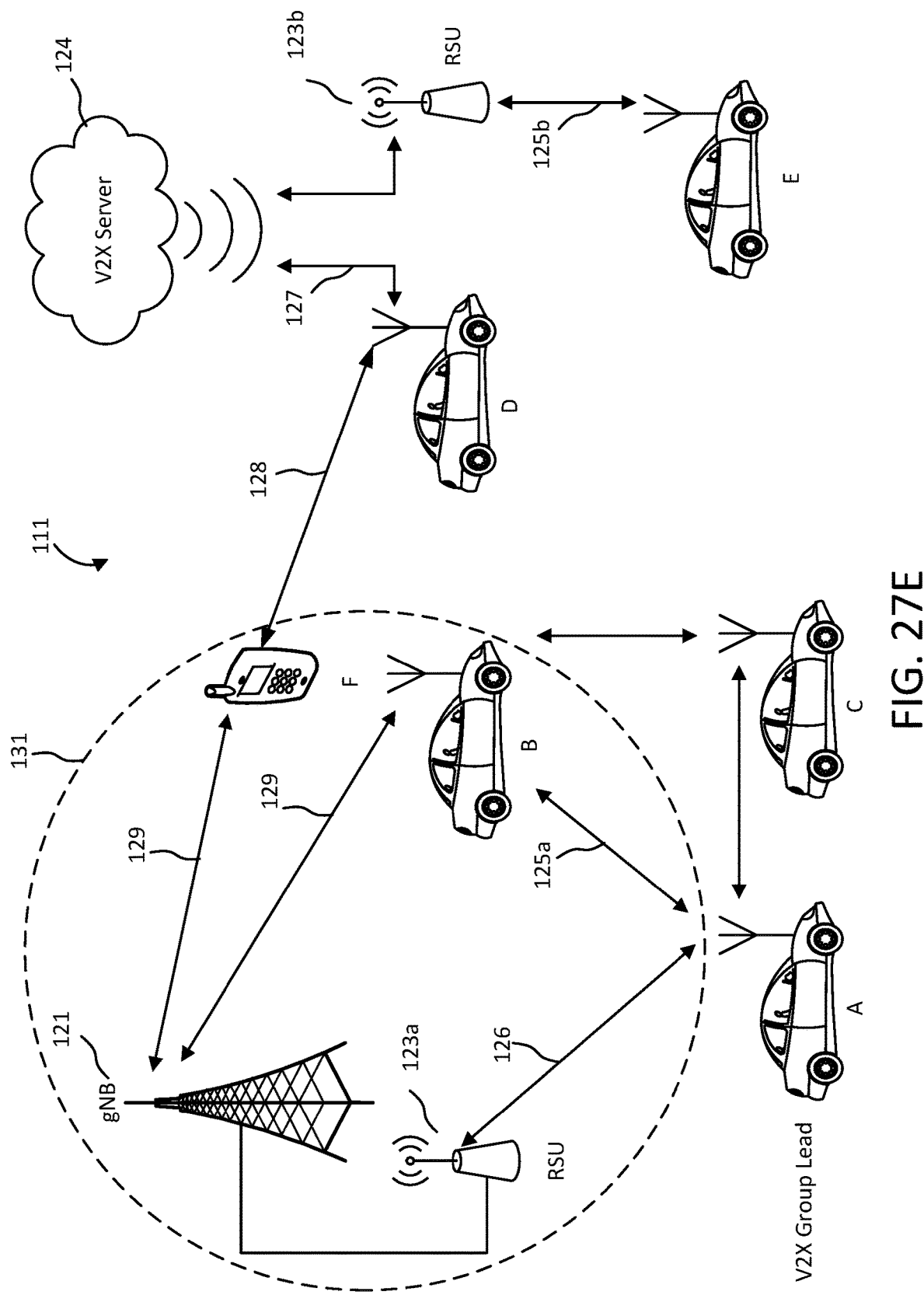
FIG. 27E illustrates another example communications system.

FIG. 27E illustrates an example communications system 111 in which the systems, methods, apparatuses that implement link recovery and sidelink beamforming, described herein, may be used. Communications system 111 may include Wireless Transmit/Receive Units (WTRUs) A, B, C, D, E, F, a base station gNB 121, a V2X server 124, and Road Side Units (RSUs) 123a and 123b. In practice, the concepts presented herein may be applied to any number of WTRUs, base station gNBs, V2X networks, or other network elements. One or several or all WTRUs A, B, C, D, E, and F may be out of range of the access network coverage 131. WTRUs A, B, and C form a V2X group, among which WTRU A is the group lead and WTRUs B and C are group members.

WTRUs A, B, C, D, E, and F may communicate with each other over a Uu interface 129 via the gNB 121 if they are within the access network coverage 131. In the example of FIG. 27E, WTRUs B and F are shown within access network coverage 131. WTRUs A, B, C, D, E, and F may communicate with each other directly via a Sidelink interface (e.g., PC5 or NR PC5) such as interface 125a, 125b, or 128, whether they are under the access network coverage 131 or out of the access network coverage 131. For instance, in the example of FIG. 27E, WRTU D, which is outside of the access network coverage 131, communicates with WTRU F, which is inside the coverage 131.

WTRUs A, B, C, D, E, and F may communicate with RSU 123a or 123b via a Vehicle-to-Network (V2N) 133 or Sidelink interface 125b. WTRUs A, B, C, D, E. and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 27F:
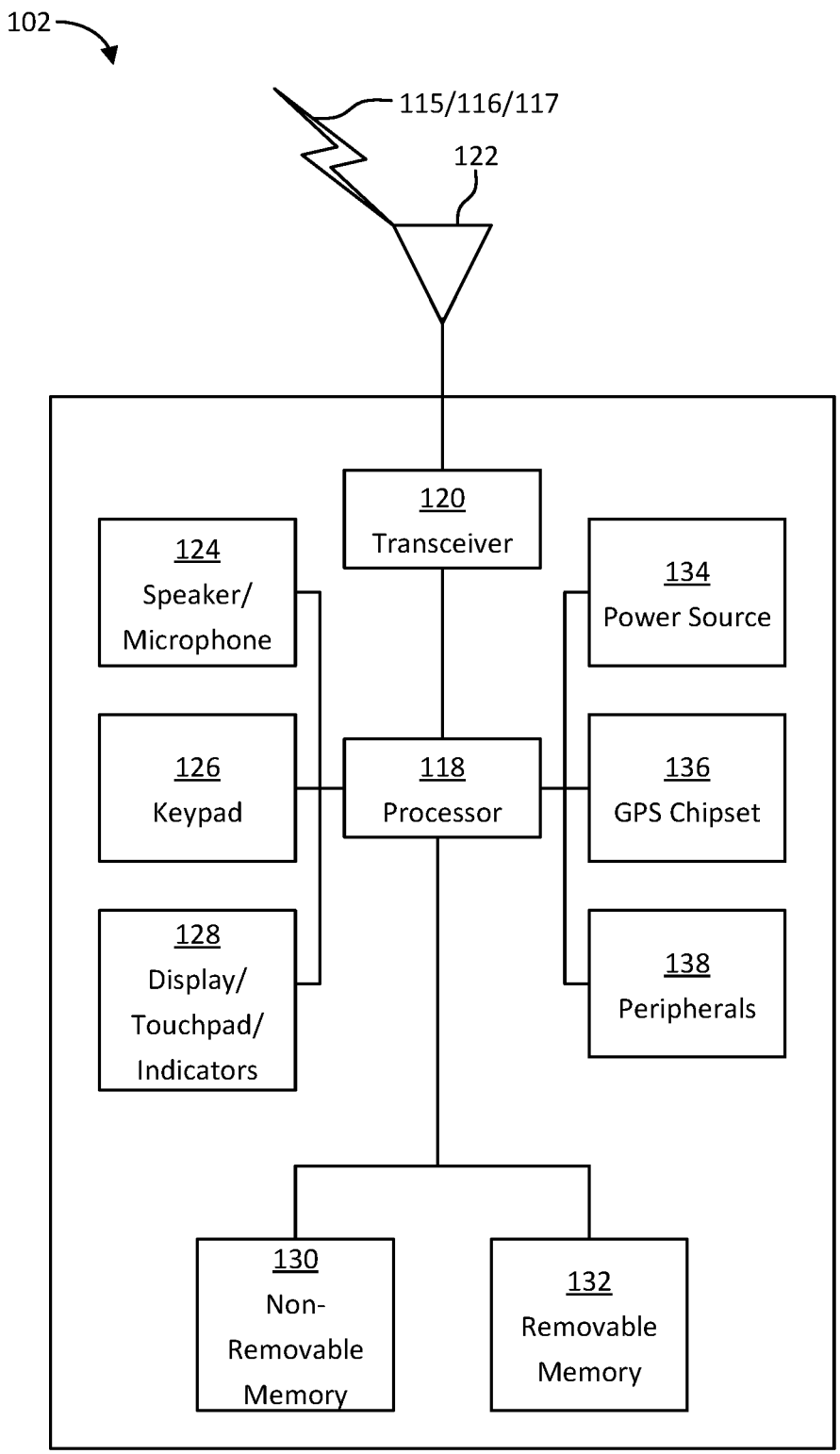
FIG. 27F is a block diagram of an example apparatus or device, such as a WTRU.

FIG. 27F is a block diagram of an example apparatus or device WTRU 102 that may be configured for wireless communications and operations in accordance with the systems, methods, and apparatuses that implement link recovery and sidelink beamforming, described herein, such as a WTRU 102 of FIG. 27A, FIG. 27B, FIG. 27C, FIG. 27D, or FIG. 27E, or FIG. 7, FIG. 13, etc. (e.g., UE 241 or UE 242). As shown in FIG. 27F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements. Also, the base stations 114a and 114b, or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 27F and may be an exemplary implementation that performs the disclosed systems and methods for link recovery and sidelink beamforming described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, or any other functionality that enables the WTRU 102 to operate in a wireless environment. The processor 118 may be coupled to the transceiver 120, which may be coupled to the transmit/receive element 122. While FIG. 27F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a of FIG. 27A) over the air interface 115/116/117 or another UE over the air interface 115d/116d/117d. For example, the transmit/receive element 122 may be an antenna configured to transmit or receive RF signals. The transmit/receive element 122 may be an emitter/detector configured to transmit or receive IR, UV, or visible light signals, for example. The transmit/receive element 122 may be configured to transmit and receive both RF and light signals. It will be appreciated that the transmit/receive element 122 may be configured to transmit or receive any combination of wireless or wired signals.

In addition, although the transmit/receive element 122 is depicted in FIG. 27F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 120 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, or the display/touchpad/indicators 128 (e.g., a liquid crystal display (LCD) display unit or organic light-emitting diode (OLED) display unit. The processor 118 may also output user data to the speaker/microphone 124, the keypad 126, or the display/touchpad/indicators 128. In addition, the processor 118 may access information from, and store data in, any type of suitable memory, such as the non-removable memory 130 or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown). The processor 118 may be configured to control lighting patterns, images, or colors on the display or indicators 128 in response to whether the setup of the link recovery and sidelink beamforming in some of the examples described herein are successful or unsuccessful, or otherwise indicate a status of link recovery and sidelink beamforming and associated components. The control lighting patterns, images, or colors on the display or indicators 128 may be reflective of the status of any of the method flows or components in the FIG.'S illustrated or discussed herein (e.g., FIG. 7, FIG. 13, FIG. 16, etc.). Disclosed herein are messages and procedures of link recovery and sidelink beamforming. The messages and procedures may be extended to provide interface/API for users to request resources via an input source (e.g., speaker/microphone 124, keypad 126, or display/touchpad/indicators 128) and request, configure, or query link recovery and sidelink beamforming related information, among other things that may be displayed on display 128.

The processor 118 may receive power from the power source 134, and may be configured to distribute or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software or hardware modules that provide additional features, functionality, or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect to other components, modules, or systems of such apparatuses or devices via one or more interconnect interfaces, such as an interconnect interface that may comprise one of the peripherals 138.

Figure 27G:
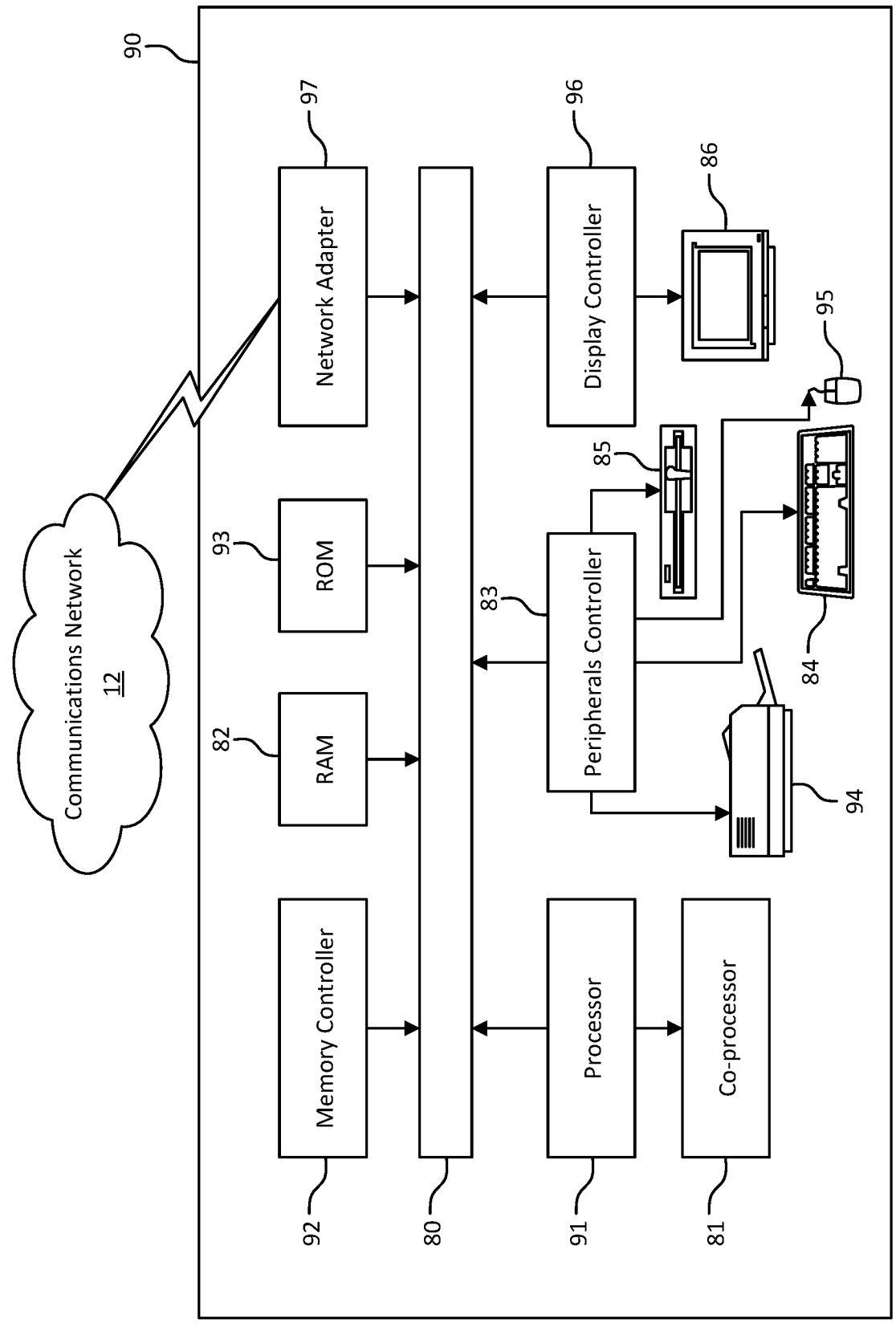
FIG. 27G is a block diagram of an exemplary computing system.

FIG. 27G is a block diagram of an exemplary computing system 90 in which one or more apparatuses of the communications networks illustrated in FIG. 27A, FIG. 27C, FIG. 27D and FIG. 27E as well as link recovery and sidelink beamforming, such as the systems and methods illustrated in FIG. 5 through FIG. 21 described and claimed herein may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, or any other functionality that enables the computing system 90 to operate in a communications network. Coprocessor 81 is an optional processor, distinct from main processor 91, that may perform additional functions or assist processor 91. Processor 91 or coprocessor 81 may receive, generate, and process data related to the methods and apparatuses disclosed herein for link recovery and sidelink beamforming, such as receiving messages.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIG. 27A, FIG. 27B, FIG. 27C, FIG. 27D, or FIG. 27E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform or implement the systems, methods and processes described herein. Specifically, any of the steps, operations, or functions described herein may be implemented in the form of such computer executable instructions, executing on the processor of an apparatus or computing system configured for wireless or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

In describing preferred methods, systems, or apparatuses of the subject matter of the present disclosure—link recovery and sidelink beamforming—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably. In addition, the use of the word "or" is generally used inclusively unless otherwise provided herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

The type(s) of device(s) that may practice the disclosed subject may include Smart Phone (Consumer Electronics/User Equipment/Smart Phone); Tablet (Consumer Electronics/User Equipment/Tablet); Wearable (Consumer Electronics/User Equipment/Wearable); Connected Vehicle (Consumer Electronics/User Equipment/Connected Vehicle); or Base Station (Network Infrastructure/Wireless NW Infra/Base Station), among other things.

Disclosed herein are methods, systems, and devices associated with BFR, SL-RS for BFD, radio link monitoring, or frequency assisted beam failure recovery, among other things. In a first example, there may be methods or systems for implementing beam failure recovery (BFR) procedures on sidelink (SL). The system may include 1) BFR at a transmitting UE or resource UE; or 2) BFR at a receiving UE or target UE.

In a second example, there may be methods or systems for implementing sidelink reference signal (SL-RS) for beam failure detection (BFD) and candidate beam indication (CBI) on sidelink. The systems or methods may include 1) sidelink channel state information reference signal (SL-CSI-RS) based beam failure detection (BFD) or candidate beam identification (CBI); 2) sidelink demodulation reference signal (SL-DMRS) of physical sidelink control channel (PSCCH) based on BFD or CBI; or 3) SL-DMRS of physical sidelink shared channel (PSSCH) based on BFD or CBI.

In a third example, there may be methods or systems for implementing radio link monitoring procedures on sidelink. The systems or methods may include 1) semi-persistent scheduling (SPS) SL-CSI-RS based radio link monitoring; or 2) aperiodic (AP) SL-CSI-RS based radio link monitoring. In a fourth example, there may be methods or systems for implementing frequency region 1 (FR1) assisted or frequency region 2 (FR2) beam failure recovery.

Methods, systems, and apparatuses, among other things, as described herein may provide for means for starting timer subsequent to link establishes with RX UE; counting number of consecutive received NACK feedbacks or no feedback from RX UE; and based on the number of consecutive received NACK feedbacks or no feedbacks exceed a certain configured threshold N, reporting (e.g., transmitting), by physical layer, a beam failure indication to higher layer for indicating the link failure. Based on higher layer receiving one or more beam failure indications from physical layer and if no ACK indication (including no-feedback) is received from physical layer before the timer expiry, send message to reserve a resource in a resource pool to transmit a beam sweeping burst. All combinations in this paragraph and the below paragraph (including the removal or addition of steps) are contemplated in a manner that is consistent with the other portions of the detailed description.

Methods, systems, and apparatuses, among other things, as described herein may provide for link recovery or sidelink beamforming. The method provides for starting a first timer in response to establishing a link with a receive user equipment (RX UE); counting a number of received negative-acknowledgement (NACK) feedbacks or no feedbacks from the RX UE; and based on the number of received NACK feedbacks or no feedbacks exceed a first threshold, sending, by a physical layer, a beam failure indication to higher layer for indicating a link failure. The number of received NACK feedbacks or no feedbacks may be consecutive or cumulative without regard to being consecutive. The system may provide for based on the higher layer receiving one or more beam failure indications from the physical layer and no acknowledgement (ACK) indication is received from physical layer before the timer expiry, sending a message to reserve a resource in a resource pool for transmitting a beam sweeping burst. A message may be sent to reserve a resource in a resource pool for transmitting a beam sweeping burst based on sensing. The beam sweeping burst may be a composite of multiple blocks, in which PSCCH and PSSCH are transmitted in each block. The no ACK indication is an indication of no feedback. The no ACKs may be an indication of a number of ACKs less than a threshold before a timer expires or number of NACKs. Based on no beam failure indication, sending to the higher layer upon expiry of timer, and restarting timer to continue sidelink when transmitting data to the RX UE. Starting a second timer to monitor the feedback from the RX UE in response to performing a beam sweeping burst. Based on the higher layer receiving one or more beam failure indications from the physical layer and no acknowledgement (ACK) indication (or link quality below a threshold) is received from physical layer before the timer expiry, reserving a resource in a resource pool for transmitting a beam sweeping burst. The reserving of the resource may be based on sensing. Each block of the multiple blocks may include SL-CSI-RS, PSCCH, or PSSCH+PSCCH.

What is claimed:

1. A first wireless transmit/receive unit (WTRU) that performs wireless communication comprising:
    a processor; and
    a memory coupled with the processor, the memory comprising executable instructions stored thereon that when executed by the processor cause the processor to effectuate operations comprising:
    communicating with a second WTRU;
    counting a number of received negative-acknowledgement (NACK) feedbacks or no feedbacks from the second WTRU;
    based on the number of received NACK feedbacks or no feedbacks exceeding a first threshold, sending a beam failure indication;
    reporting a link quality indication that is below a quality threshold; and
    based on the beam failure indication and the link quality indication that is below the quality threshold, transmitting a beam sweeping burst, wherein the beam sweeping burst is a composite of multiple blocks, wherein each block of the multiple blocks comprises physical sidelink shared channel (PSSCH).

2. The first WTRU of claim 1, the operations further comprising based on the beam failure indication and the link quality indication that is below the quality threshold, determining a threshold time window for a response from the second WTRU.

3. The first WTRU of claim 1, wherein the number of received no feedbacks from the second WTRU are consecutive no feedbacks from the second WTRU.

4. The first WTRU of claim 1, the operations further comprising based on no beam failure indication,
    determining a threshold time window associated with communicating with sidelink when transmitting data to the second WTRU.

5. The first WTRU of claim 1, wherein the number of received negative-acknowledgement (NACK) feedbacks from the second WTRU are consecutive received negative-acknowledgement (NACK) feedbacks from the second WTRU.

6. A method associated with wireless transmission between wireless transmit/receive units (WTRUs), the method comprising:
    communicating, by a first WTRU with a second WTRU;
    counting a number of received negative-acknowledgement (NACK) feedbacks or no feedbacks from the second WTRU;

based on the number of received NACK feedbacks or no feedbacks exceeding a first threshold, sending a beam failure indication;

reporting a link quality indication that is below a quality threshold; and based on the beam failure indication and the link quality indication that is below the quality threshold, transmitting a beam sweeping burst, wherein the beam sweeping burst is a composite of multiple blocks, wherein each block of the multiple blocks comprises physical sidelink shared channel (PSSCH).

7. The method of claim 6, further comprising based on the beam failure indication and the link quality indication that is below the quality threshold, determining a threshold time window for a response from the second WTRU.

8. The method of claim 6, wherein the number of received no feedbacks from the second WTRU are consecutive no feedbacks from the second WTRU.

9. The method of claim 6, further comprising based on no beam failure indication:

terminating link with the second WTRU or determining a threshold time window associated with communicating with sidelink when transmitting data to the second WTRU.

10. The method of claim 6, wherein the number of received negative-acknowledgement (NACK) feedbacks are consecutive received negative-acknowledgement (NACK) feedbacks from the second WTRU.

11. A computer readable storage medium storing computer executable instructions that when executed by a computing device cause the computing device to effectuate operations comprising:

communicating, by a first wireless transmit/receive unit (WTRU), with a second WTRU;

counting a number of received negative-acknowledgement (NACK) feedbacks or no feedbacks from the second WTRU;

based on the number of received NACK feedbacks or no feedbacks exceeding a first threshold, sending a beam failure indication;

reporting a link quality indication that is below a quality threshold; and based on the beam failure indication and the link quality indication that is below the quality threshold, transmitting a beam sweeping burst, wherein the beam sweeping burst is a composite of multiple blocks, wherein each block of the multiple blocks comprises physical sidelink shared channel (PSSCH).

12. The computer readable storage medium of claim 11, the operations further comprising based on the beam failure indication and the link quality indication that is below the quality threshold, determining a threshold time window for a response from the second WTRU.

13. The computer readable storage medium of claim 11, wherein the number of received no feedbacks from the second WTRU are consecutive no feedbacks from the second WTRU.

14. The computer readable storage medium of claim 11, the operations further comprising based on no beam failure indication, determining a threshold time window associated with communicating with sidelink when transmitting data to the second WTRU.

15. The computer readable storage medium of claim 11, wherein the number of received negative-acknowledgement (NACK) feedbacks from the second WTRU are consecutive received negative-acknowledgement (NACK) feedbacks from the second WTRU.

* * * * *